(12) United States Patent
Yoder et al.

(10) Patent No.: US 8,552,403 B2
(45) Date of Patent: Oct. 8, 2013

(54) POWER SYSTEM FOR DOSIMETER READER

(75) Inventors: R. Craig Yoder, Crown Point, IN (US); Mark S. Akselrod, Stillwater, OK (US); Kent J. Dillin, Stillwater, OK (US); Vasiliy V. Fomenko, Stillwater, OK (US); David F. Johnson, Placitas, NM (US); Yoshikazu Tatsumi, Chicago, IL (US); Tse-Min Lo, Glenwood, IL (US)

(73) Assignee: Landauer, Inc., Glenwood, IL (US)

( * ) Notice: Subject to any disclaimer, the term of this patent is extended or adjusted under 35 U.S.C. 154(b) by 160 days.

(21) Appl. No.: 13/082,494

(22) Filed: Apr. 8, 2011

(65) Prior Publication Data
US 2012/0018652 A1    Jan. 26, 2012

Related U.S. Application Data

(60) Provisional application No. 61/322,418, filed on Apr. 9, 2010.

(51) Int. Cl.
  *G01T 1/00* (2006.01)
  *G01N 21/64* (2006.01)
  *H05B 33/00* (2006.01)

(52) U.S. Cl.
  USPC ............... 250/484.2; 250/483.1; 250/484.5

(58) Field of Classification Search
  USPC ........... 250/483.2, 484.2, 484.5; 248/222.52, 248/225.21
  See application file for complete search history.

(56) References Cited

U.S. PATENT DOCUMENTS

| | | | |
|---|---|---|---|
| 3,247,379 A | | 4/1966 | Shurcliff |
| 4,258,264 A | | 3/1981 | Kotera et al. |
| 4,975,589 A | | 12/1990 | Chamberlain et al. |
| 5,041,734 A | | 8/1991 | Tetzlaff et al. |
| 5,049,754 A | * | 9/1991 | Hoelscher et al. ......... 250/484.3 |
| 5,081,363 A | * | 1/1992 | Tetzlaff et al. ............. 250/484.5 |
| 5,173,595 A | * | 12/1992 | Langsted ...................... 235/458 |
| 5,179,281 A | | 1/1993 | Tawil et al. |

(Continued)

FOREIGN PATENT DOCUMENTS

| CA | 1016894 | * | 9/1977 |
|---|---|---|---|
| EP | 1867797 | | 12/2007 |

(Continued)

OTHER PUBLICATIONS

Radio Frequency Identification (RFID). (2006). In Encyclopedia of Privacy. Retrieved from http://www.credoreference.com/entry/abcprivacy/radio_frequency_identification_rfid.*

(Continued)

*Primary Examiner* — David Porta
*Assistant Examiner* — Abra Fein
(74) *Attorney, Agent, or Firm* — Alchemy-Partners, PC; Ajay A. Jagtiani

(57) ABSTRACT

Described is a portable dosimeter reader device that is small in size and light in weight. The device comprises an optically stimulated luminescence (OSL) reader for reading one or more OSL sensors of a dosimeter and a dosimeter drawer slidably mounted in the device. The device further comprises an elevator carriage comprising a barrel with a barrel groove on an exterior side thereof, a loop retainer elevator including a tongue on an interior side thereof that travels in the barrel groove, a pinion gear mounted on the barrel, and a rack with rack teeth that engage pinion teeth of the pinion gear.

22 Claims, 74 Drawing Sheets

(56) References Cited

U.S. PATENT DOCUMENTS

| | | | |
|---|---|---|---|
| 5,298,728 A | 3/1994 | Elliott et al. | |
| 5,354,997 A | 10/1994 | Miller | |
| 5,382,783 A | 1/1995 | Bremer | |
| 5,567,948 A | 10/1996 | Miller | |
| 5,569,927 A | 10/1996 | Miller | |
| 5,632,429 A | 5/1997 | Cantwell | |
| 5,731,590 A | 3/1998 | Miller | |
| 5,962,857 A | 10/1999 | McKeever et al. | |
| 6,087,666 A | 7/2000 | Huston et al. | |
| 6,127,685 A | 10/2000 | Yoder et al. | |
| 6,198,108 B1 * | 3/2001 | Schweitzer et al. | 250/472.1 |
| 6,765,214 B1 | 7/2004 | Kosslow et al. | |
| 6,846,434 B2 | 1/2005 | Akselrod | |
| 6,998,632 B2 | 2/2006 | Magne et al. | |
| 7,420,187 B1 * | 9/2008 | Klemic et al. | 250/484.5 |
| 7,484,662 B2 | 2/2009 | Schmidtberg et al. | |
| 7,485,877 B2 | 2/2009 | Kearfott | |
| 7,652,268 B2 | 1/2010 | Patel | |
| 7,781,747 B1 | 8/2010 | Klemic et al. | |
| 8,013,744 B2 | 9/2011 | Tsai et al. | |
| 2003/0184198 A1 * | 10/2003 | Bodingbauer | 312/348.3 |
| 2004/0159803 A1 | 8/2004 | Akselrod et al. | |
| 2005/0125097 A1 * | 6/2005 | Chudy et al. | 700/236 |
| 2005/0236479 A1 | 10/2005 | Schmidtberg et al. | |
| 2005/0248456 A1 * | 11/2005 | Britton et al. | 340/539.29 |
| 2006/0043299 A1 | 3/2006 | Smith et al. | |
| 2006/0043304 A1 * | 3/2006 | Miller et al. | 250/358.1 |
| 2006/0043314 A1 | 3/2006 | Katzir et al. | |
| 2007/0197889 A1 | 8/2007 | Brister et al. | |
| 2007/0202005 A1 | 8/2007 | Maschke | |
| 2008/0023647 A1 | 1/2008 | Patel | |
| 2008/0024310 A1 | 1/2008 | Baker et al. | |
| 2009/0001286 A1 * | 1/2009 | Kearfott | 250/484.2 |
| 2009/0057579 A1 * | 3/2009 | Pylypchuk | 250/504 R |
| 2009/0100933 A1 | 4/2009 | Brunson et al. | |
| 2009/0127475 A1 | 5/2009 | De Lamberterie | |
| 2009/0224176 A1 | 9/2009 | Patel | |
| 2009/0278685 A1 * | 11/2009 | Potyrailo et al. | 340/572.1 |
| 2010/0033323 A1 | 2/2010 | Tsai et al. | |
| 2010/0102249 A1 | 4/2010 | Akselrod et al. | |
| 2010/0123547 A1 | 5/2010 | Stevenson et al. | |
| 2010/0152562 A1 | 6/2010 | Goodnow et al. | |
| 2010/0295672 A1 | 11/2010 | Hyland et al. | |
| 2011/0063127 A1 | 3/2011 | Matsumoto et al. | |
| 2011/0101234 A1 | 5/2011 | Nakamura et al. | |
| 2011/0168902 A1 | 7/2011 | Yoder | |
| 2011/0169616 A1 | 7/2011 | Yoder | |

FOREIGN PATENT DOCUMENTS

| | | |
|---|---|---|
| JP | 03002746 A | 1/1991 |
| JP | 2001-511258 | 8/2001 |
| JP | 2004-69352 | 3/2004 |
| JP | 2006058220 | 3/2006 |
| JP | 2006-266880 | 10/2006 |
| KR | 20-0199854 | 10/2000 |
| KR | 20-030900 | 2/2003 |
| KR | 10-0764868 | 10/2007 |
| WO | WO 2009/107444 | 9/2009 |

OTHER PUBLICATIONS

Office Action received in U.S. Appl. No. 12/757,184 dated Apr. 20, 2011.

Akselrod, et al. "Optically Stimulated Luminescence of $Al_2O_3$", *Radiation Measurements*, vol. 29, No. 3-4, pp. 391-399 (1998).

Akselrod, et al. "Preparation and Properties of $\alpha$-$Al_2O_3$:C" *Radiation Protection Dosimetry*, vol. 47, No. 1-4, pp. 159-164 (1993).

Botter-Jensen et al., "Optically Stimulated Luminescence Dosimetry" *Elesevier* (2003).

Klemic et al., "External Dosimetry in the Aftermath of a Radiological Terrorist Event" *Radiation Protection Dosimetry*, vol. 120, No. 1-4, pp. 242-249 (2006).

Final Office Action dated Mar. 12, 2012 received in U.S. Appl. No. 12/757,224.

Office Action dated Mar. 8, 2012 received in U.S. Appl. No. 13/398,989.

Office Action received in U.S. Appl. No. 12/757,184, mailed Oct. 7, 2011.

Office Action received in U.S. Appl. No. 12/757,224, mailed Sep. 28, 2011.

Search Report and Written Opinion received in PCT Application No. PCT/IB2011/050090, mailed Sep. 29, 2011.

Search Report and Written Opinion received in PCT Application No. PCT/IB2011/050088, mailed Sep. 23, 2011.

Search Report and Written Opinion received in PCT Application No. PCT/IB2011/050092, mailed Oct. 25, 2011.

Search Report and Written Opinion received in PCT Application No. PCT/IB2011/050093, mailed Oct. 25, 2011.

Search Report and Written Opinion received in PCT Application No. PCT/IB2011/050094, mailed Oct. 25, 2011.

Search Report and Written Opinion received in PCT Application No. PCT/IB2011/050098, mailed Oct. 26, 2011.

Office Action received in U.S. Appl. No. 12/757,184, mailed Nov. 23, 2011.

Office Action received in U.S. Appl. No. 12/757,132, mailed Jan. 5, 2012.

Office Action received in U.S. Appl. No. 12/757,224, mailed Dec. 28, 2011.

Office Action received in U.S. Appl. No. 13/358,621, mailed Feb. 16, 2012.

Search Report and Written Opinion received in PCT Application No. PCT/IB2011/051532, mailed Feb. 6, 2012.

Office Action dated May 17, 2013 received in U.S. Appl. No. 13/799,103.

Office Action dated May 8, 2013 received in U.S. Appl. No. 13/798,427.

\* cited by examiner

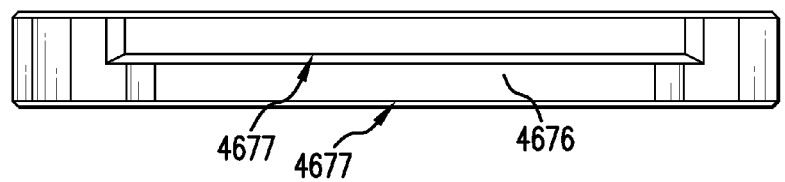
FIG.50
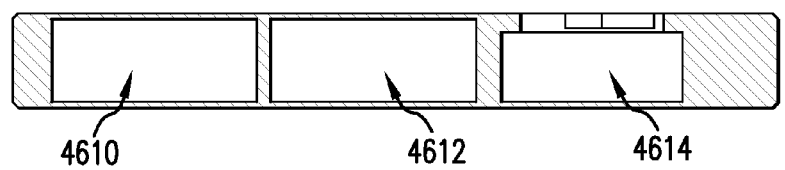
FIG.51
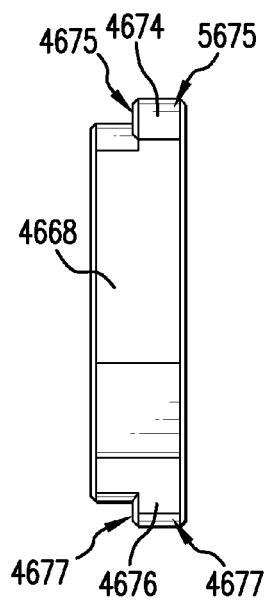 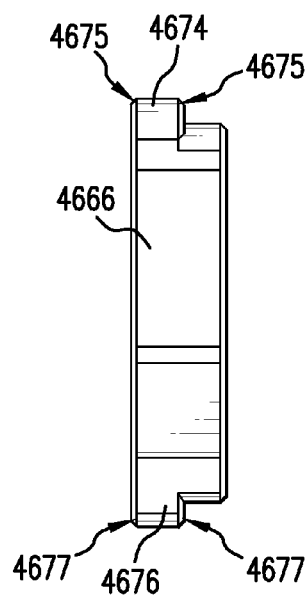 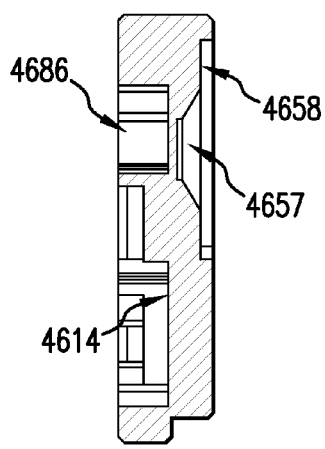
FIG.52　　FIG.53　　FIG.54

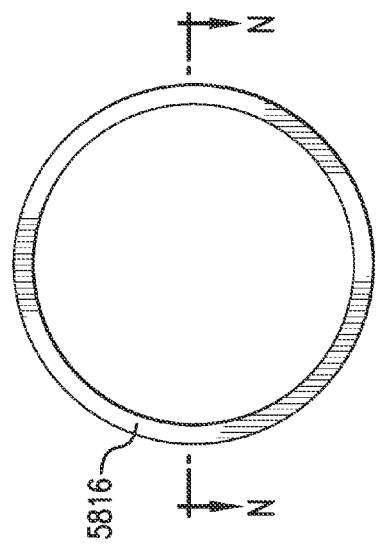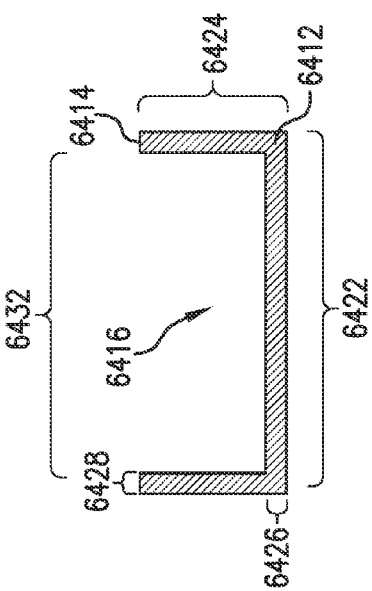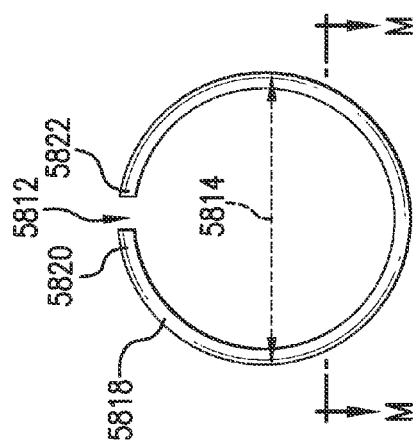
FIG. 64
FIG. 65
FIG. 62
FIG. 63

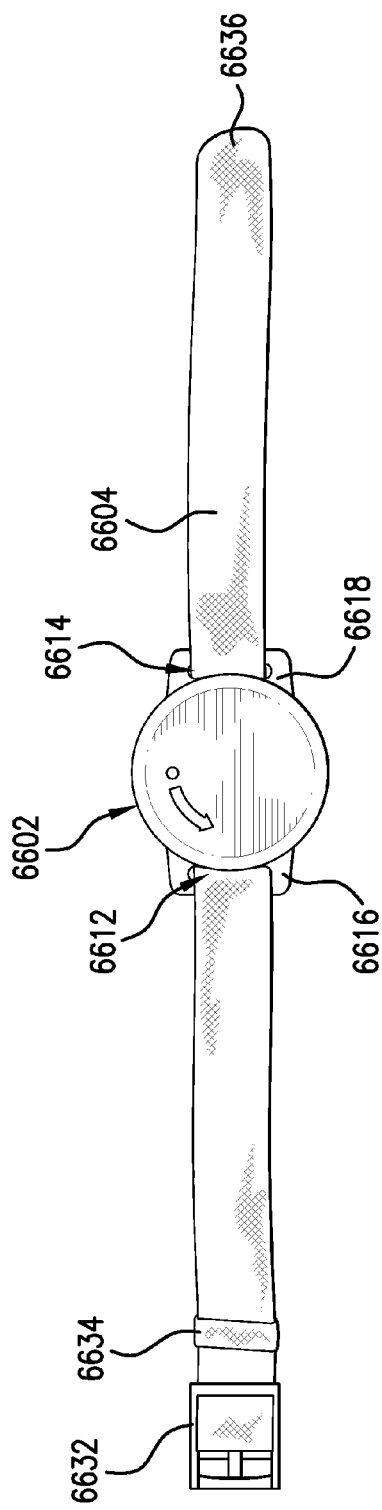
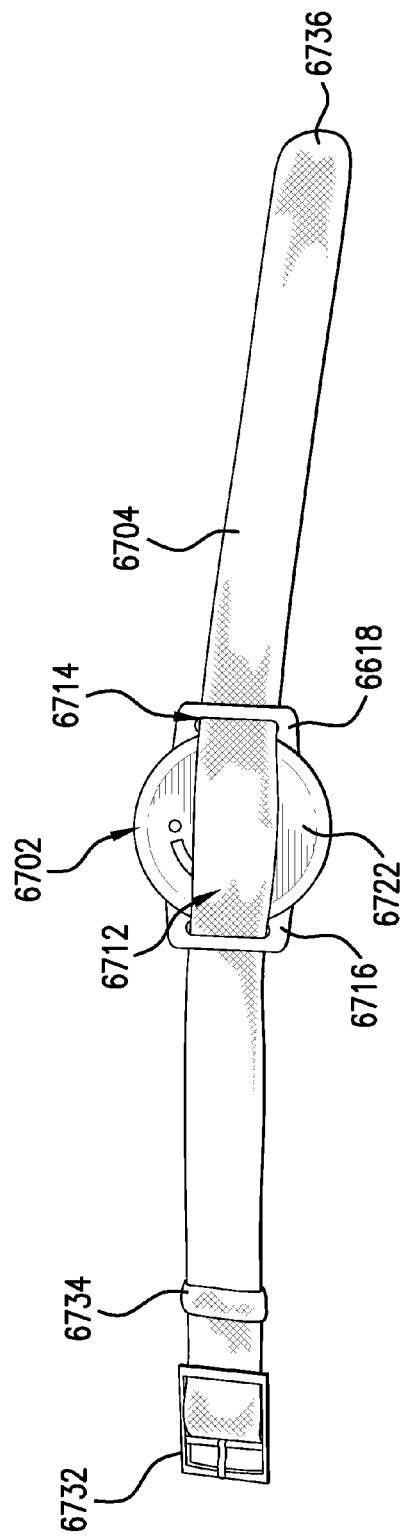
FIG. 66
FIG. 67

POWER SYSTEM FOR DOSIMETER READER

CROSS-REFERENCE TO RELATED APPLICATIONS

This application claims benefit of priority to U.S. Provisional Patent Application No. 61/322,418 to Yoder, entitled POWER SYSTEM FOR DOSIMETER READER, filed Apr. 9, 2010, which is incorporated herein by reference in its entirety. This application also makes reference to the following U.S. and PCT patent applications: U.S. patent application Ser. No. 12/757,147 filed Apr. 9, 2010 and PCT Patent Application No: PCT/IB2011/050090, filed Jan. 10, 2011, entitled PORTABLE DOSIMETER; U.S. patent application Ser. No. 12/757,132 filed Apr. 9, 2010 and PCT Application No: PCT/IB2011/050092, filed Jan. 10, 2011, entitled NOVEL FILTERS FOR USE IN DOSIMETRY; U.S. patent application Ser. No. 12/757,162 filed Apr. 9, 2010 and PCT Patent Application No: PCT/IB2011/050093, filed Jan. 10, 2011, entitled DOSIMETER SLED; U.S. patent application Ser. No. 12/757,140 filed Apr. 9, 2010, entitled PORTABLE READER FOR A DOSIMETER; U.S. patent application Ser. No. 12/757,168 filed Apr. 9, 2010 and PCT Patent Application No: PCT/IB2011/050094, filed Jan. 10, 2011, entitled DATA STORAGE MECHANISM AND COMMUNICATION MECHANISM FOR PORTABLE DOSIMETER; U.S. patent application Ser. No. 12/757,194 filed Apr. 9, 2010 and PCT Patent Application No. PCT/IB2011/050088 filed Jan. 10, 2011, entitled READING MECHANISM FOR DOSIMETER; U.S. patent application Ser. No. 12/757,214 filed Apr. 9, 2010 and PCT Patent Application No: PCT/IB2011/050097 filed Jan. 10, 2011, entitled OPTICAL SYSTEM FOR DOSIMETER WITH READER; U.S. patent application Ser. No. 12/757,184 filed Apr. 9, 2010 and PCT Patent Application No: PCT/IB2011/050098 filed Jan. 10, 2011, entitled DOSIMETER WITH RFID TAG; and U.S. patent application Ser. No. 12/757,224 filed Apr. 9, 2010, entitled NOVEL RFID TAG FOR USE IN DOSIMETRY.

BACKGROUND

1. Field of the Invention

The present invention relates to a portable dosimeter reader.

2. Related Art

Many existing dosimeter readers are relatively large and heavy and, therefore, are not portable. Many existing dosimeter readers are also not capable of being run solely by battery power.

SUMMARY

According to a first broad aspect, the present invention provides a device comprising: an optically stimulated luminescence (OSL) reader for reading one or more OSL sensors of a dosimeter sled; a sled slider that is driven by an engine to position in turn each of the one or more OSL sensors of the dosimeter sled at a reading position where the OSL reader reads each respective OSL sensor; a display for displaying information relating to reading the one or more OSL sensors; and a battery compartment for one or more batteries, wherein the OSL reader includes an LED light source, wherein the battery compartment is electrically connected to the OSL reader, the engine and the display, and wherein the one or more batteries provide all of the power required for operating the OSL reader, the engine and the display.

According to a second broad aspect, the present invention provides a device comprising: an optically stimulated luminescence (OSL) reader for reading one or more OSL sensors of a dosimeter sled; a sled slider that is driven by an engine to position in turn each of the one or more OSL sensors of the dosimeter sled at a reading position where the OSL reader reads each respective OSL sensor; a display for displaying information relating to reading the one or more OSL sensors; a battery compartment for one or more batteries; and a case enclosing the device, wherein when the case is in a closed configuration, the device has a total volume of about 3,065 $cm^3$ or less.

According to a third broad aspect, the present invention provides a device comprising: an optically stimulated luminescence (OSL) reader for reading one or more OSL sensors of a dosimeter; a dosimeter drawer slidably mounted in the device, the dosimeter drawer comprising: a drawer base include two tab openings through which two retaining tabs extend; and a drawer handle for pushing and pulling the dosimeter drawer so that that drawer slides in a first direction and a second direction that are opposite to each other; first and second loop retainers extending through respective post openings in the drawer base, wherein the drawer base includes one or more first engagement structures for engaging one or more second engagement structures on a lower housing of the dosimeter when the dosimeter is loaded in the dosimeter drawer whereby the lower housing is prevented from rotating relative to the drawer base; wherein the sliding of the dosimeter drawer in the first direction causes the two retaining tabs engage respective lips and cutouts of recesses on the lower housing of the dosimeter to retain the lower housing of the dosimeter on the drawer base when an upper housing of the dosimeter is separated from the lower housing of the dosimeter, wherein the first and second loop retaining posts retain respective first and second loops of the upper housing of the dosimeter when the upper housing of the dosimeter is rotated approximately 90° relative to the lower housing to release the upper housing from the lower housing, wherein the first and second loop retainers raise the upper housing above the lower housing when the upper housing is retained by the first and second loop retaining posts and when the dosimeter drawer is pushed in the first direction, and wherein the first and second loop retainers lower the upper housing separated from the lower housing on the lower housing when the dosimeter drawer is pulled in the second direction.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 50 is a side view of the dosimeter sled body of FIG. 46;

FIG. 51 is a cross-sectional view of the dosimeter sled body of FIG. 46 taken along line I-I of FIG. 48;

FIG. 52 is an end view of the dosimeter sled body of FIG. 46;

FIG. 53 is an end view of the dosimeter sled body of FIG. 46 of the opposite end of the dosimeter sled from the end shown in FIG. 51;

FIG. 54 is a cross-sectional view of the dosimeter sled body of FIG. 46 taken along line J-J of FIG. 49;

FIG. 62 is a top plan view of a retaining ring of the OSL sensor of FIG. 58 with the retaining ring shown in a relaxed state;

FIG. 63 is a cross-sectional view of the retaining ring of FIG. 58 taken along line M-M of FIG. 62:

FIG. 64 is a top plan view of a cylindrical cup-shaped outer filter of the OSL sensor of FIG. 58;

FIG. 65 is a cross-sectional view of the outer filter of FIG. 61 taken along line N-N of FIG. 64:

FIG. 66 is an image of a radiation dosimeter of the present invention with a wristband according to one embodiment of the present invention with the wristband threaded below the lower housing of the radiation dosimeter;

FIG. 67 is an image of a radiation dosimeter of the present invention with a wristband according to one embodiment of the present invention with the wristband threaded above the upper housing of the radiation dosimeter;

DETAILED DESCRIPTION OF THE PREFERRED EMBODIMENTS

Definitions

Figure 1:
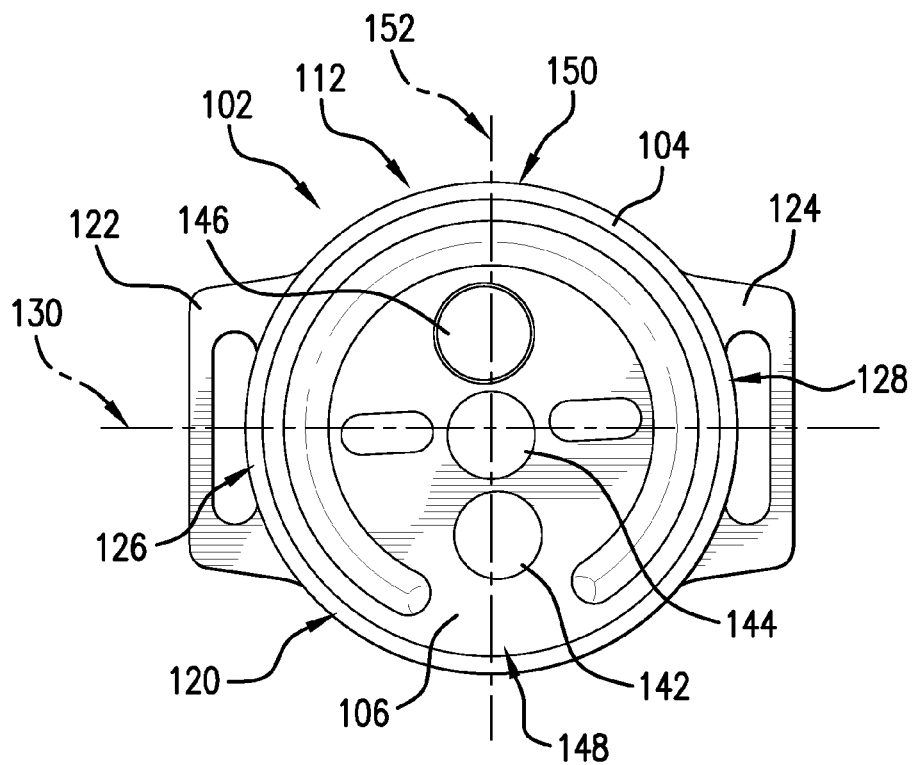
FIG. 1 is an image of the bottom of a radiation dosimeter according to one embodiment of the present invention.

Where the definition of terms departs from the commonly used meaning of the term, applicant intends to utilize the definitions provided below, unless specifically indicated.

For the purposes of the present invention, directional terms such as "top", "bottom", "upper", "lower", "above", "below", "left", "right", "horizontal", "vertical", "upward", "downward", etc., are merely used for convenience in describing the various embodiments of the present invention.

For the purposes of the present invention, a value or property is "based" on a particular value, property, the satisfaction of a condition, or other factor, if that value is derived by performing a mathematical calculation or logical decision using that value, property or other factor.

For the purposes of the present invention, the term "angle of incidence" refers to the angle between the direction of the radiation trajectory and a line perpendicular (normal) to the detector surface.

For the purposes of the present invention, the term "close proximity" refers to a distance comparable with the penetration range of charged particles in a particular medium.

For the purposes of the present invention, the term "comparator OSL sensor" refers an OSL sensor that includes a reference filter material and is used to adjust the dose determined by the reference sensor at very low energies of x-rays or gamma rays. In some embodiments of the present invention, the reference filter material of a comparator OSL sensor may be applied as a thin coating on an OSLM or be mounted as a thin film or disc adjacent to the OSLM in a reference OSL sensor OSL sensor. In one embodiment of the present invention, the reference filter material may be in the form of a disc that is mounted between the OSLM and the base of a cylindrical-cup shaped filter in which the OSLM is mounted. In one embodiment of the present invention, the OSLM of a comparator OSL sensor may be mixed with the reference filter material so that the OSLM is embedded or suspended in the reference filter material.

For the purposes of the present invention, the term "converter material" refers to a converter material that can convert non-ionizing neutron radiation into recoil or knockout protons, which can be detected by an OSL sensor or include a fluorescent nuclear track detector (FNTD). An example of a "converter material" is high-density polyethylene (HDPE). Another example of a "converter material" is polyethylene (PE). In some embodiments of the present invention, a converter material may be applied as a thin coating on an OSLM or be mounted as a thin film or disc adjacent to the OSLM of a neutron-sensitive OSLM sensor. In one embodiment of the present invention, the converter material may be in the form of a disc that is mounted between the OSLM and the base of a cylindrical-cup shaped filter in which the OSLM is mounted. In one embodiment of the present invention, the body of a dosimeter sled made of a converter material such as HDPE or PE so that the entire dosimeter sled may act as converter material for an OSLM or an FNTD mounted in the dosimeter sled. In another embodiment of the present invention, the OSLM may be mixed with the converter material so that the OSLM is embedded or suspended in the converter material.

For the purposes of the present invention, the term "cylindrical cup-shaped" refers to a filter having the general shape of a right cylinder with the top or bottom of the cylinder removed i.e. the filter has a disc-shaped bottom or top and a cylindrical wall extending therefrom. The walls, top or bottom may be formed from the same material or different materials depending on the angular and energy compensation response to radiation desired for the dosimeter.

For the purposes of the present invention, the term "dosimetric parameter" refers to the value or the number determined from processing the fluorescent image or signal of irradiated luminescent material and is directly related to the dose of radiation absorbed by the detector.

For the purposes of the present invention, the term "energy compensating material" refers to a material that when placed between an OSLM and a source of gamma radiation or x-ray radiation alters the response over a range of gamma energies or x-ray energies compared to the OSLM exposed with no compensating or filtering material. Examples of energy compensating materials are copper and aluminum.

For the purposes of the present invention, the term "fast neutron" refers to the conventional meaning of the term "fast neutrons", meaning neutrons with energies above 10 keV.

For the purposes of the present invention, the term "filter" refers to any structure that is located between a radiation sensing material, such as an OSLM, and a source of radiation and affects the radiation experienced by the radiation sensing material. For example, a filter may be an energy compensating filter, a converter, a reference filter, a conformal disc etc. In one embodiment of the present invention, the energy compensating filter may be a cylindrical cup-shaped filter. Although the filters of the present invention are primarily described below as being used with optically stimulated luminescent materials, the filters of the present invention may be used with other types of radiation sensing materials, such as thermoluminescent dosimetry (TLD) materials. In one embodiment of the present invention in which an OSL sensor comprises an OSLM disc mounted in a cup-shaped filter, one or more filter material discs may be located between the OSLM disc and the base of the cylindrical cup-shaped filter. Each of the filter material discs would constitute a filter.

For the purposes of the present invention, the term "filter material" refers the material or materials of which a filter is comprised. For example, depending on the type of filter, a filter material may be an energy compensating material, a converter material, a reference filter material, a conformal material, etc. Although the filter materials of the present invention are primarily described below as being used with optically stimulated luminescent materials, the filter materials of the present invention may be used with other types of radiation sensing materials, such as thermoluminescent dosimetry (TLD) materials.

For the purposes of the present invention, the term "heavy charged particle (HCP)" refers to nuclei or ions with masses equal to or greater than a proton. Some representative, but nonlimiting examples of heavy charged particles include: alpha particles, tritium ions, protons, recoil protons, etc.

For the purposes of the present invention, the term "indirectly ionizing radiation" refers to x-rays, gamma rays or neutrons.

For the purposes of the present invention, the term "ionizing radiation" refers to any particulate or electromagnetic radiation that is capable of dissociating atoms into a positively and negatively charged ion pair. The present invention may be used to determine doses of both directly ionizing radiation and indirectly ionizing radiation.

For the purposes of the present invention, the term "irradiation" refers to the conventional meaning of the term "irradiation", i.e., exposure to high energy charge particles, e.g., electrons, protons, alpha particles, etc., or electromagnetic radiation of wave-lengths shorter than those of visible light, e.g., gamma rays, x-rays, ultraviolet, etc.

For the purposes of the present invention, the term "low penetrating radiation" refers to radiation from heavy charged particles having penetration range that is less than 100 microns (100μ) in a radiation sensing material or absorber. Examples of low penetrating radiation are: alpha particles, recoil protons, etc.

For the purposes of the present invention, the term "maximum penetration range" or "penetration range" refers to the distance in the medium at which a directly ionizing particle comes to rest.

For the purposes of the present invention, the term "moderated neutrons" refers to neutrons produced by slowing fast neutrons by a hydrogen or deuterium containing moderator and having a large contribution of low energy neutrons in the energy range from about 0.025 eV to about 10 keV.

For the purposes of the present invention, the term "neutron to proton converter" refers to a hydrogen-containing material, such as high-density polyethylene (HDPE) that may be used to convert non-ionizing neutron radiation into recoil or knockout protons, which can be detected by a radiation sensor.

For the purposes of the present invention, the term "neutron-sensitive OSL sensor" refers to an OSL sensor that detects neutrons. A neutron-sensitive OSL sensor may also detect other types of radiation such as x-ray and gamma rays.

For the purposes of the present invention, the term "OSL reader" refers to a device that emits a wavelength of light that stimulates an OSLM in an OSL sensor to emit light. Under a specified stimulation regime (continuous stimulation, reading wavelength and intensity, and pulsed stimulation with various pulse durations, pulse frequency, pulse shape and time between pulses) the intensity of the emitted light is proportional to the radiation exposure in a range from about 0.01 mGy (1 mrem) to over about 100 Gy (10,000 rads).

For the purposes of the present invention, the term "OSL sensor" refers to a radiation sensor that is made from or includes an OSLM. OSL sensors may be read using an OSL reader.

For the purposes of the present invention, the term "passive detection" refers to the detection technique that does not require any active electronic circuitry and a supply of electrical power to detect the radiation and/or integrate the radiation absorbed dose.

For the purposes of the present invention, the term "penetrating photon radiation" refers to short wavelength electromagnetic radiation with energies equal to or higher than 10 keV as might originate from radioactive nuclear decay, from space or produced by accelerating or decelerating of charge particles, for example, in an X-ray machine or in an accelerator.

For the purposes of the present invention, the term "penetrating beta radiation" refers to electrons with energies equal to or greater than 10 keV as might originate from radioactive nuclear decay, from space, produced by radiation-induced ionization of atoms or by acceleration in an electric field.

For the purposes of the present invention, the term "portion" refers to any portion of an object or material, including the entire object and material. For example, a converter that covers a "portion" of a luminescent material may cover part or all of one or more surfaces of the luminescent material.

For the purposes of the present invention, the term "radiation dosimetry" refers to the conventional meaning of the term "radiation dosimetry", i.e., the measurement of the amount of radiation dose absorbed in a material, an object or the body of an individual.

For the purposes of the present invention, the term "radiation sensing material" refers to a material used to sense radiation in a radiation sensor. Examples of radiation sensitive materials including optically stimulated luminescent materials for OSL sensors, thermoluminescent materials for thermoluminescent dosimetry (TLD) sensors, etc.

For the purposes of the present invention, the term "recoil protons" refers to those protons that are generated by the collision of neutrons with a converter containing a source of hydrogen atoms, e.g. polyethylene or high-density polyethylene.

For the purposes of the present invention, the term "reference filter material" refers to a non-hydrogen containing, carbon based material with certain optical absorption and reflection properties that has a filtering effect on x-rays and gamma rays that is similar to the radiation filtering and optical absorption and reflection effects of an organic converter material on x-rays and gamma rays. For example, the "reference filter material" fluorinated plastic polytetrafluoroethylene (sold under the trade name Teflon® by DuPont), which has a filtering effect on x-rays and gamma rays that is similar to the neutron-to-proton converter material high-density polyethylene (HDPE). A reference filter material acts on both optical stimulation and luminescence light and is used to enhance the effectiveness of the method according to one embodiment of the present invention.

For the purposes of the present invention, the term "reference OSL sensor" is an OSL sensor that includes a reference filter material and is used to determine the effects of a converter material on x-ray and gamma ray detection by another OSL sensor that is identical to the reference OSL sensor, except for the substitution of the converter material for reference filter material. In some embodiments of the present invention, the reference filter material of a reference OSL sensor may be applied as a thin coating on an OSLM or be mounted as a thin film or disc adjacent to the OSLM in a reference OSL sensor. In one embodiment of the present invention, the reference filter material may be in the form of a disc that is mounted between the OSLM and the base of a cylindrical-cup shaped filter in which the OSLM is mounted. For many radiation dosimeters, which employ three OSL sensors arranged in a row, the best angular response for the radiation dosimeter is often improved when the reference OSL sensor is the center OSL sensor. In one embodiment of the present invention, the OSLM of the reference OSL sensor may be mixed with the reference filter material so that the OSLM is embedded or suspended in the reference filter material.

Description

In existing personal radiation monitoring devices, the radiation sensors are generally captured in a holder containing one or more filters that alter the amounts, energies and types of radiation able to reach the sensors. These filters typically sandwich the sensors to achieve correct assessments when the radiation enters the dosimeter from various angles of incidence. To analyze the sensors, they must be removed from between the filters and holder and physically presented to the processing system required to elicit the quantitative attribute exhibited by the sensor following exposure to radiation.

For example to analyze a film dosimeter generally involves the following steps: 1. Removing the film packet from the holder where it is sandwiched between the filters; 2. Unwrapping protective packaging that protects the film from light fogging and physical damage; 3. Developing the films in chemicals; 4. Measuring the density of the film by placing it between a light source and a light detector and comparing the transmission of light through the film to a reference condition where there is nothing placed between the light source and light detector, and; 5. Relating the density to radiation exposure in one or more areas of the film corresponding to the areas where the film was sandwiched between the filters.

Similarly radiation sensors based on thermoluminescent dosimetry (TLD) must be removed from the holder and their position between the filters and presented to a very high temperature environment necessary to cause the sensor to emit luminescence and measure the amount of such luminescence whose intensity is proportional to the radiation dose. The required temperatures will typically burn the holder and any identifying labels, thereby necessitating the removal of the sensors from the TLD dosimeter. Most common metallic filters also create incandescence and other interfering light at the very high temperatures, e.g. 200 to 300° C. The disassembly process involves a number of mechanical steps that create operating inefficiencies. Also, because of the multiple steps in the disassembly process for a TLD dosimeter, a complex identification system is required to link a specific TLD sensor or sensors to the holder that is needed to establish an unbroken chain of custody whereby the results of the radiation dose analysis can be related to a particular person or place being exposed to radiation. The sequence of steps in disassembling a TLD dosimeter also introduces a risk of damaging or losing the sensors during the movement of the sensors to the processing instruments and incorrect reassembly of the dosimeter when such sensors can be reconditioned for reuse.

In contrast, radiation sensors based on optically stimulated luminescence, OSL sensors, only require an optical path whereby a stimulating beam of light can illuminate the OSL sensor(s) and the resultant radiation induced luminescence can be routed back through the same or alternate optical path to a light detector such as a photomultiplier tube that quantifies the amount of luminescent light. In one embodiment, the invention employs an optical path whereby an external beam of light can enter the interior of the holder, illuminate each OSL sensor and enable the luminescent light to exit the holder along the same optical path without need to remove the sensors from their normal position with respect to any filters or converting materials. The optical path may be either an optical fiber or an uninterrupted air channel through which light can travel.

For more information on OSL materials and systems, see, U.S. Pat. No. 5,731,590 issued to Miller; U.S. Pat. No. 6,846,434 issued to Akselrod; U.S. Pat. No. 6,198,108 issued to Schweitzer et al.; U.S. Pat. No. 6,127,685 issued to Yoder et al.; U.S. patent application Ser. No. 10/768,094 filed by Akselrod et al.; all of which are incorporated herein by reference in their entireties. See also Optically Stimulated Luminescence Dosimetry, Lars Botter-Jensen et al., Elesevier, 2003; Klemic, G., Bailey, P., Miller, K., Monetti, M. External radiation dosimetry in the aftermath of radiological terrorist event, Rad. Prot. Dosim., in press; Akselrod, M. S., Kortov, V. S., and Gorelova, E. A., Preparation and properties of $Al_2O_3$:C, Radiat. Prot. Dosim. 47, 159-164 (1993); and Akselrod, M. S., Lucas, A. C., Polf, J. C., McKeever, S. W. S. Optically stimulated luminescence of $Al_2O_3$:C, Radiation Measurements, 29, (3-4), 391-399 (1998), all of which are incorporated herein by reference in their entireties.

Passive sensors, such as film, TLD or OSL sensors as described above, accumulate and store the dose within the molecular structure of the sensor without any need of electrical power. This characteristic makes passive sensors ideal for situations where the risk of a power interruption is unacceptable. Optically stimulable crystals and radiation scintillation sensors have been connected to the ends of fiber optic cables so that the sensors can be attached to the measurement instrument without removing the sensors from their locations in the radiation field. The sensors are integrally sealed to the ends of the optical fiber to prevent stray light from interfering with the measurement. The optical fibers connect to the light measurement instrument via a mechanical connector that mates the fiber to the optical pathway created in the instrument. As a single sensor is attached to a single fiber, radiation dosimeters requiring multiple sensors must have multiple fiber connectors that must be individually linked to the photonics system in the instrument. The physical size of the connectors and the need to cap the free end when not joined to the measurement instrument make dosimeters with multiple fiber leads impractical and inconvenient for the wearer.

In one embodiment of the present invention, the design of the radiation dosimeter enables the OSL sensors to be enclosed with the dosimeter being analyzed, until the OSL sensors are read. The radiation dosimeter also provides a means of protecting the OSL sensors and light path from dirt or other things that may alter or affect the amount of stimulating and luminescent light able to travel to and from the OSL sensor(s) and the analytical instrument (dosimeter reader). The design permits the OSL sensors to be permanently embedded in a sled so that the sensor(s) can be carried by the sled to the stimulation light source and luminescence collector without having to separate the OSL sensors from the sled. This aids chain of custody because the singularity of the dosimeter sled and OSL sensors allows the same identification label or tag to apply to all parts. The design also reduces the number of parts and mechanical complexity of having a means to open dosimeter so that sensors can be removed for analysis. Also, because the sled also contains the filters, the positional arrangement of all the critical elements of the dosimeter are fixed and not disassembled for analysis.

In one embodiment, the present invention eliminates a number of physical steps thereby improving productivity and enabling simpler automated handling of large numbers or dosimeters. The design allows better exploitation of the very fast stimulation and luminescence processes that make the analysis of optically stimulated luminescence radiation sensors a very rapid analytical method, again providing greater productivity in terms of units analyzed per unit of time. Radiation sensors based on measuring electrical signals such as current, voltage or resistance that are changed as a result of exposure to radiation can be connected to a measurement instrument such as an electrometer, voltmeter or pulse counter via wires or other types of conducting pathways. Therefore the sensors may be packaged permanently into the device worn by the user. Such devices generally require a source of power to establish the voltage gradients needed to attract the ionization created by the radiation in the sensor to an electrode or solid-state collector. These types of devices are generally classed as active in that they can provide an instantaneous indication of the radiation exposure rate. If provided a memory capability, active devices can integrate the rate data to provide an estimate of the accumulated dose.

One of the most difficult tasks in radiation dosimetry is discrimination of the dose created by different radiations, especially neutrons. Accordingly, the neutrons need to be converted to directly ionizing radiation, such as alpha particles, energetic protons, etc., to be detected by such crystals. For dosimetry of fast neutrons, recoil protons from hydrogen rich plastics, such as high-density polyethylene, are preferred because they are similar to the interactions with water that occur in the body. These converters of neutrons may be associated with, attached to or otherwise in contact with the luminescent material, may be mixed or merged with the luminescent material or may be even be part of or incorporated into the luminescent material. Alpha and beta particles and protons originated from radionuclides and accelerator facilities, as well as heavy charged particles of cosmic rays, usually do not need any conversion.

In one embodiment of the present invention, each OSL sensor comprises an assembly composed of one or more cylindrical cups that act as energy compensating filters that alter the energy or gamma rays and x-rays able to reach the OSL material (OSLM). The cups can be formed from one material or have a top and sides of different materials depending on the angular response desired for the dosimeter. The thickness of the top and walls may be different from each other depending on the angular response desired for the dosimeter. The shape of the cup walls and top need not be flat or uniform but can be curved and of varying thickness depending on the angular response desired. The cups may be designed in concert with the upper and lower housings as these also act as energy compensating filters.

In one embodiment of the present invention, the radiation dosimeter may be worn in a fashion similar to a watch. For such a radiation dosimeter, the curve structured of the upper housing combined with the right cylinder cups permits this dosimeter to be worn on the wrist and still assess the dose to the body as if the dosimeter were worn on the body.

In one embodiment of the present invention, the lower housing contains energy compensating filters that are flat either as discs aligning with the openings of the cup or as a plate extending all dimensions of the cup openings. The sequence of the metal used in the cups imparts the optimum energy shaping as the lower atomic number elements remove photoelectrons created in the higher atomic number elements by lower energy x-rays. The photoelectrons can impart an undesired response in the OSLM. The cups may be held in place on the sled by compression fit, adhesives or molded in place so that the sled encompasses the cups.

When multiple cups are used for one sensor, they can be held together via a crimping action, compression fit or adhesive. In many embodiments of the present invention, no more than two cups would be used with one contained by the other. This keeps the overall height, cost and assembly at practical values.

Within the cup are converting filters that convert the indirectly ionizing radiations into directly ionizing particles, mainly electrons from gamma rays and x-rays, and recoil protons for neutrons. In addition, the converters create a reflective condition whereby the stimulation light passing through the OSLM is reflected into the OSLM thereby gaining more effective use of the stimulation light. Similarly, the converters reflect the luminescence light traveling inwards into the cup back out into the cup opening and into the light pipe of the photo-engine in the dosimeter reader.

In one embodiment of a neutron-sensitive OSL sensor of the present invention, the thickness of the HDPE converter that converts the neutrons into recoil protons and the gamma rays/x-rays into electrons is optimized at 1 mm to create a maximum number of recoil protons and electrons. A separate thin piece of HDPE may be added to provide better contact between the OSLM and HDPE.

In one embodiment of the present invention, the thickness of the PTFE used in the reference OSL sensor and the comparator OSL sensor is such that it converts the gamma rays/x-rays into a similar number of electrons. In this case its thickness is also 1 mm. The tolerance of the thicknesses of both converters may be ±0.1 mm.

The converters and filters may be retained inside the cups either by adhesives, compression fit or retaining rings that also retain the OSLM in contact with the converters. The retaining ring may be a 0.6 mm diameter wire that fully wraps around the interior diameter of the inner cup. The retaining ring defines the optical readout area of the stimulation light illuminating the OSLM.

Although the converters and filters described below and shown in the drawings are flat in other embodiments, the converters may be parabolic to enhance the optical reflection into the light pipe but with added cost.

The combined construction of the energy compensating filter cups and radiation converting filters is such that when mounted into the sled, all of the OSLM is at the same height in the sled and therefore the same distance from the exit of the light pipe of the optical engine.

Each sensor may be individually calibrated as the reflection and light absorption properties of the HDPE and PTFE are slightly different. This also permits visual distinction of the sensors needed for accurate assembly of the dosimeter.

The grain size of the aluminum oxide particles in an OSLM according to one embodiment of the present invention may be selected based on the range of the recoil protons in the aluminum oxide. Based on Monte Carlo simulations and experimental confirmation tests, this grain size is between 30 and 40 microns for the fast neutron environments of most concern in radiation protection dosimetry. Once the recoil protons have deposited their energy in the aluminum oxide grain, any greater size would not increase the proton response but since the electrons have a greater range, the response due to the gamma rays/x-rays would increase thereby reducing the neutron to gamma ray/x-ray signal ratio. Conversely, smaller grains would not fully capture the recoil proton energy thereby also reducing the neutron to gamma ray/x-ray signal ratio.

The coating of the aluminum oxide grains onto a clear film may be done with binders that have minimal hydrogen so that the reference sensor response is only due to gamma rays and x-rays.

In one embodiment of the present invention, a minimal binder coating is used on top of the grains so as to not to interfere with the recoil protons depositing their energy into the aluminum oxide.

In one embodiment of the present invention, the film on which the aluminum oxide is coated may be transparent to blue and green light and have a thickness ranging between 0.05 and 0.15 mm.

In one embodiment of the present invention, the OSL sensors are mounted in a dosimeter sled that slides in contact with the plate in the OSL reader to which a photo-optical engine of the present invention is attached. The dosimeter sled, combined with the OSL sensors, maintains the OSLM material in each of the OSL sensors at a constant distance from the exit of the optical light pipe of the OSL reader to assure uniform stimulation and collection of luminescence light. In one embodiment of the present invention, an end side of the dosimeter sled is curved to ensure that the circular optical light pipe is completely blocked when the OSL sensor mounted closest to the curved end side is read.

In one embodiment of the present invention, the dosimeter sled in which the OSL sensors are mounted may be made of PE or HDPE allowing part of its surface to be used to convert the neutrons to recoil protons in that area where the FNTD sensor is mounted on the underside recess in the sled.

In one embodiment of the present invention, the centers of each sensor may be aligned along a straight line parallel to the long axis of the sled and along the axis of travel into and out of the rail system in the OSL reader of the dosimeter reader that guides the slide and in turn the sensors over the light pipe of the photo-engine in the OSL reader.

In one embodiment of the present invention, the dosimeter sled may be engraved with an identification number that is reproduced in an RFID tag.

In one embodiment of the present invention, the dosimeter sled has a recess over the comparator OSL sensor where the RFID tag is placed. The RFID tag may be held in place by an adhesive transfer tape such as 3M adhesive tape with 300SLE adhesive or alternatively with a UV curable adhesive liquid placed along the edge of the tag. The placement of the RFID tag is such that the metal filters do not impede the RF field created by the RFID tag reader thereby permitting correct reading and writing to the RFID tag.

In one embodiment of the present invention, the OSL sensors are mounted in openings in the dosimeter sled that include respective ledges that locate the height of the OSL sensors. The combination of these ledges and the cylindrical-cup shaped filters are also designed to maintain the OSLM in each OSL sensor at the same height.

In one embodiment of the present invention, in addition to the three OSL sensors described above, the radiation dosimeter may also include a fluorescent nuclear track detector (FNTD) mounted in the dosimeter sled. The FNTD provides an alternative method of dosimetry under alternate conditions of analysis. Examples of suitable fluorescent nuclear track detectors are described in U.S. patent application Ser. No. 12/258,035 to Akselrod, et al., entitled "METHOD OF LUMINESCENT SOLID STATE DOSIMETRY OF MIXED RADIATIONS" filed Oct. 24, 2008, the entire contents and disclosure of which is incorporated herein by reference.

In some embodiments of the present invention, in addition to the three OSL sensors described above or in place of one of the OSL sensors described above, the dosimeter sled may include an OSL sensor that has a second type of OSLM that is different from the OSLM in the other OSL sensors.

In one embodiment of the present invention, the underside of the dosimeter sled may include a recess that houses an FNTD (fluorescence nuclear track detector) or a polyallyldicarbonate plastic (PADC sold under the trade name CR-39) to alternately assess the dose from neutrons. Within the recess are two wells into which are placed a piece of PTFE and a piece of LiF or Li loaded plastic. These align with the upper surface of the recess creating a uniform surface on which the FNTD or PADC is placed. They are held into place either by a compression fit or with an adhesive. The PTFE acts as a reference converter in a way similar to its role with the OSL sensors. The HDPE surface created by the sled acts as a neutron converter similar to the way that an HDPE disc may be used as a converter material disc in an neutron-sensitive OSL. The lithium converter preferentially converts thermal and slow energy neutrons into recoil alpha particles and tritium ions from the Li-6(m,α)H-3 reaction. Both the FNTD and the PADC are held in place by small tabs that hook over the edges of the sensors. The FNTD or PADC may be engraved with ID numbers matching that of the sled and RFID tag.

In one embodiment of the present invention, the long sides of the dosimeter sled have protruding rails that are inserted into corresponding slots in the lower housing. The rails have beveled edges to permit easy movement into and out of the lower housing and provide a space for small amounts of dirt or dust to accumulate without impeding the sliding motion.

One rail has semicircular notches that align with the centers of each of the sensors. These permit a photodiode to sense when the sled is in the correct position for analysis in the OSL reader. The correct position is that which allows the stimulation light to fully illuminate the area of the OSLM in the sensor.

The trailing edge of the sled has a semicircular edge that provides extra light protection when reading the third sensor in the OSL reader. The rounded edge provides added extension of the sled beyond the edge of the light pipe thereby preventing stray light from entering the light pipe from the trailing edge of the sled into and out of the OSL reader. Some embodiments may omit this feature.

The leading edge has a U-shaped detent and a tang that engages with a tang and U-shaped detent, respectively, on a slider that pulls the dosimeter sled into and out of the housing for the OSL reader.

The openings over the sensors permit visual and electronic verification of the correct placement of the sensors by automated assembly equipment. An electrical contact is made to verify correct placement and a color sensor may be used to verify that a filter of a sensor is copper instead of aluminum or vice versa.

The upper housing is circular but may have molded facets to provide visual differentiation as to where the dosimeter is to be worn, e.g. circle for wrist, hexagonal facets for wearing on the body, etc.

The upper housing may have opposed loops of slots into which a strap of belt may be inserted for wearing on the wrist or other body part. One loop may be omitted so that a clip is inserted through the slot for attachment to clothing like an identification badge.

The housing will have a product identification or model number embossed or engraved.

The housing may have an alignment symbol to aid in properly positioning the dosimeter onto the dosimeter drawer of the dosimeter reader.

The housing may have a curved arrow showing the direction of rotation to disengage the threads holding the upper and lower housings together.

The housing may be constructed of polyoxymethylene (POM trade name Delrin® by Dupont), polycarbonate (Lexan), acetylbutylstyrene (ABS) or other suitable plastic material.

The upper housing will have a flat inner surface at an angle of 15 to 25 degrees from the bottom plane of the housing below the threads that will mate to a sealing material located on the lower housing so as to provide a watertight seal.

The upper housing will be threaded so that a 90° counterclockwise rotation will disengage the housing from the lower housing permitting the two pieces to be separated from each other.

In one embodiment, the present invention provides a radiation dosimeter with three OSL sensors: (1) a neutron-sensitive OSL sensor that senses gamma, x-ray and neutron radiation, (2) a reference sensor that senses only x-ray and gamma radiation and (3) a comparator OSL sensor for the reference sensor. The neutron-sensitive OSL sensor includes an OSLM that is mounted in an inner filter made of a first energy compensating material, such as aluminum. The inner filter is in turn mounted in an outer filter made of a second energy compensating material, such as copper. Placed between the inner compensating filter and the OSLM, either as a thin disc, thin layer or thin coating, is a converter material, such as high-density polyethylene, that converts neutrons into recoil protons that can be sensed by the neutron-sensitive OSL sensor. The reference OSL sensor is identical to the neutron-sensitive OSL sensor, except that instead of the converter material being placed between the inner compensating filter and the OSLM, a reference filter material, such as polytetrafluoroethylene, is placed between the inner compensating filter and the OSLM either as a thin disc, a thin layer or as a thin coating on the OSLM. The comparator OSL sensor is identical to the reference OSL sensor, except that the comparator OSL sensor does not include the outer filter of the reference OSL sensor.

In one embodiment, the neutron-sensitive OSL sensor, the reference OSL sensor, and the comparator OSL sensor may be mounted in a dosimeter sled that may be slid out of the radiation dosimeter to allow the three OSL sensors to be read using an OSL reader. The design of the dosimeter sled allows the three OSL sensors to be read from the same side, the exposed side of each OSL sensor where there is no filter covering the OSLM of the OSL sensor. Although in the embodiments shown below, the three OSL sensors are mounted in the dosimeter sled in the order: (1) neutron-sensitive OSL sensor, (2) reference OSL sensor, and (3) comparator OSL sensor, the three OSL sensors may be mounted in the dosimeter sled in any order.

In one embodiment of the present invention, the OSLM used in the OSL sensors is a specialized carbon-doped aluminum oxide ($Al_2O_3$:C) material manufactured by Landauer, Inc. (Glenwood, Ill.), and is similar to that marketed in dosimeters with trade names LUXEL+ and INLIGHT. The OSLM consists of specially formulated, proprietary, powderized $Al_2O_3$:C. For use in the OSL sensors of the present invention, the $Al_2O_3$:C material may be in the form a disc-shaped pellet.

Exposure of the $Al_2O_3$:C material in each of the three OSL sensors to ionizing radiation releases electrons that are trapped in defects in the material's crystal structure. The electrons are released from the traps when stimulated with 520±10 nm wavelength light (i.e. green). As they return to the ground state, 420±10 nm wavelength light (i.e. blue) is emitted. It should be noted that other light wavelengths could be employed, as could a pulsed stimulation system in reading the OSL sensors of the present invention.

The dosage of gamma ray and x-ray radiation received by the dosimeter and the individual who has been wearing the dosimeter may be determined from the emitted light from the second or reference OSL sensor and may be modified based on the results of reading the third comparator OSL sensor. The dosage of neutron radiation may be determined by subtracting the dosage value from reading the second OSL sensor from the dosage value from reading the first OSL sensor and multiplying the result by a calibration factor appropriate for the expected neutron energy spectrum.

In one embodiment of the present invention, a radiation dosimeter or part of a dosimeter, such as a dosimeter sled, includes an RFID tag. The RFID tag includes a radiofrequency (RF) antenna that allows the RFID tag to communicate with the RF antenna of an RFID tag reader to allow information/data to be read from the RFID tag by the RFID tag reader and to allow the RFID tag reader to store information on the RFID tag. In one embodiment of the present invention, the RFID tag includes a non-volatile data storage device, such as flash memory, that allows the RFID tag to store information about the radiation dosimeter and the wearer of the radiation dosimeter that enables the reading out of the radiation dosimeter by any reader without having to access a database to retrieve data needed to calculate the dose. When the RFID tag is part of a dosimeter sled, the RFID tag may be read while the sled is in the dosimeter. The dosimeter does not need to be disassembled nor the dosimeter sled removed to read data from and/or write data to the RFID tag. The RFID tag may be read when the dosimeter sled is in a reading position for one of the OSL sensors of the dosimeter sled or at a separate reading position for the RFID tag.

Although the RFID tag of the present invention is described for use with particular radiation dosimeters in the embodiments of the present invention are described below, the RFID tag may also be used with other types of radiation dosimeters. For example, the RFID tag may be used with badge-type, case-type and slide-type radiation dosimeters manufactured and sold by Landauer, Inc under the trade name InLight™. The RFID tag may also be used with radiation dosimeters employing a variety of dosimeter materials and/or dosimeter reading methods, including the dosimeter materials and dosimeter reading method described in: U.S. Pat. No. 5,354,997 to Miller, entitled "Method for Increased Sensitivity of Radiation Detection and Measurement," issued Oct. 11, 1994; U.S. Pat. No. 5,567,948 to Miller, entitled "Composite Material Dosimeters," issued Oct. 22, 1996; U.S. Pat. No. 5,569,927 to Miller, entitled "Composite Material Dosimeters," issued Oct. 29, 1996; and U.S. Pat. No. 5,731,590 to Miller, entitled "Metal Oxide Composite Dosimeter Method and Material," issued Mar. 24, 1998, and the entire contents and disclosures of these patents are incorporated herein by reference.

The RFID tag may store the results of the last several readouts, thereby enabling the dose history experienced by the wearer to be retrieved. The RFID tag may carry identification, date and time data to establish a chain of custody regarding who was assigned the dosimeter and when certain actions were performed on the dosimeter. In one embodiment of the present invention, the RFID tag may carry the following information: identification information for the dosimeter model, dosimeter serial number and an identification number for the individual to whom the dosimeter is assigned, calibration data for each OSL sensor, date and time information needed to estimate the buildup of background radiation dose, the total radiation dose and the dose from gamma rays and the dose from neutrons, date and time information regarding the assignment of the dosimeter to an individual, date and time information when the dosimeter was readout, and reader quality control data depicting the operability of the dosimeter reader during the analysis of the dosimeter including the unique reader identification number.

The RFID tag of the present invention may be read and written to using an appropriate RFID antenna and deciphering code either by the dosimeter reader or by a stand-alone RFID tag reader connected to a PC or other data input device. When the dosimeter is returned to a laboratory from the field, the dose results may be separately read out to verify the field results and the recent history of the dosimeter results obtained in the field reviewed to establish an accredited radiation dose record for archiving.

In one embodiment of the present invention, the RFID tag enables the dosimeter to be analyzed in remote areas where there is no access to databases containing information needed for the correct analysis of the dosimeter. The RFID tag carries the history of the analysis of the dosimeter so that a dose reconstruction can be performed. The RFID tag has a limited range of readout to avoid detection of the dosimeter during covert operations.

In one embodiment, the dosimeter reader may communicate with a database separated from the dosimeter reader. The dosimeter reader may communicate with the separate database in a variety of ways such as: wireless communication, communicating via an optical fiber, communicating over a wire, communicating over the Internet, communicating over a phone line, etc.

In some embodiments of the present invention a dosimeter may be given to and worn by an individual before the dosimeter is assigned to the individual in the database. In such cases, the database may be updated with the name and other identification such as social security number, dog tag number, etc., for the individual to whom the dosimeter has been assigned at a later date. The database may even be updated the first time that the dosimeter is read by a dosimeter reader.

In one embodiment, the dosimeter reader of the present invention is battery operated and can be moved during analysis. The dosimeter reader displays the results of the analysis, performs Pulsed Optically Stimulated Luminescence (POSL) processes, stores results of analyses, writes results of dosimeter analysis to an RFID chip on the dosimeter sled, has an output mechanism, such as a USB plug, whereby data may be downloaded into a remote database or PC and reader settings may be uploaded to the dosimeter reader. The dosimeter reader may be light-weight and/or water-tight and/or floatable. The dosimeter reader may be read out at various angles from the horizontal and includes a display and buttons for operation.

In one embodiment of the present invention, the dosimeter reader includes stimulation light monitoring and ambient light monitoring. Stimulation light monitoring may be conducted by a photodiode to which a fraction of the stimulation light is routed. The response of the photodiode is monitored and compared to a reference value obtained for the correct stimulation light level. Ambient light monitoring may be conducted by performing the luminescence counting routine without applying any stimulation light to the OSL sensor. The dosimeter reader of the present invention may employ pulses of varying duration and frequency. The dosimeter reader may also check for luminescence intensity to select an alternative POSL scheme. Luminescence intensity may be used to select an alternative POSL scheme by performing the analytical process for a small fraction of the normal analysis time and comparing the result to a reference value that instructs the reader to operate the stimulation light at a given frequency and pulse duration that increases or decreases the luminescence light created by the stimulation light thereby maintaining an optimum amount of light for the light sensing system e.g. photomultiplier tube. The measurement off the luminescence intensity may be very brief, i.e. less than about 10% of the time required to read an OSL sensor.

Figure 2:
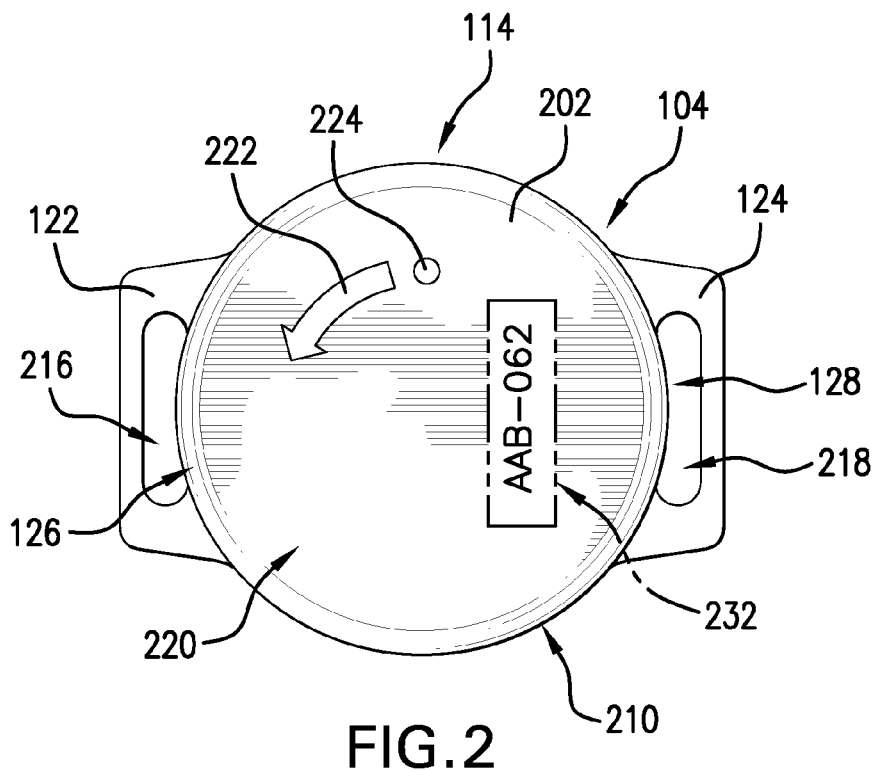
FIG. 2 is an image of the top of the radiation dosimeter of FIG. 1 and of the top of the upper housing of the radiation dosimeter of FIG. 1.

FIGS. 1 and 2 show a radiation dosimeter 102 according to one embodiment of the present invention including an upper housing 104 and a lower housing 106 mounted in upper housing 1. FIG. 1 shows bottom 112 of radiation dosimeter 102, and FIG. 2 shows top 114 of dosimeter 102. Upper housing 104 includes a circular body 120 and two generally trapezoidal-shaped loops 122 and 124 located on respective opposite sides 126 and 128 of circular body 120. A dashed orientation line 130 is shown drawn through the middle of and perpendicular to loops 122 and 124. Lower housing 106 has three circular recesses 142, 144 and 146 between opposite sides 148 and 150 of lower housing 106. A dashed orientation line 152 is shown drawn through the middle of circular recesses 142, 144 and 146.

Figure 3:
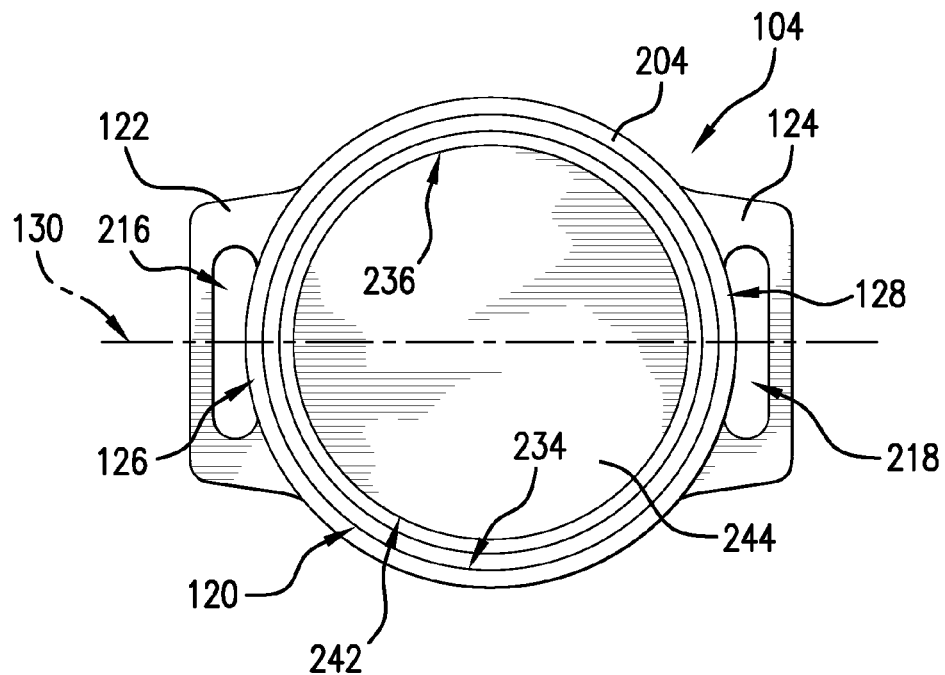
FIG. 3 is an image of the bottom of the upper housing of FIG. 2.

FIGS. 2 and 3 show upper housing top 202 and upper housing bottom 204 of upper housing 104. Upper housing top 202 corresponds to top 114 of radiation dosimeter 102. Loops 122 and 124 have respective openings 216 and 218 through which a strap member (not shown) may be threaded so that radiation dosimeter 102 may be worn on the wrist of an individual. Upper housing top 202 has a flat circular upper surface 220 and includes a curved arrow 222 and a circular alignment symbol 224. Also included on upper housing 104 are etched alphanumeric identification indicia 232. Circular interior wall 234 of upper housing bottom 204 includes interior screw threads 236. Interior wall 234 surrounds a circular recess 242 with a flat bottom 244.

The Identification indicia may identify the radiation dosimeter and/or the individual wearing the radiation dosimeter.

The body of upper housing of FIGS. 2 and 3 is made of polyoxymethylene (POM) sold under the trade name Delrin® by Dupont. However, in other embodiments, the body of the upper housing may be made of polycarbonate, polyethylene, styrene or other durable plastic materials.

Figure 4:
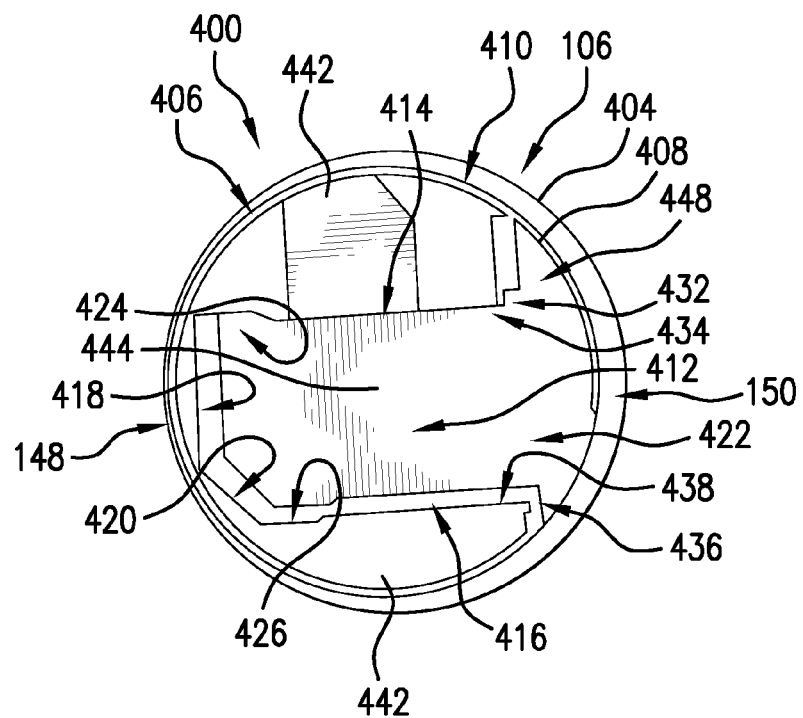
FIG. 4 is an image of the top of the lower housing of the radiation dosimeter of FIG. 1.
Figure 5:
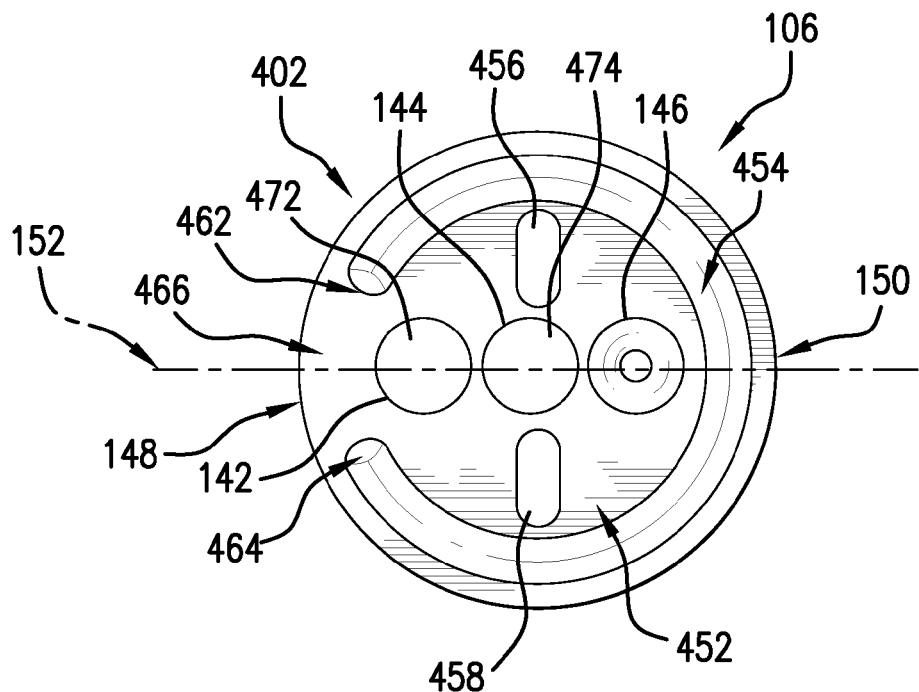
FIG. 5 is an image of the bottom of the lower housing of FIG. 4.

FIGS. 4 and 5 show a lower housing top 400 and a lower housing bottom 402 of lower housing 106. Lower housing 106 has a circular base 404 and an upper structure 406. Upper structure 406 has a circular exterior wall 408 that has screw threads 410 spaced around the circumference thereof. Lower housing top 400 includes a generally punch card-shaped sled recess 412 having two opposite lateral sides 414 and 416, an end wall 418 perpendicular to lateral sides 414 and 416, a slanted corner wall 420 and an open end 422. Lateral side 414 includes an indentation 424. Lateral side 416 includes an indentation 426. Lateral side 414 includes a groove 432 and an upper lip 434 that run along the length of lateral side 414. Lateral side 416 includes a groove 436 and an upper lip 438 that run along the length of lateral side 416. Lower housing upper structure 406 includes an upper flat surface 442 and a lower flat surface 444. Lower flat surface 444 is exposed by sled recess 412 and the absence of upper flat surface 442 in exposed edge region 448. Lower housing bottom 402 has a flat bottom surface 452, circular recesses 142, 144 and 146, a C-shaped groove 454 and two lozenge-shaped recesses 456 and 458. Opposite ends 462 and 464 of C-shaped groove 454 are separated by a gap 466. Respective circular copper filter discs 472 and 474 are inserted in circular recesses 142 and 144 and serve as energy compensating filters. Copper filter discs 472 and 474 are held in place in circular recesses 142 and 144 by press fitting, by being molded in place or by using an adhesive.

The body of the lower housing of FIGS. 4 and 5 is made of polyoxymethylene (POM) sold under the trade name Delrin® by Dupont. However, in other embodiments, the body of the lower housing may be made of polycarbonate, polyethylene, styrene or other durable plastic materials.

Figure 6:
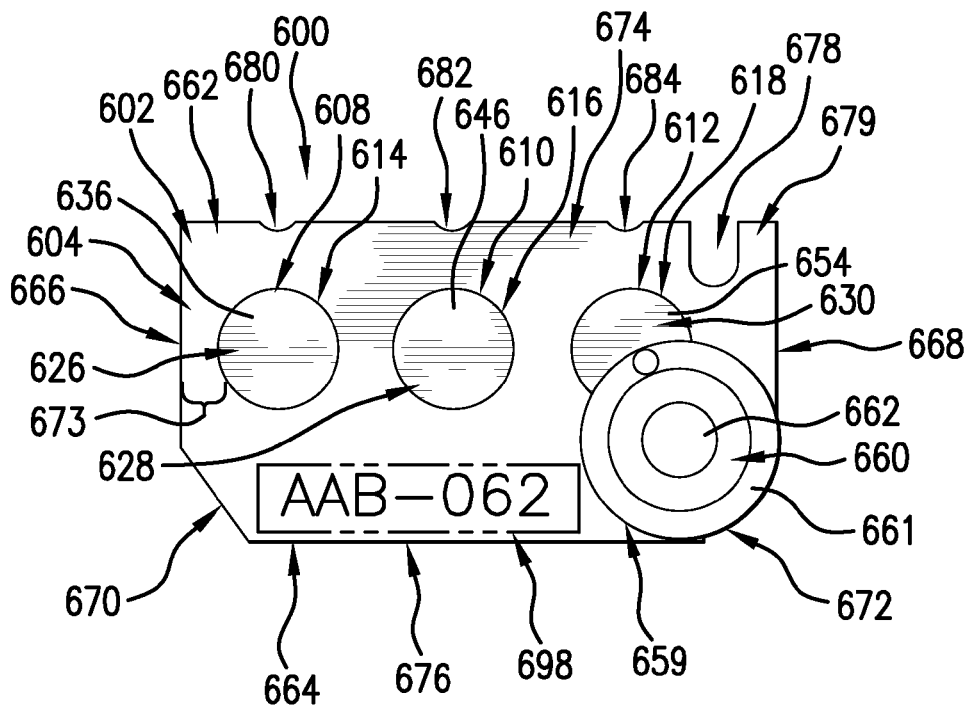
FIG. 6 is an image of the top of the sled of the radiation dosimeter of FIG. 1.
Figure 7:
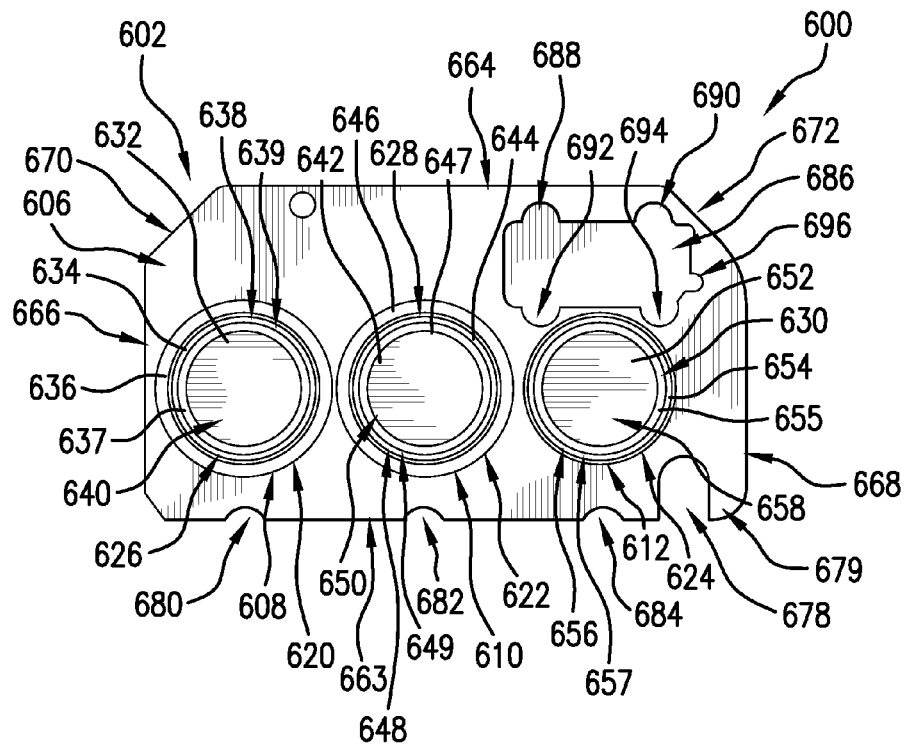
FIG. 7 is an image of the bottom of the sled of FIG. 6.

FIGS. 6 and 7 show dosimeter sled 600 according to one embodiment of the present invention including a sled body 602, a sled top face 604 and a sled bottom face 606 that are opposite each other. Sled body 602 includes three openings 608, 610 and 612. Openings 608, 610 and 612 include respective top portions 614, 616 and 618 and respective bottom portions 620, 622 and 624. A neutron-sensitive OSL sensor 626, a reference OSL sensor 628 and a comparator OSL sensor 630 are mounted in openings 608, 610 and 612, respectively, and are held in place by pressing neutron-sensitive OSL sensor 626, reference OSL sensor 628 and comparator OSL sensor 630 into sled body 602. Because top portions 614, 616 and 618 are smaller than respective bottom portions 620, 622 and 624 of respective openings 608, 610 and 612, neutron-sensitive OSL sensor 626, reference OSL sensor 628 and comparator OSL sensor 630 abut respective circular ledges (not visible in FIGS. 6 and 7) formed openings 608, 610 and 612 by top portions 614, 616 and 618, respectively.

Although the OSL sensors in the embodiment of the present invention of FIGS. 6 and 7 are held in the sled by press fitting, in other embodiments the OSL sensors may be held in place with an adhesive. In other embodiments, the OSL sensors may be molded in place so that the OSL sensors are each fully captured by the plastic sled.

Neutron-sensitive OSL sensor 626 includes a disc-shaped pellet of OSLM 632, a converter material disc (not visible in FIGS. 6 and 7), a cylindrical cup-shaped inner filter 634 and a cylindrical cup-shaped outer filter 636. OSLM 632 and the converter material disc are held in place in inner filter 634 by a retaining ring 637. The converter material disc is sandwiched between OSLM 632 and inner filter 634. Retaining ring 637 is a spring-type retaining ring and is held in place in inner filter 634 by compression. When retaining ring 637 is compressed in inner filter 634, ends 638 and 639 of retaining ring 637 abut each other. Inner filter 634 is mounted and held in outer filter 636 by press fitting inner filter 634 into outer filter 636. OSLM 632 has a filtered side (not visible in FIGS. 6 and 7), the side of OSLM 632 filtered by the converter material disc, inner filter 634 and outer filter 636. Neutron-sensitive OSL sensor 626 has an exposed side 640, shown in FIG. 7, which allows the combined dosage of x-ray, gamma and neutron radiation to which OSLM 632 has been exposed to be read by an OSL reader. Retaining ring 637 is mounted on exposed side 640 of OSLM 632. OSLM 632 comprises an $Al_2O_3$:C material. Inner filter 634 is made of aluminum. Outer filter 636 is made of copper. Retaining ring 637 is made of stainless steel. The converter material disc is a thin disc made of high-density polyethylene.

Reference OSL sensor 628 includes a disc-shaped pellet of OSLM 642, a reference filter material disc (not visible in FIGS. 6 and 7), a cylindrical cup-shaped inner filter 644 and a cylindrical cup-shaped outer filter 646. OSLM 642 and the reference filter material disc are held in place in inner filter 644 by a retaining ring 647. The reference filter material disc is sandwiched between OSLM 642 and inner filter 644. Retaining ring 647 is a spring-type retaining ring and is held in place in inner filter 644 by compression. When retaining ring 647 is compressed in inner filter 644, ends 648 and 649 of retaining ring 647 abut each other. Inner filter 644 is mounted and held in outer filter 646 by press fitting inner filter 644 into outer filter 646. OSLM 642 has a filtered side (not visible in FIGS. 6 and 7), the side of OSLM 642 filtered by the reference filter material disc, inner filter 644 and outer filter 646. OSLM 642 has an exposed side 650 that establishes an optical pathway, shown in FIG. 7, which allows the combined dosage of x-ray and gamma radiation to which OSLM 642 has been exposed to be read by an OSL reader. Retaining ring 647 is mounted on exposed side 650 of OSLM 642. OSLM 642 comprises an $Al_2O_3$:C material. Inner filter 644 is made of aluminum. Outer filter 646 is made of copper. Retaining ring 647 is made of stainless steel. The reference filter material disc is a thin disc made of polytetrafluoroethylene.

Comparator OSL sensor 630 includes a disc-shaped pellet of OSLM 652, a reference filter material disc (not visible in FIGS. 6 and 7), and a cylindrical cup-shaped filter 654. OSLM 652 and the reference material filter disc are held in place in filter 654 by a retaining ring 655. The reference filter material disc is sandwiched between OSLM 652 and filter 654. Retaining ring 655 is a spring-type retaining ring and is held in place in inner filter 644 by compression. When retaining ring 655 is compressed in filter 654, ends 656 and 657 of retaining ring 655 abut each other. OSLM 652 has a filtered side (not visible in FIGS. 6 and 7), the side of OSLM 652 filtered by the reference filter material disc and filter 654. OSLM 652 has an exposed side 658, shown in FIG. 7, which allows the combined dosage of x-ray and gamma radiation to which OSLM 652 has been exposed to be read by an OSL reader. Retaining ring 655 is mounted on exposed side 658 of OSLM 652. OSLM 652 comprises an $Al_2O_3$:C material. Filter 654 is made of aluminum. Retaining ring 655 is made of stainless steel. The reference filter material disc is a thin disc made of polytetrafluoroethylene.

Neutron-sensitive OSL sensor 626 is identical to reference OSL sensor 628, except for the substitution of the polytetrafluoroethylene disc in reference OSL sensor 628 for the high-density polyethylene disc in neutron-sensitive OSL sensor 626. Comparator OSL sensor 630 is identical to reference OSL sensor 628, except that filter 654 is not mounted in an outer filter. In comparator OSL sensor 630, filter 654 functions as an outer filter.

Neutron-sensitive OSL sensor 626, reference OSL sensor 628 and comparator OSL sensor 630 are similar to each other in that they have the same OSLM disc, the same cylindrical cup-shaped inner filter and the same retaining ring. Neutron-sensitive OSL sensor 626, reference OSL sensor 628 and comparator OSL sensor 630 also each include a disc of filter material sandwiched between the OSLM disc and the inner filter. This similarity in the components making up each of the OSL sensors maintains a consistent optical condition of reflection and scattering of the stimulation and luminescence light within the sensor.

Mounted in a nearly circular recess 659 in sled top face 604 is a round Radio Frequency ID (RFID) tag 660. RFID tag 660 is held in place in recess 659 by a double-sided contact adhesive film manufactured by 3M. RFID tag 660 includes an antenna 661 and a memory chip 662. Sled body 602 has two parallel lateral sides 663 and 664, two parallel straight end sides 666 and 668, and two slanted corner sides 670 and 672. Between neutron-sensitive OSL sensor 626 and straight end side 666 end is a region 673. Lateral side 663 includes a rail 674 along the length of lateral side 663 on the bottom half of lateral side 663. Rail 674 protrudes from lateral side 663. Lateral side 664 includes a rail 676 along the length of lateral side 664 on the bottom half of lateral side 664. Rail 676 protrudes from lateral side 664. Lateral side 663 includes a U-shaped detent 678 and a tang 679 near end side 668. Rail 674 includes three semicircular positioning notches 680, 682 and 684. Sled bottom face 606 includes a recess 686 including indentations 688, 690, 692, 694 and 696. Sled top face 604 includes alphanumeric identification indicia 698 that match alphanumeric identification indicia 232 on upper housing 104.

Although a double-sided contact adhesive film is used to hold the RFID tag in place on the dosimeter sled in embodiment of the present invention are described above and shown in FIGS. 6 and 7, the RFID tag may be held on the dosimeter sled by other means. For example, the RFID tag may be adhered to the dosimeter sled using a UV cured adhesive placed along the outside of the RFID tag.

In one embodiment of the present invention, when OSL sensors 626, 628 and 630 are being read in turn by a dosimeter reader, positioning notches 680, 682 and 684 may be used to properly position each OSL sensor in turn within an OSL reader. Positioning notch 680 may be used to properly position neutron-sensitive OSL sensor 626 within the dosimeter reader. Positioning notch 682 may be used to properly position Reference OSL sensor 628 within the OSL reader. Positioning notch 684 may be used to properly position comparator OSL sensor 630 with the dosimeter reader.

In one embodiment of the present invention, the positioning notches may be used to align the OSL sensors with the optical path of the OSL reader so that the stimulation light and luminescence light are consistently applied and captured. As the dosimeter sled is moved into the OSL reader, the notches open up a light path for a photo-optic sensor to complete an electrical circuit whereby the dosimeter reader control system knows that the OSL sensor is correctly positioned over the photo-engine of the OSL reader to permit analysis.

Figures 8, 9:
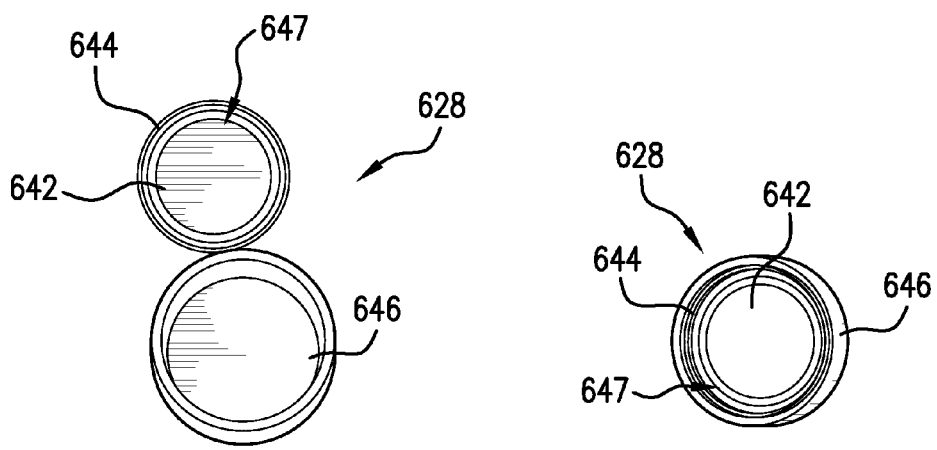
FIG. 8 is an image of the reference OSL sensor the sled of FIG. 6 showing the reference OSL sensor in a disassembled state.
FIG. 9 is an image of the reference OSL sensor of FIG. 6 in an assembled state.

FIG. 8 shows reference OSL sensor 628 in a disassembled state with inner filter 644 removed from outer filter 646. FIG. 9 shows reference OSL sensor 628 in an assembled state with inner filter 644 mounted in outer filter 646. Not visible in FIGS. 8 and 9 is the disc of polytetrafluoroethylene sandwiched between OSLM 642 and inner filter 644. Due to glare in the images of FIGS. 8 and 9, retaining ring 647 is not easily visible in FIGS. 8 and 9.

In FIG. 8, the combination of OSLM 642, the polytetrafluoroethylene disc (not visible in FIG. 8), inner filter 644 and retaining ring 647 also corresponds to the assembled state of comparator OSL sensor 630.

Figure 10:
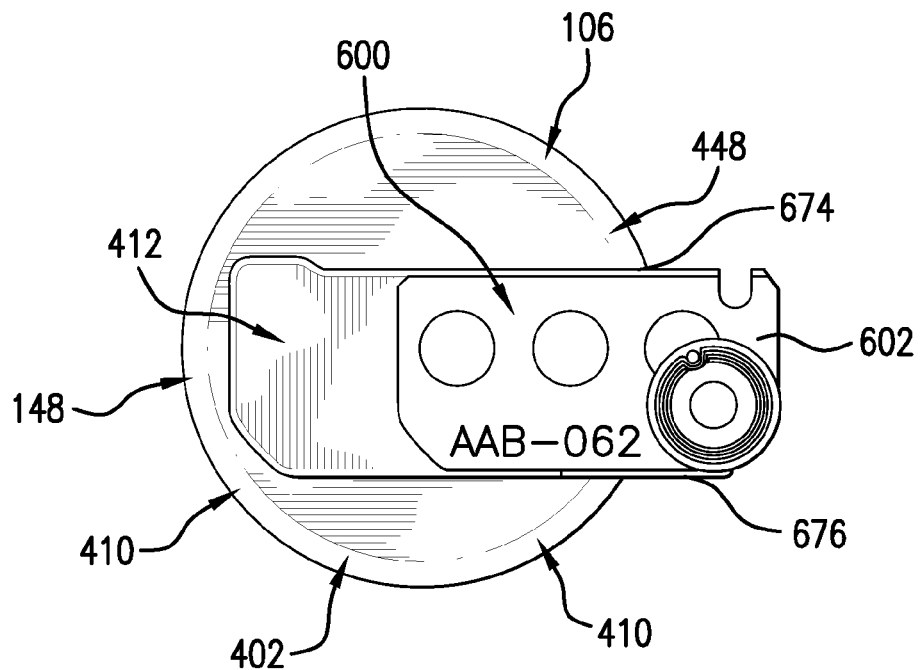
FIG. 10 is an image of the sled of FIG. 6 being slid into the lower housing of FIG. 4.

FIG. 10 shows dosimeter sled 600 being slid into sled recess 412 of lower housing 106. Rail 674 of dosimeter sled 600 slides in groove 432 beneath upper lip 434 of lower housing 106. Rail 676 of dosimeter sled 600 slides in groove 436 beneath upper lip 438 of lower housing 106.

Figure 11:
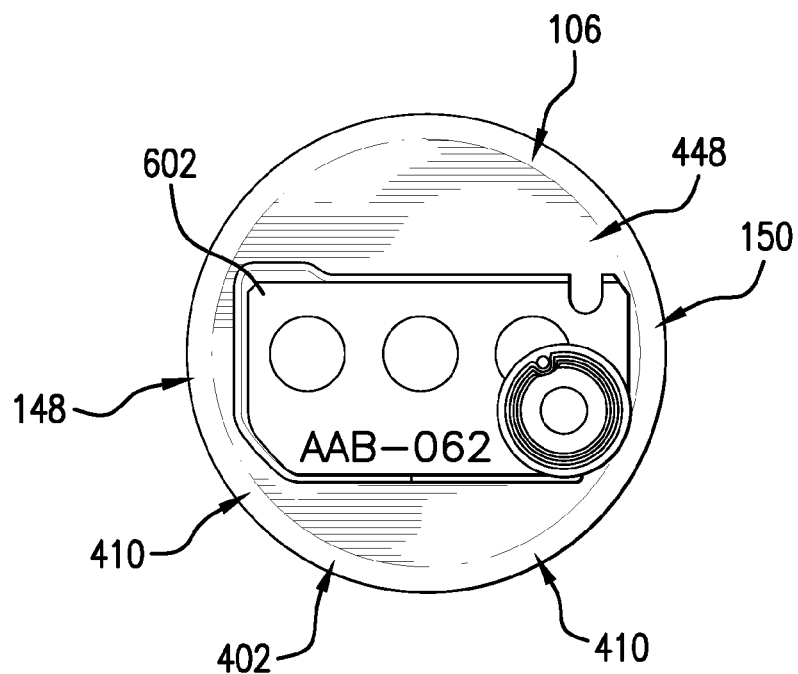
FIG. 11 is an image of the dosimeter sled of FIG. 6 fully slid into the lower housing of FIG. 4.

FIG. 11 shows dosimeter sled 602 fully slid into sled recess 412 so that end side 666 of dosimeter sled body 602 abuts end wall 418 of lower housing 106 and slanted corner side 670 of dosimeter sled 602 abuts corner wall 420 of lower housing 106, i.e., dosimeter sled 602 has a shape that complementarily fits sled recess 412. In the configuration shown in FIG. 11, dosimeter sled 602 is considered "mounted" in lower housing 106. In the configuration shown in FIG. 11, copper filter discs 472 and 474 of lower housing 106 are positioned directly below neutron-sensitive OSL sensor 626 and reference OSL sensor 628, respectively of dosimeter sled 602 and circular recess 146 of lowering housing 106 is positioned directly below comparator OSL sensor 630 of dosimeter sled 602.

There is no copper filter disc in circular recess 146, because comparator OSL sensor 630 may be used to adjust the dose determined by reference OSL sensor 628 at very low energies of x-rays. Therefore, unlike for neutron-sensitive OSL sensor 626 and reference OSL sensor 628, it is undesirable for there to be a filter mounted in lower housing bottom 402 beneath comparator OSL sensor 630.

In an alternative embodiment of the present invention, instead of using two copper filter discs, a rectangular filter plate may be mounted in a rectangular plate recess in the sled recess of the lower housing. As with the copper filter discs, the filter plate shields are located between the neutron-sensitive OSL sensor and the reference OSL sensor when the dosimeter sled is fully slid into the sled recess. By mounting the filter plate in a less exposed position in the lower housing, the filter plate is better protected than the copper filter discs which are externally exposed on the bottom of the lower housing of the dosimeter.

Lower housing 106, with dosimeter sled 602 slid/mounted therein, may be mounted in upper housing 104 by screwing lower housing 106 into upper housing 104 using threads 236 of upper housing 104 and screw threads 410 of lower housing 106. Lower housing 106 is held in place in upper housing 104, when orientation line 130 of upper housing 104 is parallel to orientation line 152 of lower housing 106. Upper housing 104 can be separated from lower housing 106 by grasping loops 122 and 124 and turning upper housing 90° counterclockwise so that upper housing 104 and lower housing are oriented as shown in FIG. 1. In the configuration shown in FIG. 1, orientation line 130 is perpendicular to orientation line 152 and upper housing 104 is in a released position relative to lower housing 106.

Figure 12:
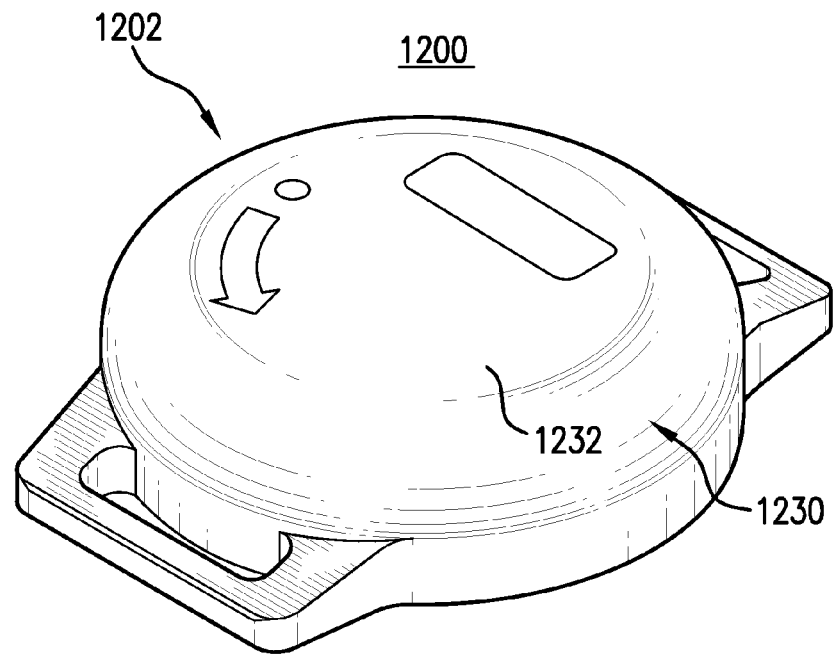
FIG. 12 is a top perspective view of an upper housing of a radiation dosimeter according to one embodiment of the present invention.
Figure 13:
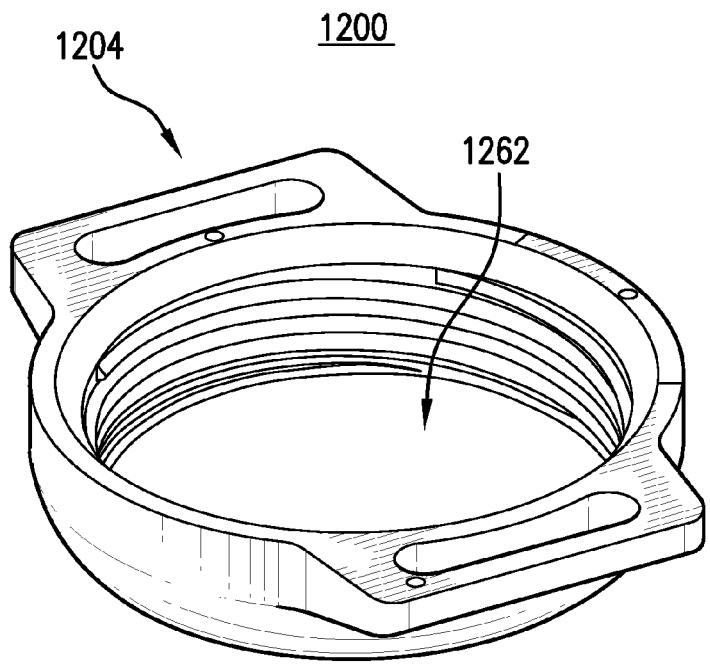
FIG. 13 is a bottom perspective view of the upper housing of FIG. 12.
Figure 14:
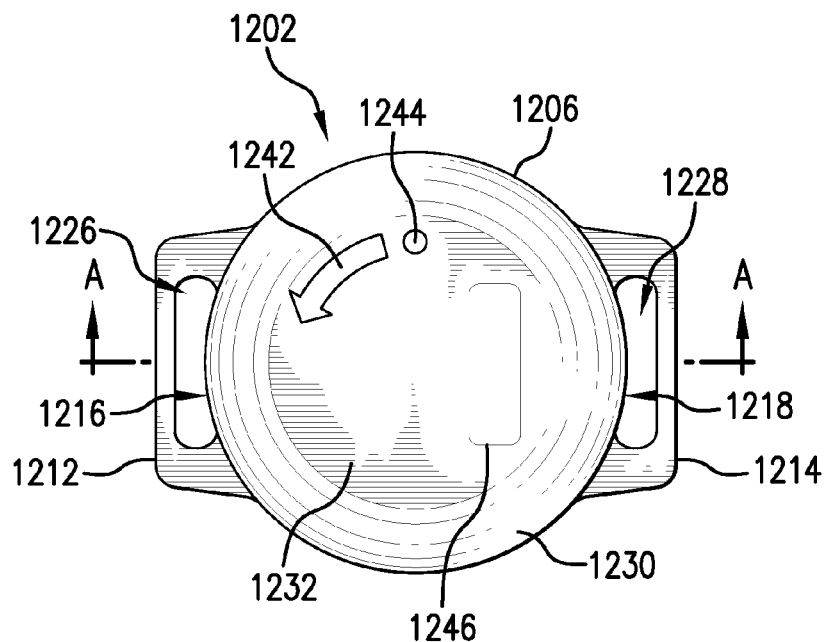
FIG. 14 is a top plan view of the upper housing of FIG. 12.
Figure 15:
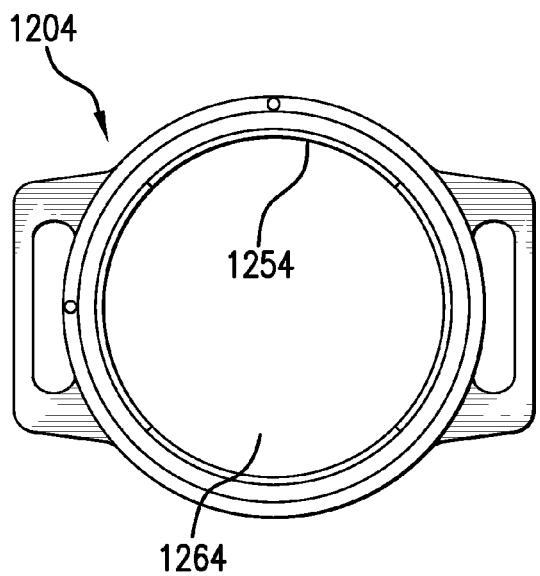
FIG. 15 is a bottom plan view of the upper housing of FIG. 12.
Figure 16:
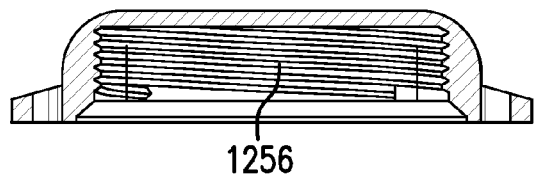
FIG. 16 is a cross-sectional view of the upper housing of FIG. 12 taken along line A-A of FIG. 14.

FIGS. 12, 13, 14, 15 and 16 show an upper housing 1200 of a radiation dosimeter according to one embodiment of the present invention. FIGS. 12 and 14 show upper housing top 1202. FIGS. 13 and 15 show upper housing bottom 1204. Upper housing 1200 includes a circular body 1206 and two generally trapezoidal-shaped loops 1212 and 1214 located on respective opposite sides 1216 and 1218 of circular body 1206. Loops 1212 and 1214 have respective openings 1226 and 1228 through which a strap member (not shown) may be threaded so that the dosimeter may be worn on the wrist of an individual. Upper housing top 1202 has a circular contoured portion 1230 and a flat circular upper surface 1232 and includes a curved arrow 1242, a circular alignment symbol 1244 and a shallow rounded rectangular recess 1246. In one embodiment of the present invention, a label with alphanumeric identification indicia (not shown) may be adhered to upper housing top 1202 in shallow rounded rectangular recess 1246. In another embodiment of the present invention, alphanumeric identification indicia (not shown) may be engraved in shallow rounded rectangular recess 1246. Circular interior wall 1254 of upper housing bottom 1204 includes interior screw threads 1256. Interior wall 1254 surrounds a circular recess 1262 with a flat bottom 1264.

Figure 17:
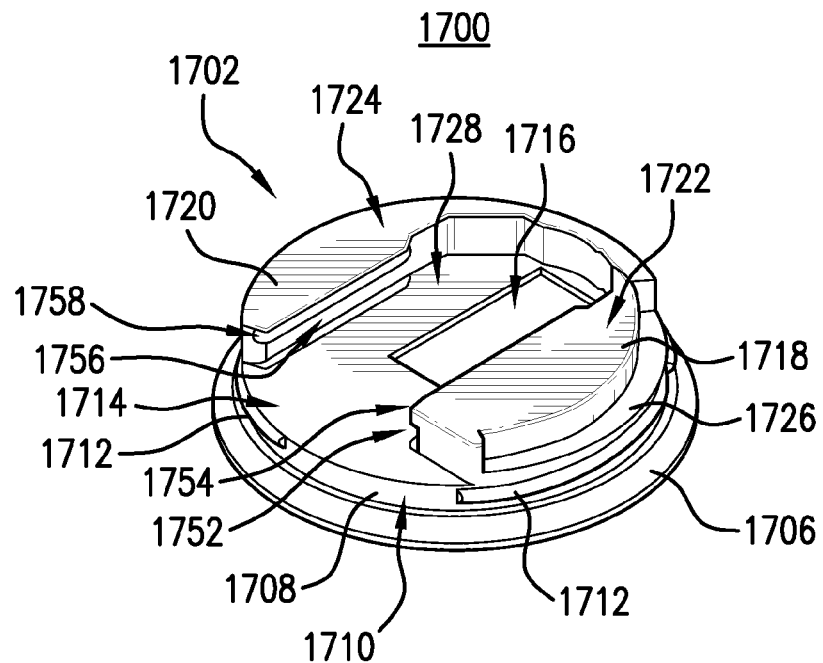
FIG. 17 is a top perspective view of a lower housing of a radiation dosimeter according to one embodiment of the present invention.
Figure 18:
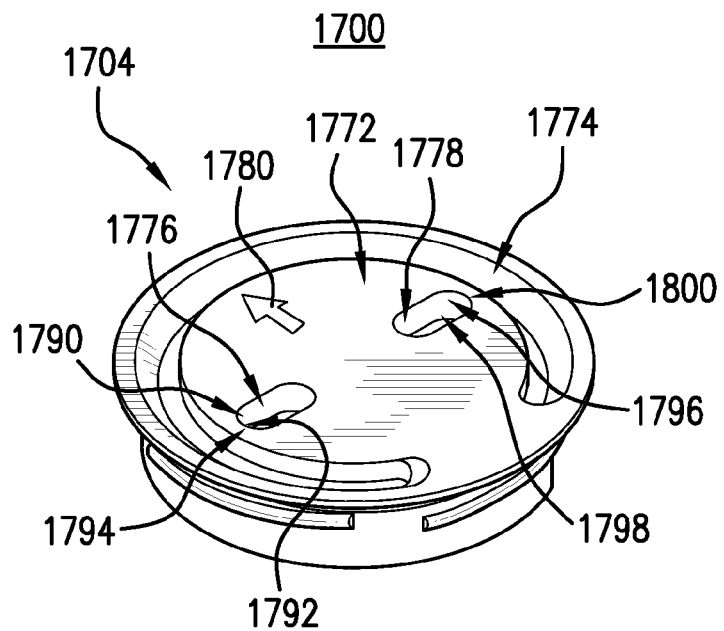
FIG. 18 is a bottom perspective view of the lower housing of FIG. 17.
Figure 19:
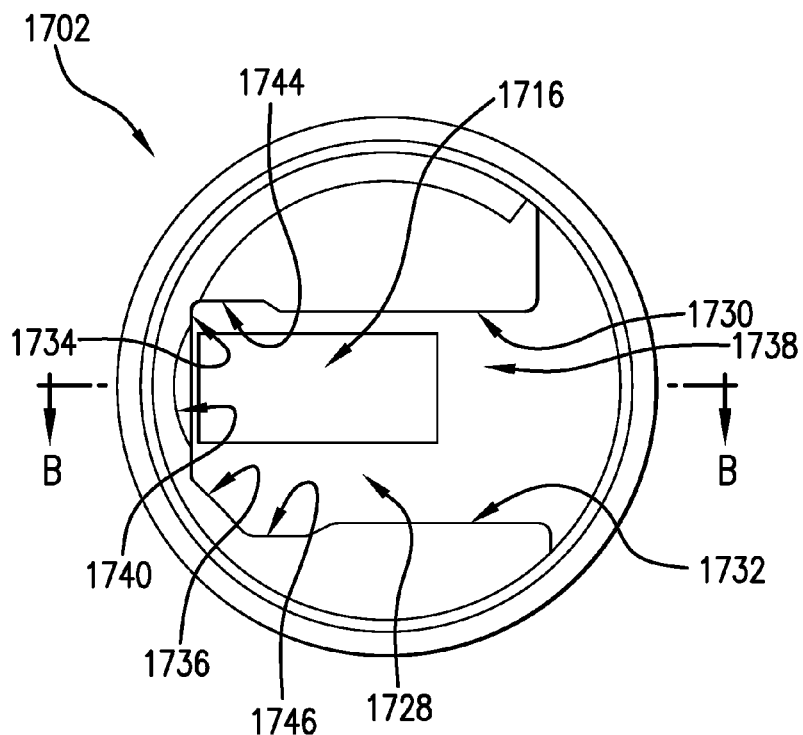
FIG. 19 is a top plan view of the lower housing of FIG. 17.
Figure 20:
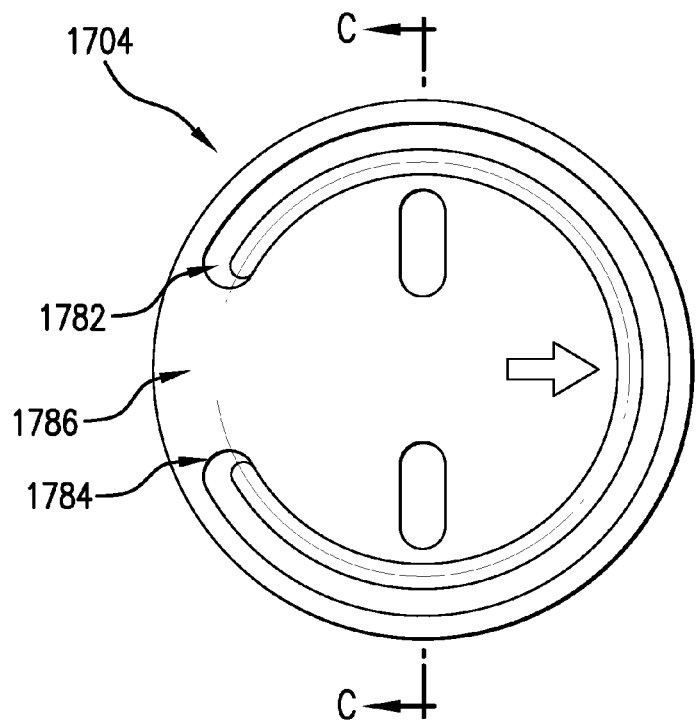
FIG. 20 is a bottom plan view of the lower housing of FIG. 17.
Figure 21:
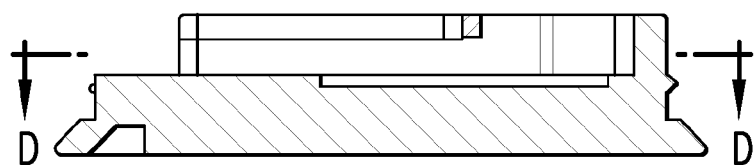
FIG. 21 is a cross-sectional view of the lower housing of FIG. 17 taken along line B-B of FIG. 19.
Figure 22:
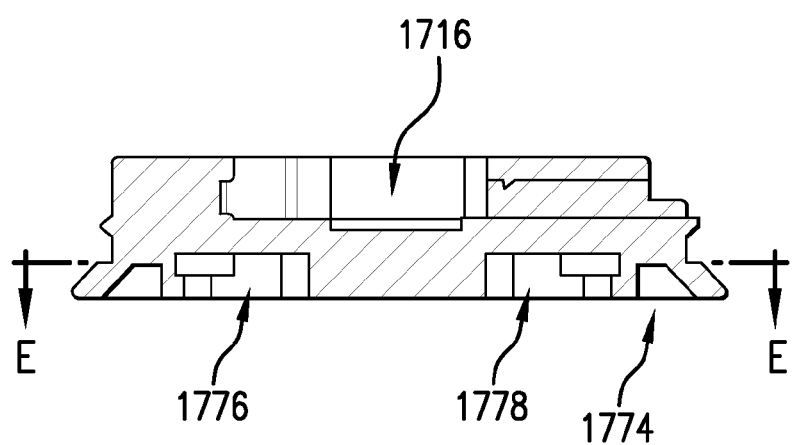
FIG. 22 is a cross-sectional view of the lower housing of FIG. 17 taken along line C-C of FIG. 20.
Figure 23:
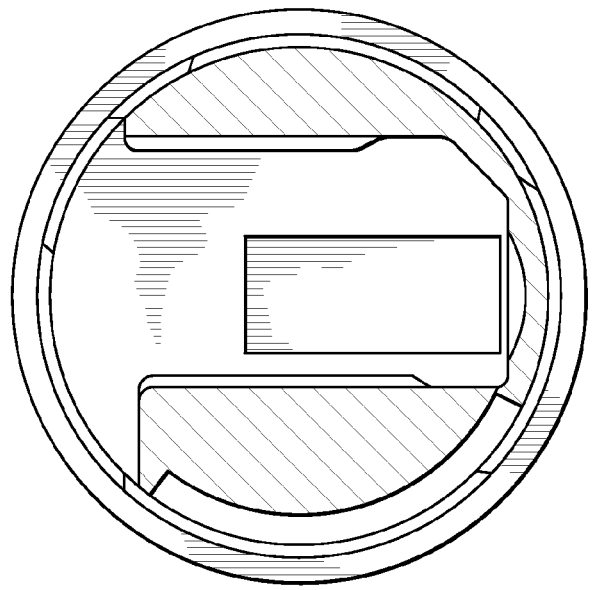
FIG. 23 is a cross-sectional view of the lower housing of FIG. 17 taken along line D-D of FIG. 21.
Figure 24:
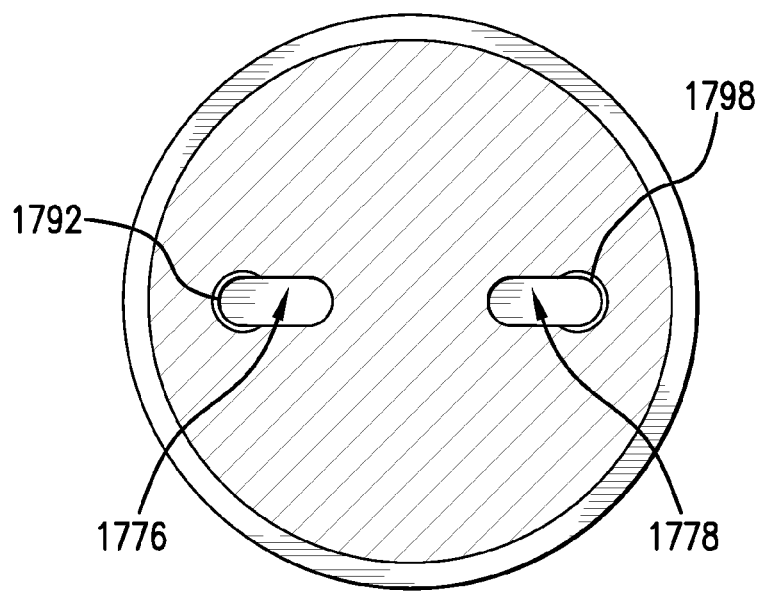
FIG. 24 is a cross-sectional view of the lower housing of FIG. 17 taken along line E-E of FIG. 22.

FIGS. 17, 18, 19, 20, 21, 22, 23 and 24 show a lower housing 1700 according to one embodiment of the present invention. FIGS. 17 and 19 show a lower housing top 1702. FIGS. 18 and 20 show a lower housing bottom 1704. Lower housing 1700 includes a circular lower housing base 1706, a circular disc-shaped platform 1708 having a circular lower exterior wall 1710 that has screw threads 1712 spaced around the circumference thereof. Platform 1708 has a flat upper surface 1714 with a rectangular filter plate recess 1716. A thin rectangular energy compensating filter plate (not shown FIGS. 17, 18, 19, 20, 21, 22, 23 and 24) may be mounted in filter plate recess 1716. On top of upper surface 1714 are two upper structures 1718 and 1720, which have respective upper surfaces 1722 and 1724. Upper structure 1718 includes a curved exterior rail 1726. Upper structures 1718 and 1720 define a sled recess 1728 having two opposite lateral sides 1730 and 1732, an end wall 1734, a slanted corner wall 1736 and an open end 1738. End wall 1734 includes a curved wall portion 1740. Lateral side 1730 includes an indentation 1744. Lateral side 1732 includes an indentation 1746. Lateral side 1730 includes a groove 1752 and an upper lip 1754 that run along the length of lateral side 1730. Lateral side 1732 includes a groove 1756 and an upper lip 1758 that run along the length of lateral side 1732. Lower housing bottom 1704 has a flat bottom surface 1772, a C-shaped groove 1774, two lozenge-shaped recesses 1776 and 1778, and an etched arrow 1780. Opposite ends 1782 and 1784 of C-shaped groove 1774 are separated by a gap 1786. Lozenge-shaped recess 1776 includes a lip 1790 and an undercut 1792 at an outside end 1794 of lozenge-shaped recess 1776. Lozenge-shaped recess 1778 includes a lip 1796 and an undercut 1798 at an outside end 1800 of recess 1778. Filter plate recess 1716 is located within sled recess 1728 so that a filter plate (not shown) mounted in filter plate recess 1716 will provide shielding to the neutron-sensitive OSL sensor and the reference OSL sensor of a dosimeter sled (not shown FIGS. 17, 18, 19, 20, 21, 22, 23 and 24) slid into sled recess 1728.

Figure 25:
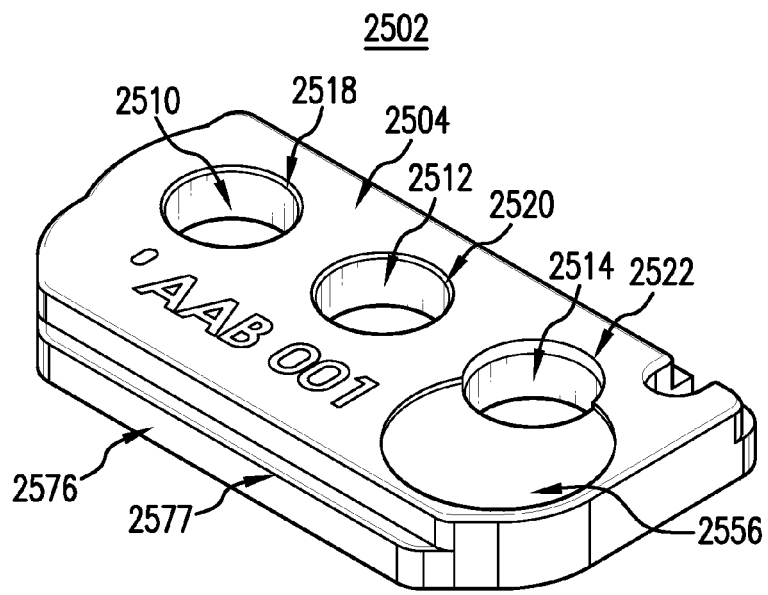
FIG. 25 is a top perspective view of a dosimeter sled body of a dosimeter according to one embodiment of the present invention.
Figure 26:
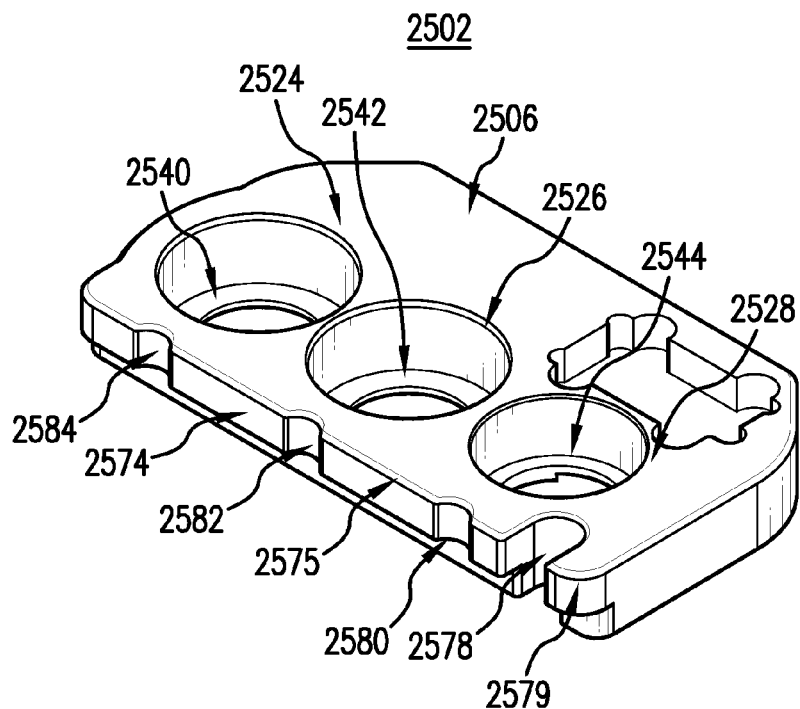
FIG. 26 is a bottom perspective view of the dosimeter sled body of FIG. 25.
Figure 27:
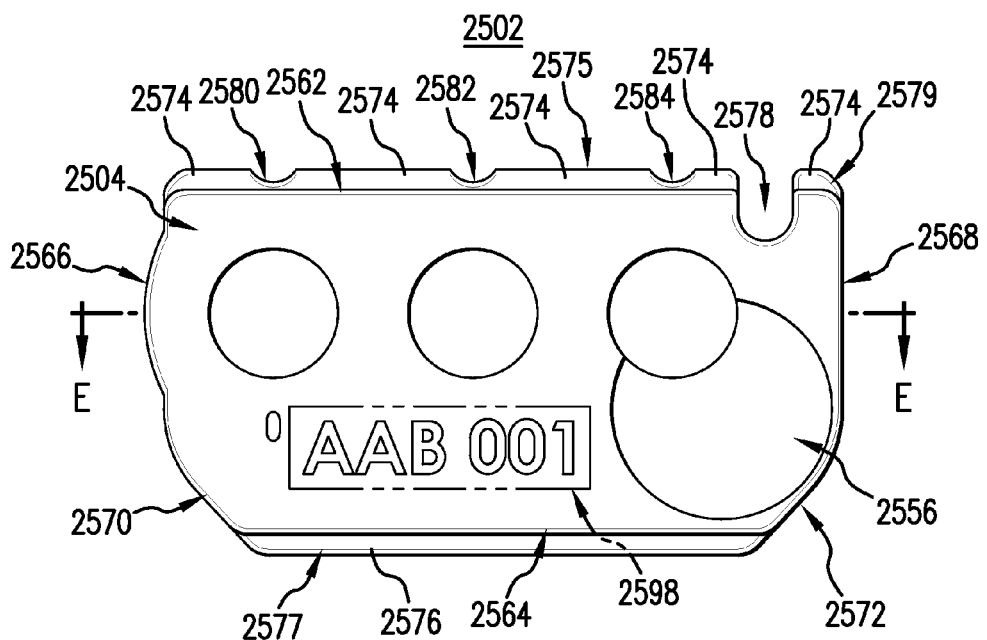
FIG. 27 is a top plan view of the dosimeter sled body of FIG. 25.
Figure 28:
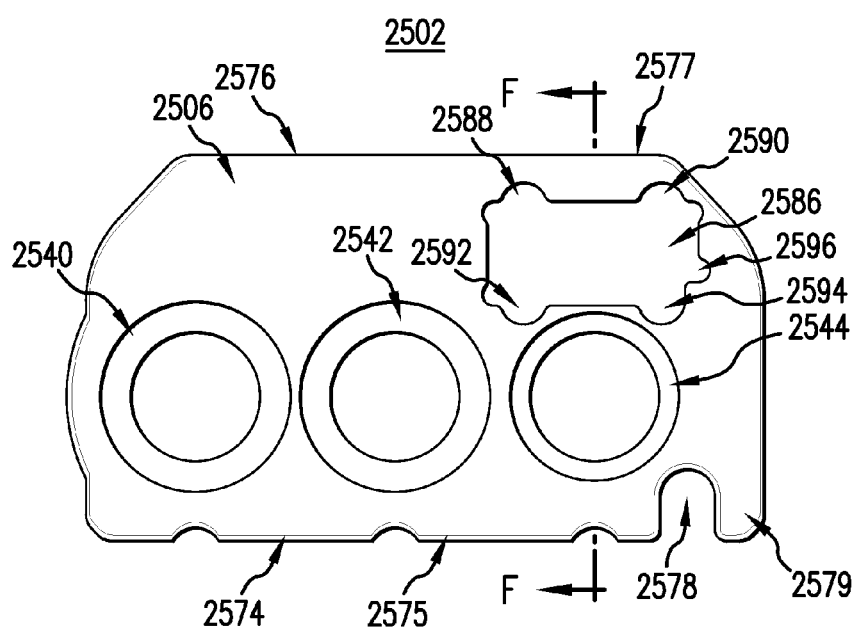
FIG. 28 is a bottom plan view of the dosimeter sled body of FIG. 25.
Figure 29:
FIG. 29 is a side view of the dosimeter sled body of FIG. 25.
Figure 30:
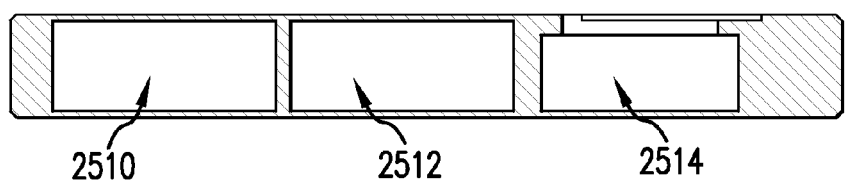
FIG. 30 is a cross-sectional view of the dosimeter sled body of FIG. 25 taken along line E-E of FIG. 27.
Figure 31:
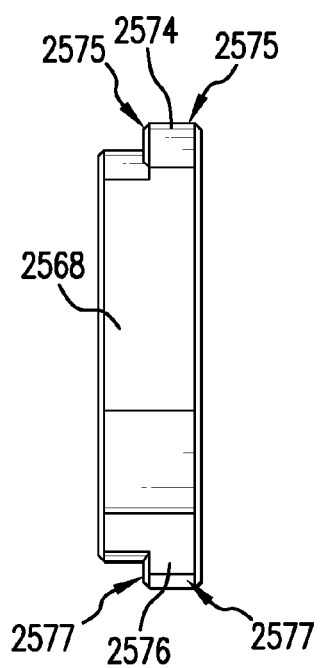
FIG. 31 is an end view of the dosimeter sled body of FIG. 25.
Figure 32:
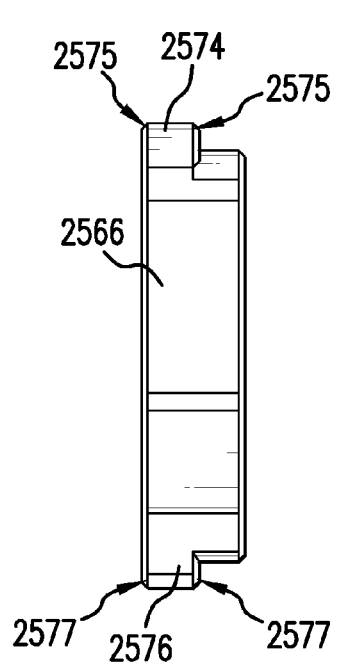
FIG. 32 is an end view of the dosimeter sled body of FIG. 25 of the opposite end of the dosimeter sled from the end shown in FIG. 31.
Figure 33:
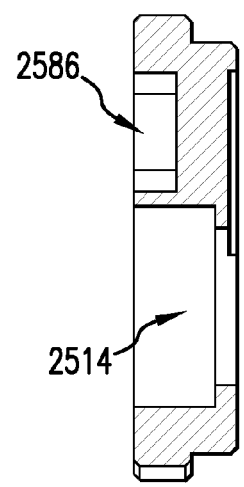
FIG. 33 is a cross-sectional view of the dosimeter sled body of FIG. 25 taken along line F-F of FIG. 28.

FIGS. 25, 26, 27, 28, 29, 30, 31, 32 and 33 show a dosimeter sled body 2502 according to one embodiment of the present invention. FIGS. 25 and 27 show a sled body top face 2504 of dosimeter sled body 2502. FIGS. 26 and 28 show a sled body bottom face 2506 of dosimeter sled body 2502. Sled body top face 2504 and sled body bottom face 2506 are opposite each other. Dosimeter sled body 2502 includes three openings 2510, 2512 and 2514. Openings 2510, 2512 and 2514 include respective top portions 2518, 2520 and 2522 and respective bottom portions 2524, 2526 and 2528. Because top portions 2518 and 2520 are smaller than respective bottom portions 2524 and 2526 of openings 2510 and 2512, circular ledges 2540 and 2542 formed within openings 2510 and 2512 by top portions 2518 and 2520. Because top portion 2522 is smaller than bottom portion 2528 of opening 2514, a circular ledge 2544 within openings 2514 is formed by top portion 2522. A round RFID tag (not shown) may be mounted in a nearly circular recess 2556 in sled body top face 2504. Dosimeter sled body 2502 has two parallel lateral sides 2562 and 2564, a curved end side 2566, a substantially straight end side 2568, and two slanted corner sides 2570 and 2572. Lateral side 2562 includes a rail 2574 along the length of lateral side 2562 on the bottom half of lateral side 2562. Rail 2574 protrudes from lateral side 2562. Rail 2574 has beveled edges 2575. Lateral side 2564 includes a rail 2576 along the length of lateral side 2564 on the bottom half of lateral side 2564. Rail 2576 protrudes from lateral side 2564. Rail 2576 has beveled edges 2577. Lateral side 2562 includes a U-shaped detent 2578 and a tang 2579 near end side 2568. Rail 2574 includes three semicircular positioning notches 2580, 2582 and 2584. Sled body bottom face 2506 includes a bottom face recess 2586. Bottom face recess 2586 includes indentations 2588, 2590, 2592, 2594 and 2596. Sled top face includes alphanumeric indicia 2598. A FNTD (not shown) may be mounted in bottom face recess 2586. Indentations 2588, 2590, 2592, 2594 and 2596 in the bottom face recess 2586 aid in mounting an FNTD in bottom face recess 2586 and removing an FNTD from bottom face recess 2586.

The beveled edges of the rails of the dosimeter sled provide channels between the rails and the sled recess in the lower housing to allow small amounts of dust and dirt to accumulate without impeding the sled's traveling in and out of the sled recess.

Figure 34:
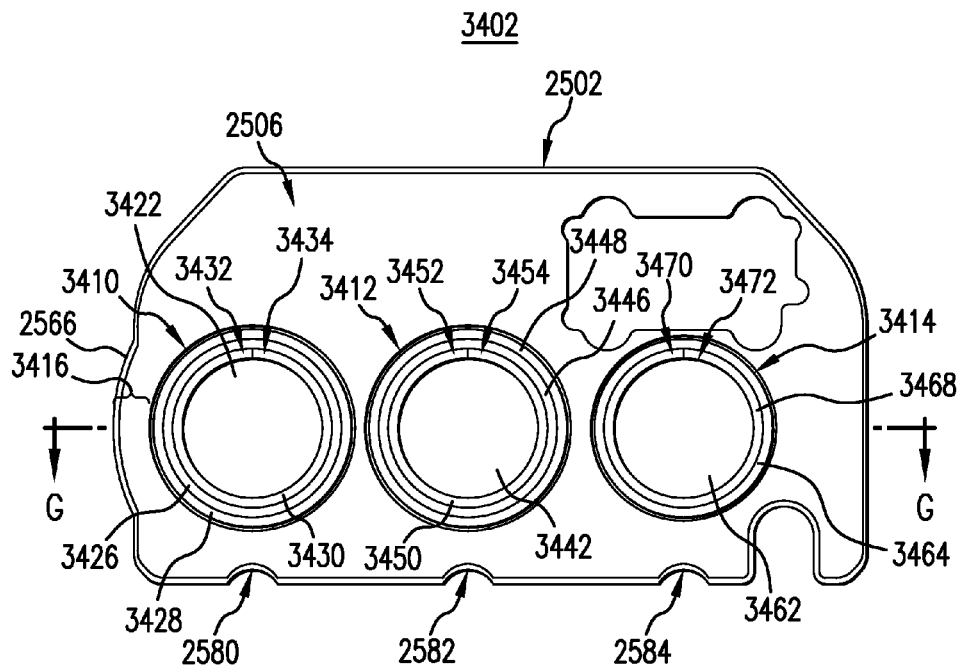
FIG. 34 is bottom plan view of a dosimeter sled according to one embodiment of the present invention.
Figure 35:
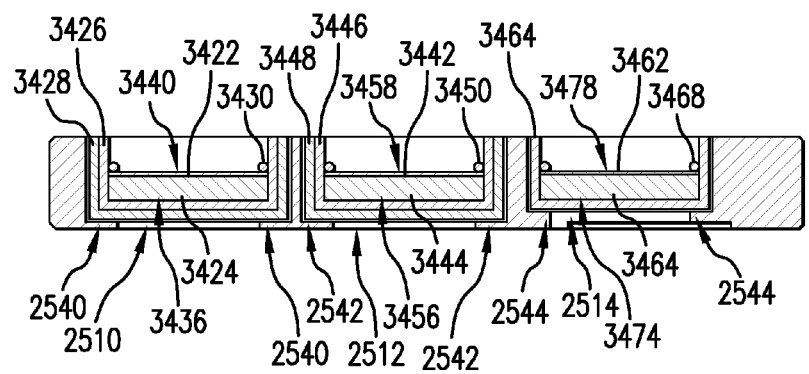
FIG. 35 is a cross-sectional view of the dosimeter sled of FIG. 34 taken along line G-G of FIG. 34.

FIGS. 34 and 35 show a dosimeter sled 3402 including dosimeter sled body 2502. In dosimeter sled 3402, neutron-sensitive OSL sensor 3410, reference OSL sensor 3412 and comparator OSL sensor 3414 are mounted in respective openings 2510, 2512 and 2514 of dosimeter body 3502 and held in place by press fitting OSL sensor 3410, reference OSL sensor 3412 and comparator OSL sensor 3414 into respective openings 2510, 2512 and 2514. Neutron-sensitive OSL sensor 3410, reference OSL sensor 3412 and comparator OSL sensor 3414 abut respective circular ledges 2540, 2542 and 2544. Neutron-sensitive OSL sensor 3410 is the OSL sensor closest to curved end side 2566

Because OSL sensor 3410 is near curved end side 2566, curved end side 2566 is curved to expand a region 3416 between OSL sensor 3410 and end side 2566, in comparison to the narrower region 673 between neutron-sensitive OSL sensor 626 and straight end side 666 of dosimeter sled 600, to ensure that the circular optical light pipe of the OSL reader (not shown in FIGS. 34 and 35) is fully covered when neutron-sensitive OSL sensor 3410 is read by the OSL reader. There is enough distance between end side 2568 and OSL sensor 3414 to cover the optical light pipe of the OSL reader, so it is not as important to make end side 2568 curved.

Neutron-sensitive OSL sensor 3410 includes a disc-shaped pellet of OSLM 3422, a converter material disc 3424, a cylindrical cup-shaped inner filter 3426 and a cylindrical cup-shaped outer filter 3428. OSLM 3422 and converter material disc 3424 are held in place in inner filter 3426 by a retaining ring 3430. Converter material disc 3424 is sandwiched between OSLM 3422 and inner filter 3426. Retaining ring 3430 is a spring-type retaining ring and is held in place in inner filter 3426 by compression. Compressed in inner filter 3426, ends 3432 and 3434 of retaining ring 3430 abut each other. Inner filter 3426 is mounted and held in outer filter 3428 by press fitting inner filter 3426 into outer filter 3428. OSLM 3422 has a filtered side 3436, the side of OSLM 3422 filtered by converter material disc 3424, inner filter 3426 and outer filter 3428. Neutron-sensitive OSL sensor 3410 has an exposed side 3438 that allows the combined dosage of x-ray, gamma and neutron radiation to which OSLM 3422 has been exposed to be read by an OSL reader. Retaining ring 3430 is mounted on exposed side 3438 of OSLM 3422.

Reference OSL sensor 3412 includes a disc-shaped pellet of OSLM 3442, a reference filter material disc 3444, a cylindrical cup-shaped inner filter 3446 and a cylindrical cup-shaped outer filter 3448. OSLM 3442 and reference filter material disc 3444 are held in place in inner filter 3446 by a retaining ring 3450. Reference filter material disc 3444 is sandwiched between OSLM 3442 and inner filter 3446. Retaining ring 3450 is a spring-type retaining ring and is held in place in inner filter 3446 by compression. Compressed in inner filter 3446, ends 3452 and 3454 of retaining ring 3450 abut each other. Inner filter 3446 is mounted and held in outer filter 3448 by press fitting inner filter 3446 into outer filter 3448. OSLM 3442 has a filtered side 3456, the side of OSLM 3442 filtered by reference filter material disc 3444, inner filter 3446 and outer filter 3448. Reference OSL sensor 3412 has an exposed side 3458 that allows the combined dosage of x-ray and gamma radiation to which OSLM 3442 has been exposed to be read by an OSL reader. Retaining ring 3450 is mounted on exposed side 3458 of OSLM 3442.

Comparator OSL sensor 3414 includes a disc-shaped pellet of OSLM 3462, a reference filter material disc 3464 and, a cylindrical cup-shaped filter 3466. OSLM 3462 and reference filter material disc 3464 are held in place in filter 3466 by a retaining ring 3468. Reference filter material disc 3464 is sandwiched between OSLM 3462 and filter 3466. Retaining ring 3468 is a spring-type retaining ring and is held in place in filter 3466 by compression. Compressed in inner filter 3466, ends 3470 and 3472 of retaining ring 3468 abut each other. OSLM 3462 has a filtered side 3474, the side of OSLM 3462 filtered by reference filter material disc 3464 and filter 3466. Comparator OSL sensor 3414 has an exposed side 3478, which allows the combined dosage of x-ray and gamma radiation to which OSLM 3462 has been exposed to be read by an OSL reader. Retaining ring 3468 is mounted on exposed side 3478 of OSLM 3462.

Neutron-sensitive OSL sensor 3410 is identical to reference OSL sensor 3412, except for the substitution of reference filter material disc 3444 of reference OSL sensor 3412 for converter material disc 3424 in neutron-sensitive OSL sensor 3410. Comparator OSL sensor 3414 is identical to reference OSL sensor 3412, except filter 3466 is not mounted in an outer filter. In comparator OSL sensor 3414, filter 3466 functions as an outer filter.

In the dosimeter sled of FIG. 34, the OSLM of one of the OSL sensors has a converter material coated on the filtered side of the OSLM allowing the OSLM to function as an OSL sensor that senses gamma radiation and neutron radiation. The OSLM of a second OSL sensor has a filter reference material coated on the filtered side of the OSL that allows the OSLM to function as an OSL sensor for gamma radiation.

In one embodiment of the present invention, when dosimeter sled 3402 is positioned under an OSL reader (not shown in FIGS. 34 and 35), positioning notches 2584, 2582 and 2580 may be used to properly position, in turn, OSL sensors 3414, 3412 and 3410 relative to an optical light pipe of a photo-optical engine (not shown in FIGS. 34 and 35) the OSL reader. Positioning notch 2580 may be used to properly position neutron-sensitive OSL sensor 3410 over the optical light pipe of the OSL reader. Positioning notch 2582 may be used to properly position reference OSL sensor 3412 over the optical light pipe of the OSL reader. Positioning notch 2584 may be used to properly position comparator OSL sensor 3414 over the optical light pipe of the OSL reader.

Dosimeter sled 3402 may be slid into and out of sled recess 1728 of lower housing 1700 in a fashion similar to the way that dosimeter sled 600 slides into and out of sled recess 412 of lower housing 106. Rail 2574 of dosimeter sled 3402 slides in groove 1752 beneath upper lip 1754 of lower housing 1700. Rail 2576 of dosimeter sled 3402 slides in groove 1756 beneath upper lip 1758 of lower housing 1700. When fully slid into dosimeter sled 3402, curved end side 2566 abuts curved wall portion of lower housing 1700. Etched arrow 1780 of lower housing 1700 indicates the direction that a dosimeter sled 3402 may be slid out of lower housing 1700.

When dosimeter sled 3402 is slid into lower housing 1700, a thin rectangular energy compensating filter (not shown in FIG. 34) mounted in filter plate recess 1716 shields neutron-sensitive OSL sensor 3410 and reference OSL sensor 3412 from radiation, similar to the way that copper filter discs 472 and 474 shield neutron-sensitive OSL sensor 3410 and reference OSL sensor 3412, respectively. In one embodiment, the thin rectangular energy compensating filter may be molded into filter plate recess 1716. In one embodiment, the thin rectangular energy compensating filter may be made of copper.

Lower housing 1700, with dosimeter sled 3402 fully slid/mounted therein, may be mounted in upper housing 104 by screwing lower housing 106 into upper housing 1200 using screw threads 1256 of upper housing 1200 and screw threads 1712 of lower housing 1700. Lower housing 1700 may mounted in upper housing 1200, when line A-A, associated with upper housing 1200, in FIG. 14 is parallel to line B-B, associated with lower housing 1700, of FIG. 19. Upper housing 1200 may be released from lower housing 1700 by grasping loops 1212 and 1214 and turning upper housing 90° counterclockwise, so that A-A is perpendicular to line B-B in which upper housing 1200 is in a released position relative to lower housing 1700.

Figure 36:
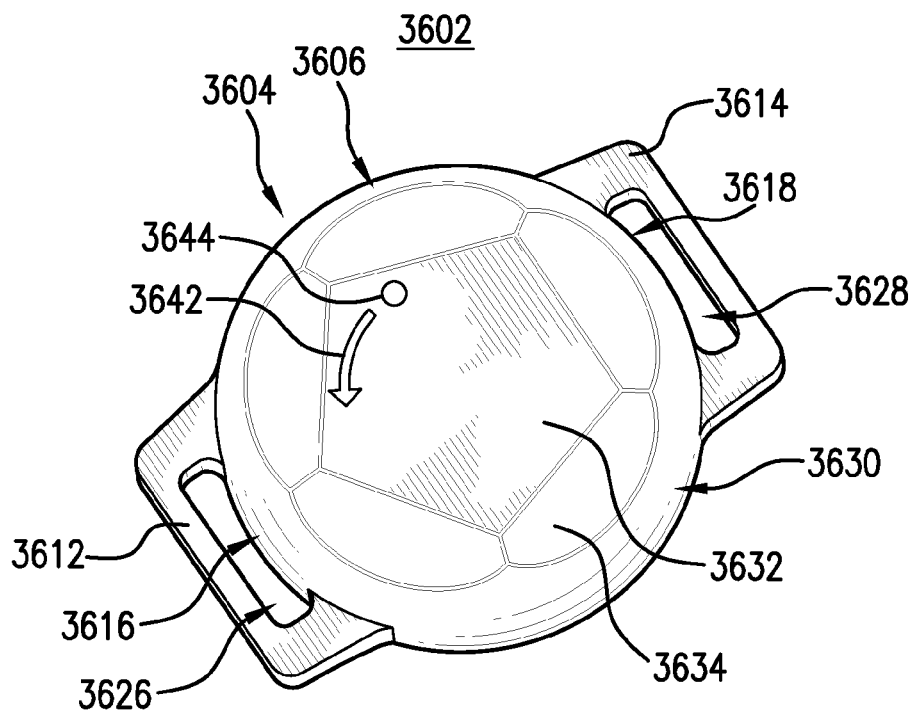
FIG. 36 is a top perspective view of an upper housing of a radiation dosimeter according to one embodiment of the present invention.

FIG. 36 shows an upper housing top 3602 of an upper housing 3604 of a radiation dosimeter according to one embodiment of the present invention. Upper housing 3604 includes a circular body 3606 and two generally trapezoidal-shaped loops 3612 and 3614 located on respective opposite sides 3616 and 3618 of circular body 3606. Loops 3612 and 3614 have respective openings 3626 and 3628 through which a strap member (not shown) may be threaded so that the dosimeter may be worn on the wrist of an individual. Upper housing top 3602 has a contoured portion 3630, a flat pentagonal upper surface 3632 and five (5) faceted regions 3634. Upper surface 3632 includes a curved arrow 3642, and a circular alignment symbol 3644. A label with alphanumeric identification indicia (not shown) may be adhered to upper housing top 3602 or alpha-number identification indicia may be etched into upper housing top 3602. Upper housing 3604 includes a circular interior wall (not shown) including interior screw threads (not shown). Upper housing 3604 may be used with a lower housing of the present invention in a fashion similar to the way that upper housing 104 may be used with lower housing 106 or upper housing 1200 may be used with lower housing 1700.

Figure 37:
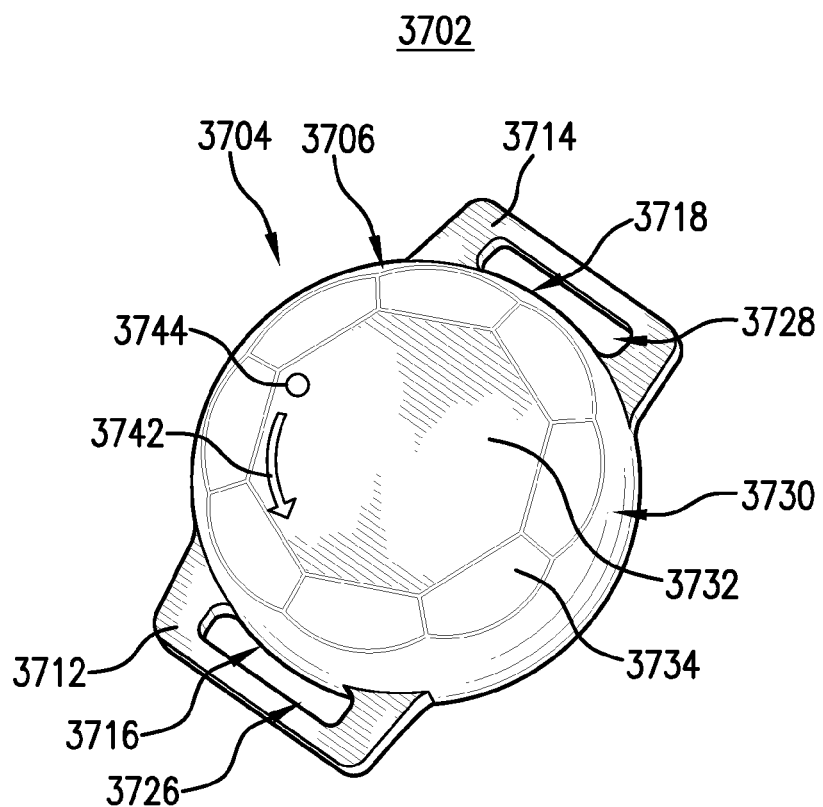
FIG. 37 is a top perspective view of an upper housing of a radiation dosimeter according to one embodiment of the present invention.

FIG. 37 shows an upper housing top 3702 of an upper housing 3704 of a radiation dosimeter according to one embodiment of the present invention. Upper housing 3704 includes a circular body 3706 and two generally trapezoidal-shaped loops 3712 and 3714 located on respective opposite sides 3716 and 3718 of circular body 3706. Loops 3712 and 3714 have respective openings 3726 and 3728 through which a strap member (not shown) may be threaded so that the dosimeter may be worn on the wrist of an individual. Upper housing top 3702 has a contoured portion 3730, a flat octagonal upper surface 3732 and eight (8) faceted regions 3734. Upper surface 3732 includes a curved arrow 3742, and a circular alignment symbol 3744. A label with alphanumeric identification indicia (not shown) may be adhered to upper housing top 3702 or alpha-number identification indicia may be etched into upper housing top 3702. Upper housing 3704 includes a circular interior wall (not shown) including interior screw threads (not shown). Upper housing 3704 may be used with a lower housing of the present invention in a fashion similar to the way that upper housing 104 may be used with lower housing 106 or upper housing 1200 may be used with lower housing 1700.

Figure 38:
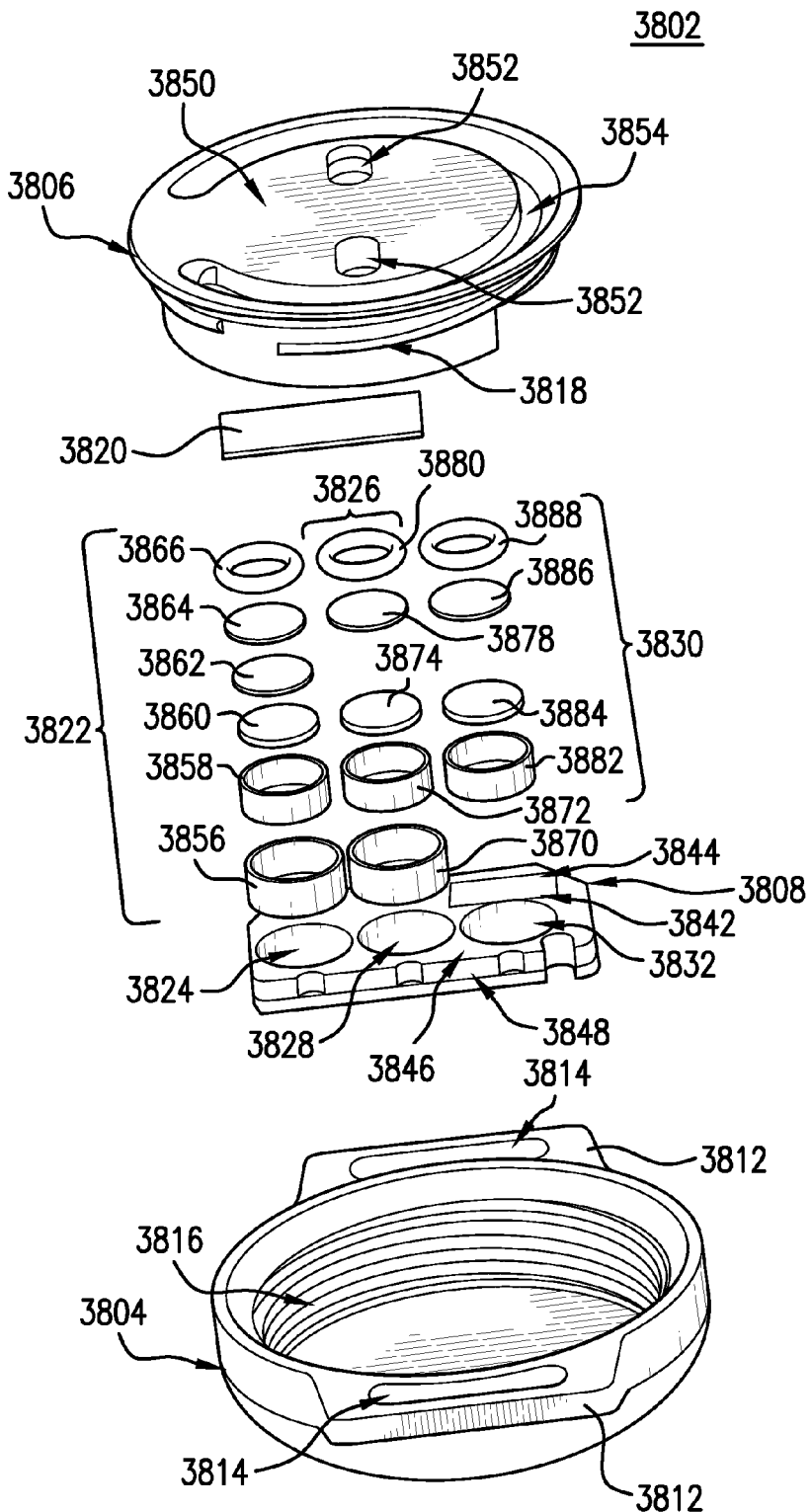
FIG. 38 is an exploded view of a radiation dosimeter according to one embodiment of the present invention.

FIG. 38 shows a radiation dosimeter 3802 according to one embodiment of the present invention. Radiation dosimeter 3802 includes an upper housing 3804, a lower housing 3806 and a dosimeter sled 3808 that slides into and out of lower housing 3806. Upper housing 3804 includes two loops 3812 each having an opening 3814. Upper housing 3804 includes interior screw thread 3816. Lower housing 3806 includes an external screw thread 3818 and a sled recess (not visible in FIG. 38). A rectangular copper filter plate 3820 is mounted in a rectangular plate recess (not shown) of lower housing 3806. A neutron-sensitive OSL sensor 3822 is mounted in an opening 3824 of dosimeter sled 3808. A reference OSL sensor 3826 is mounted in an opening 3828 of dosimeter sled 3808. A comparator OSL sensor 3830 for reference OSL sensor 3826 is mounted in an opening 3832 of dosimeter sled 3808. A fluorescent nuclear track detector (FNTD) 3842 is mounted in a bottom face recess 3844 of a bottom face 3846 of dosimeter sled 3808. Dosimeter sled 3808 includes a rail 3848. A bottom face 3850 of lower housing 3806 includes two lozenge-shaped recesses 3852 and a C-shaped recess 3854.

Neutron-sensitive OSL sensor 3822 comprises a cylindrical cup-shaped outer filter 3856, a cylindrical cup-shaped inner filter 3858, a converter material disc 3860, a conformal disc 3862, an OSLM disc 3864 and a retaining ring 3866. Retaining ring 3866 holds OSLM disc 3864, conformal disc 3862 and converter material disc 3860 in inner filter 3858. Inner filter 3858 is mounted in outer filter 3856. Outer filter 3856 is mounted in opening 3822.

Reference OSL sensor 3826 comprises a cylindrical cup-shaped outer filter 3870, a cylindrical cup-shaped inner filter 3872, a reference filter material disc 3874, an OSLM disc 3878 and a retaining ring 3880. Retaining ring 3880 holds OSLM disc 3878 and reference filter material disc 3874 in inner filter 3872. Inner filter 3872 is mounted in outer filter 3870. Outer filter 3870 is mounted in opening 3826.

Comparator OSL sensor 3830 comprises a cylindrical cup-shaped filter 3882, a reference filter material disc 3884, an OSLM disc 3886 and a retaining ring 3888. Retaining ring

3888 holds OSLM disc 3886 and reference filter material disc 3884 in filter 3882. Filter 3882 is mounted in opening 3830.

Although the OSLM discs shown in FIG. 38 are colored yellow for illustration purposes, the OSLM discs are actually whitish in color.

Conformal disc 3862, which is made of PE, is thinner and more pliable than the thicker converter material disc 3860, which is made of HDPE. In one embodiment of the present invention, converter material disc 3860 may be made by punching out converter material disc 3860 from a piece of HDPE material, which may lead to converter material disc 3860 having a concave or convex shape. When converter material disc 3860 has such a concave or convex shape, a small gap is formed between converter material disc 3860 and OSLM 3864. Conformal disc 3862 may be used to fill this gap. The combination of conformal disc 3862 and converter material disc 3860 may be viewed as functioning as a "composite converter material disc". Conformal disc 3862 ensures that there is more intimate contact between this "composite converter material disc" and OSLM 3864. Outer filters 3856 and 3870 are made of copper. Inner filters 3858 and 3872 and filter 3882 are made of aluminum. OSLM discs 3864, 3878 and 3886 are made of an $Al_2O_3$:C material. Retaining rings 3866, 3880 and 3888 are made of stainless steel.

Figure 39:
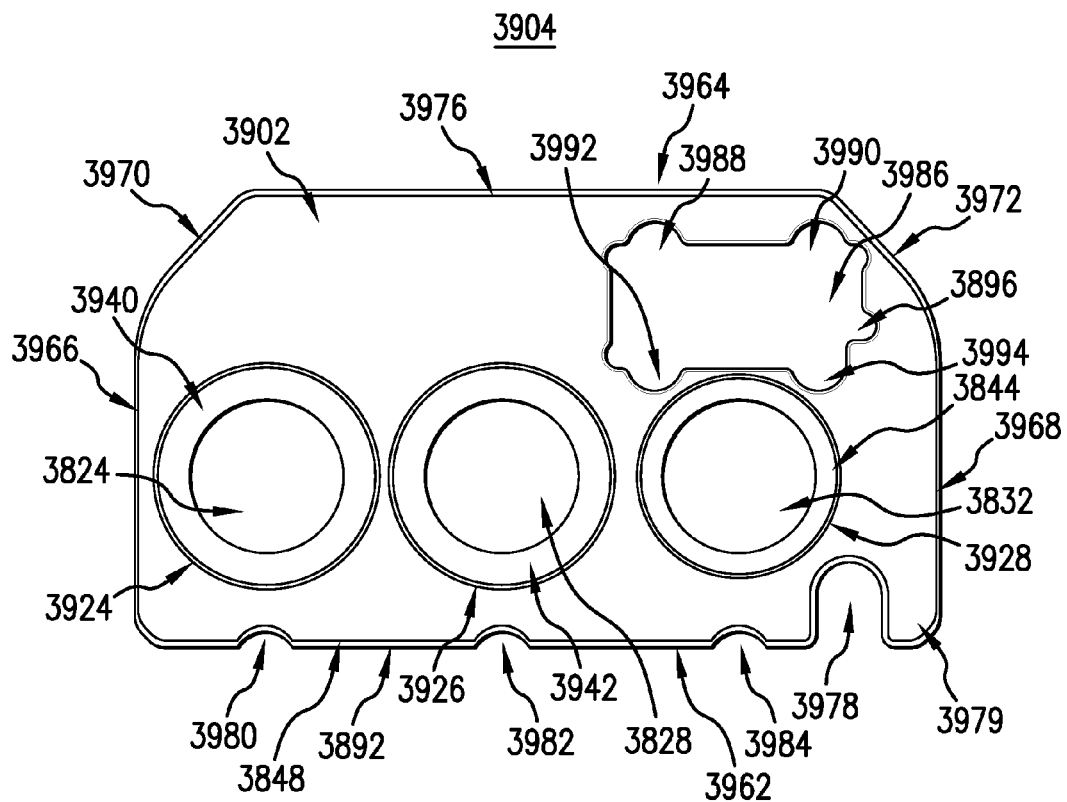
FIG. 39 is a bottom plan view of the dosimeter sled body of the radiation dosimeter of FIG. 38.

FIG. 39 shows a sled body bottom face 3902 of a dosimeter sled body 3904 of dosimeter sled 3808. Dosimeter sled body 3904 is similar to dosimeter sled body 602. Openings 3824, 3828 and 3832 include respective top portions (not shown) and respective bottom portions 3924, 3926 and 3928. Because the top portions are smaller than respective bottom portions 3924, 3926 and 3928 of openings 3824, 3828 and 3832, neutron-sensitive OSL sensor 3822, reference OSL sensor 3826 and comparator OSL sensor 3830 mounted in openings 3824, 3828 and 3832 abut respective circular ledges 3940, 3942 and 3944 formed within openings 3824 and 3828 by the top portions of these openings. A round RFID tag (not shown) may be mounted on the top (not shown) of dosimeter sled body 3904. Dosimeter sled body 3904 has two parallel lateral sides 3962 and 3964, two substantially straight end sides 3966 and 3968, and two slanted corner sides 3970 and 3972. Lateral side 3962 includes a rail 3848 along the length of lateral side 3962 on the bottom half of lateral side 3962. Rail 3848 protrudes from lateral side 3962. Lateral side 3964 includes a rail 3976 along the length of lateral side 3964 on the bottom half of lateral side 3964. Rail 3976 protrudes from lateral side 3964. Lateral side 3962 includes a U-shaped detent 3978 and a tang 3979 near end side 3968. Rail 3848 includes three semicircular positioning notches 3980, 3982 and 3984. Sled body bottom face 3902 includes a bottom face recess 3844. Bottom face recess 3844 includes indentations 3988, 3990, 3992, 3994 and 3996. Indentations 3988, 3990, 3992, 3994 and 3996 in bottom face recess 3844 aid in mounting FNTD 3842 in bottom face recess 3844 and in removing FNTD 3842 from the bottom face recess 3844.

A sled top face (not shown) of sled 3808 may include alphanumeric indicia (not shown).

Figure 40:
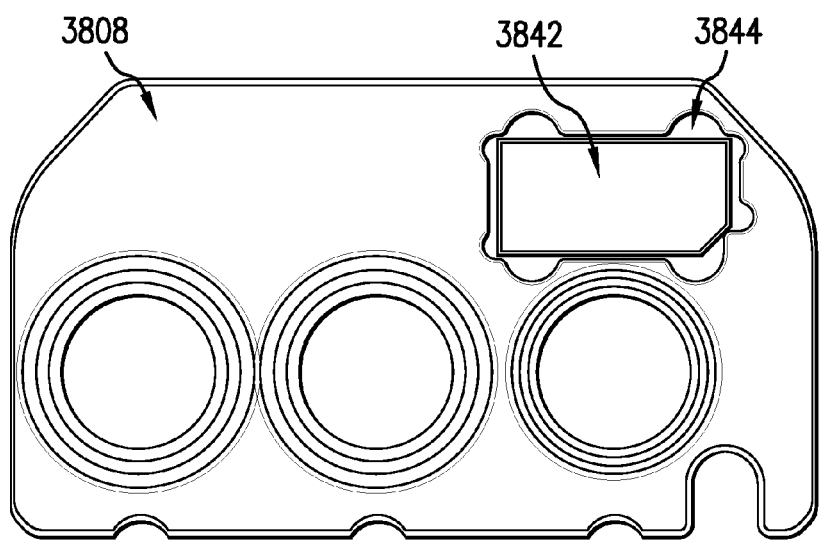
FIG. 40 is an image of the dosimeter sled of the radiation dosimeter of FIG. 38.

FIG. 40 shows dosimeter sled 3808 with FNTD 3842 mounted in bottom face recess 3844. As can be seen in FIG. 40, FNTD 3842 is punch card-shaped.

In the dosimeter sled of FIGS. 38, 39 and 40, the recess is constructed so that one part of the FNTD is in contact with the sled. Examples of suitable fluorescent nuclear track detectors are described in U.S. patent application Ser. No. 12/258,035 to Akselrod, et al., entitled "METHOD OF LUMINESCENT SOLID STATE DOSIMETRY OF MIXED RADIATIONS" filed Oct. 24, 2008, the entire contents and disclosure of which are incorporated herein by reference. The recess also has facets where a PTFE reference filter is placed and a LiF or other Li based compound is placed. That is, there are three, adjacent filtered areas over the single FNTD sensor. When the dosimeter sled is made of HDPE, that area senses neutrons in the form of recoil protons and gamma rays/x-rays. The area filtered by the PTFE senses only gamma rays/x-rays. The Li filtered area senses neutrons using an alternative neutron interaction process whereby the lithium captures the neutron and splits into an alpha particle and a tritium or H-3 ion. The alpha particle and tritium ion as well as the recoil proton from the HDPE create tracks in the FNTD that once counted or otherwise quantified can be related to the neutron dose. The FNTD is more sensitive than the OSLM to neutrons but not to gamma rays and x-rays. The FNTD may be used as a back-up or secondary dosimeter, because its signal is more robust. However, because the FNTD cannot be read in a compact portable reader, the FNTD may be removed from the sled and read in a special reader at another location, such as a laboratory.

Figure 41:
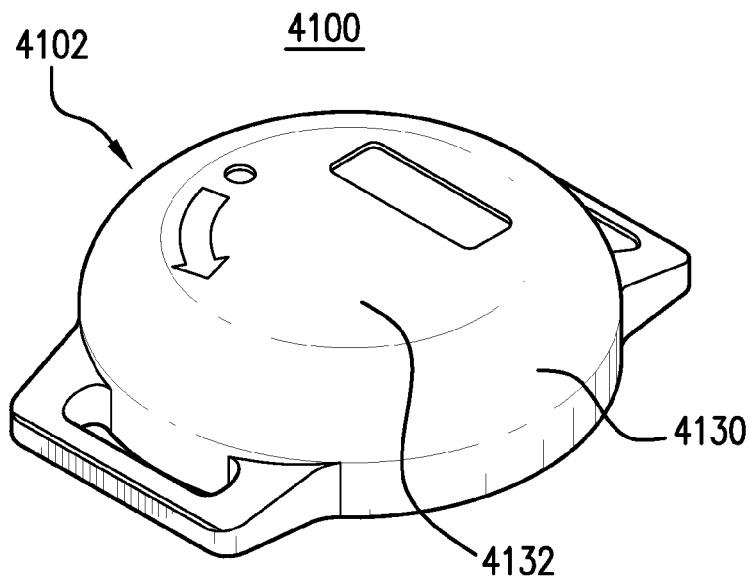
FIG. 41 is a top perspective view of an upper housing of a radiation dosimeter according to one embodiment of the present invention.
Figure 42:
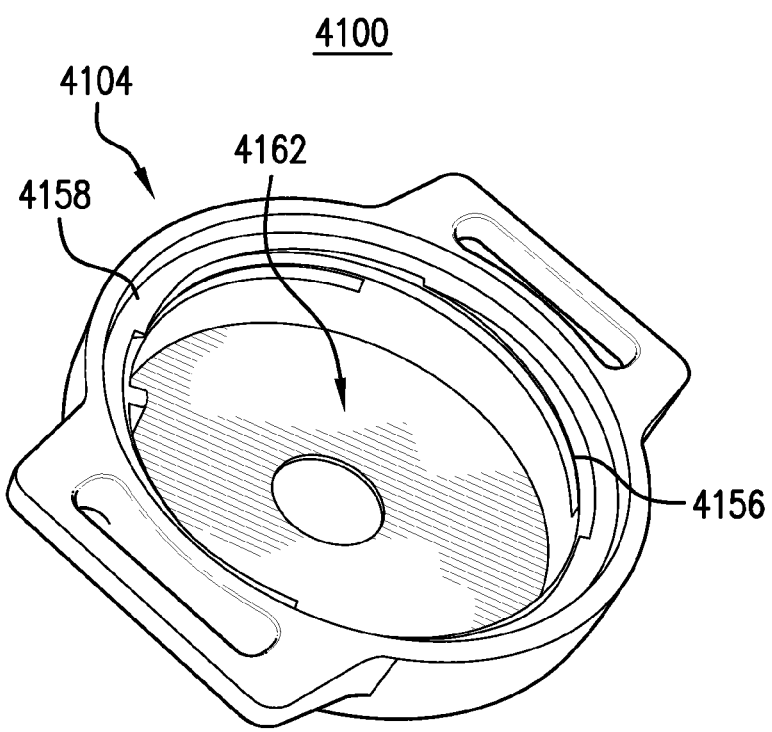
FIG. 42 is a bottom perspective view of the upper housing of FIG. 41.
Figure 43:
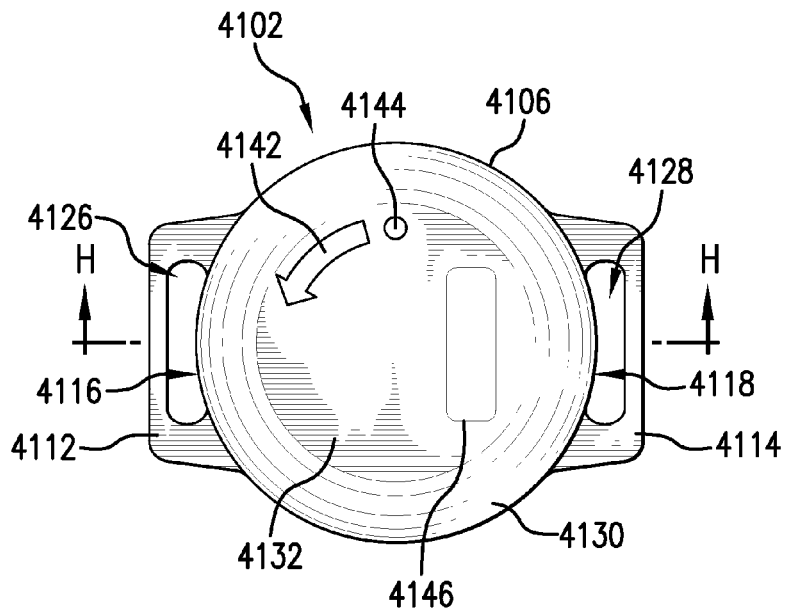
FIG. 43 is a top plan view of the upper housing of FIG. 41.
Figure 44:
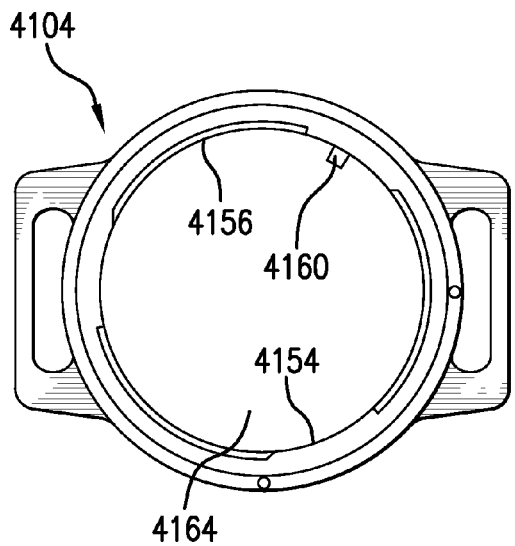
FIG. 44 is a bottom plan view of the upper housing of FIG. 41.
Figure 45:
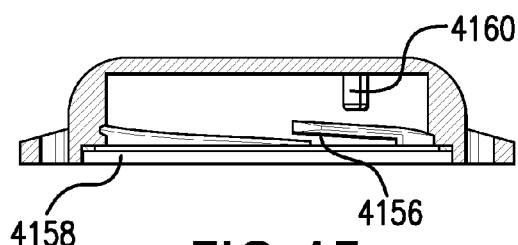
FIG. 45 is a cross-sectional view taken along line H-H of FIG. 43.

FIGS. 41, 42, 43, 44 and 45 show a dosimeter upper housing 4100 of a radiation dosimeter according to one embodiment of the present invention. FIGS. 41 and 43 show upper housing top 4102. FIGS. 42 and 44 show upper housing bottom 4104. Dosimeter upper housing 4100 includes a circular body 4106 and two generally trapezoidal-shaped loops 4112 and 4114 located on respective opposite sides 4116 and 4118 of circular body 4106. Loops 4112 and 4114 have respective openings 4126 and 4128 through which a strap member (not shown) may be threaded so that the dosimeter may be worn on the wrist of an individual. Upper housing top 4102 has a circular contoured portion 4130 and a flat circular upper surface 4132 and includes a curved arrow 4142, a circular alignment symbol 4144 and a shallow rounded rectangular recess 4146. In one embodiment of the present invention, a label with alphanumeric identification indicia (not shown) may be adhered to upper housing top 4102 in a shallow rounded rectangular recess 4146. In another embodiment of the present invention, alphanumeric identification indicia (not shown) may be engraved in shallow rounded rectangular recess 4146. Circular interior wall 4154 of upper housing bottom 4104 includes interior screw threads 4156, a circumferential gasket 4158 and a protrusion 4160. Interior wall 4154 surrounds a circular recess 4162 with a flat bottom 4164.

The gasket may be made of a suitable gasket materials such as rubber, silicone, etc.

In one embodiment of the present invention, in addition to screw threads, the lower housing and/or upper housing has a raised surface consisting of a gasket material, such as silicone or rubber, so that the two housings when screwed together provide a water-tight seal.

Figure 46:
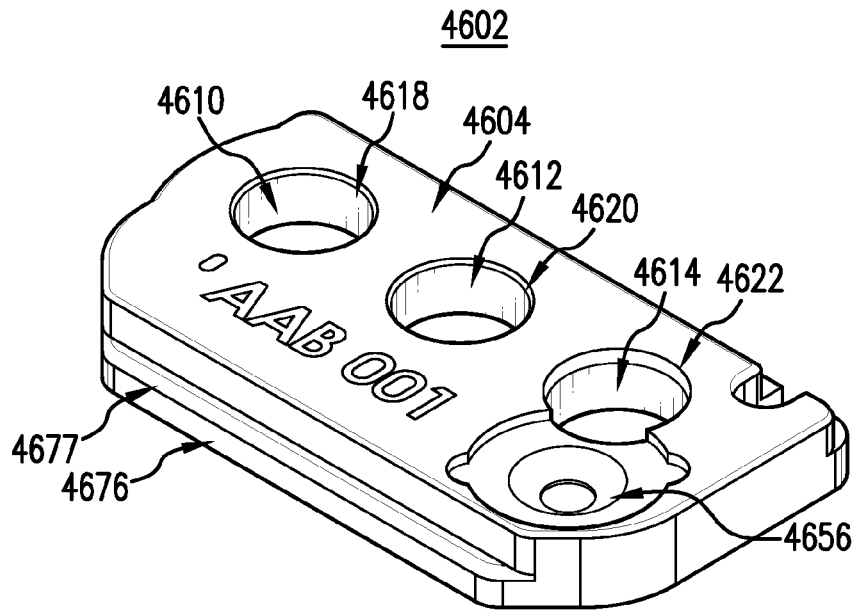
FIG. 46 is a top perspective view of a dosimeter sled body of a dosimeter according to one embodiment of the present invention.
Figure 47:
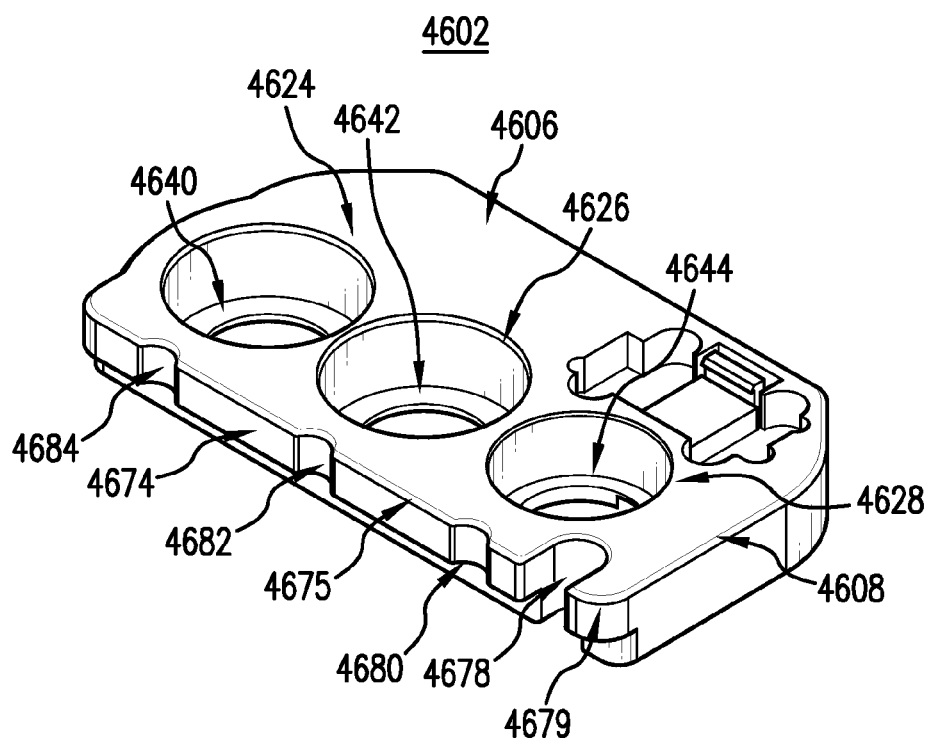
FIG. 47 is a bottom perspective view of the dosimeter sled body of FIG. 46.
Figure 48:
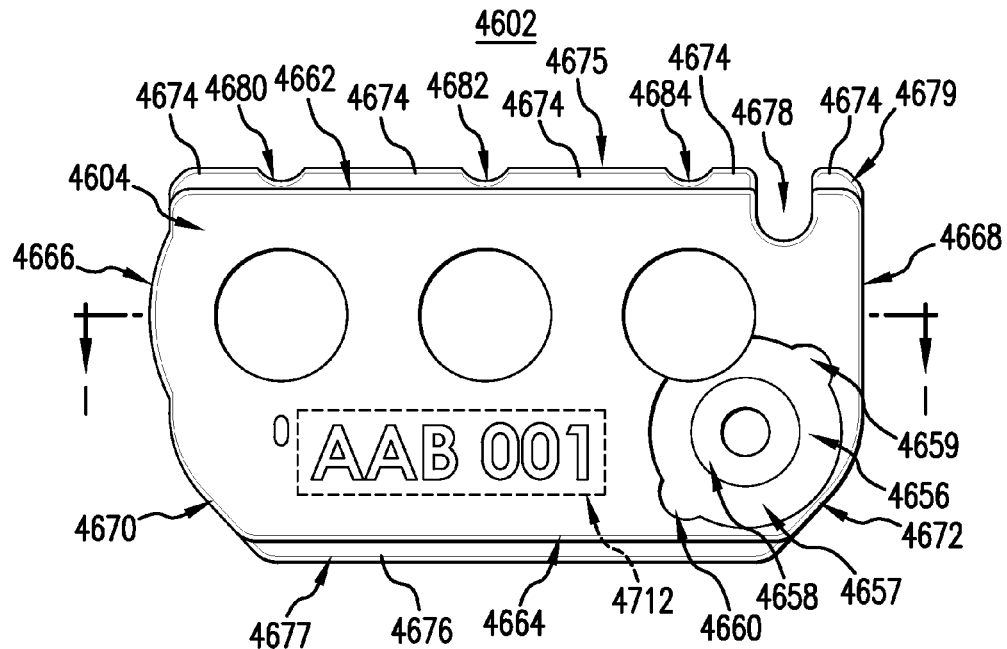
FIG. 48 is a top plan view of the dosimeter sled body of FIG. 46.
Figure 49:
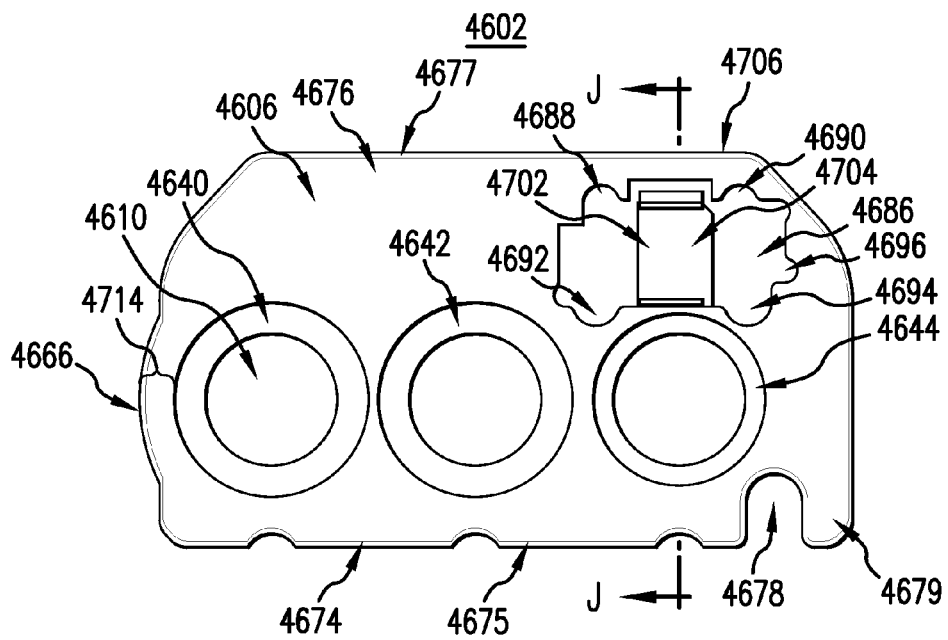
FIG. 49 is a bottom plan view of the dosimeter sled body of FIG. 46.

FIGS. 46, 47, 48, 49, 50, 51, 52, 53, 54 and 55 show a dosimeter sled body 4602 according to one embodiment of the present invention. FIGS. 46 and 48 show a sled body top face 4604 of dosimeter sled body 4602. FIGS. 47 and 49 show a sled body bottom face 4606 of dosimeter sled body 4602. Sled top face 4604 and sled body bottom face 4606 are opposite each other. Dosimeter sled body 4602 includes three openings 4610, 4612 and 4614. Openings 4610, 4612 and 4614 include respective top portions 4618, 4620 and 4622 and respective bottom portions 4624, 4626 and 4628. Because top portions 4618 and 4620 are smaller than respective bottom portions 4624 and 4626 of openings 4610 and 4612, circular ledges 4640 and 4642 are formed within openings 4610 and 4612 by top portions 4618 and 4620. Because top portion 4622 is smaller than bottom portion 4628 of opening 4614, a circular ledge 4644 within openings 4614 is formed by top portion 4622. A round RFID tag (not shown, similar to RFID tag 660) may be mounted in an RFID tag recess 4656 in sled body top face 4604. RFID tag recess 4656 includes a flat outer portion 4657 for receiving a flat circumferential part of an RFID tag including an antenna (not shown) and a curved inner portion 4658 for receiving a protruding memory chip of the RFID tag. RFID tag recess 4656 also includes indentations 4659 and 4560 for receiving respective adhesive dots used in mounting the RFID tag in RFID tag recess 4656. Dosimeter sled body 4602 has two parallel lateral sides 4662 and 4664, a curved end side 4666, a substantially straight end side 4668, and two slanted corner sides 4670 and 4672. Lateral side 4662 includes a rail 4674 along the length of lateral side 4662 on the bottom half of lateral side 4662. Rail 4674 protrudes from lateral side 4662. Rail 4674 has beveled edges 4675. Lateral side 4664 includes a rail 4676 along the length of lateral side 4664 on the bottom half of lateral side 4664. Rail 4676 protrudes from lateral side 4664. Rail 4674 has beveled edges 4677. Lateral side 4662 includes a U-shaped detent 4678 and a tang 4679 near end side 4668. Rail 4674 includes three semicircular positioning notches 4680, 4682 and 4684. Sled body bottom face 4606 includes a bottom face recess 4686. Bottom face recess 4686 includes indentations 4688, 4690, 4692, 4694 and 4696.

A FNTD (not shown) may be mounted in bottom face recess 4686 in and a FNTD holder 4702 that includes a raised bed 4704 and a spring flange 4706. Bottom face recess 4686 also includes a retaining lip 4708. Spring flange 4706 and retaining lip 4708 are used to retain an FNTD in FNTD holder 4702. Spring flange 4706 may be pushed outwardly to allow the FNTD to be placed in FNTD holder 4702. Spring flange 4706 then springs back to force the FNTD against a wall 4710 of bottom face recess 4686 below retaining lip 4708. Indentations 4688, 4690, 4692, 4694 and 4696 in the bottom face recess of the sled body aid in mounting an FNTD in bottom face recess 4686 and in removing an FNTD from bottom face recess 4686. Sled top face 4604 includes alphanumeric indicia 4712.

The beveled edges of the rails of the dosimeter sled provide channels between the rails and the sled recess in the lower housing to allow small amounts of dust and dirt to accumulate without impeding the sled's traveling into and out of the sled recess.

Because an OSL sensor mounted in opening 4610 would be the closest OSL sensor to curved end side 4666, curved end side 4666 is curved to expand a region 4714 between opening 4610 and curved end side 4666, in comparison to the narrower region 673 between neutron-sensitive OSL sensor 626 and straight end side 666 of dosimeter sled 600, to ensure that the circular optical light pipe of the OSL reader (not shown in FIGS. 34 and 35) is fully covered when the OSL sensor mounted in opening 4610 is read by the OSL reader. There is enough distance between end side 4668 and opening 4614 to cover the optical light pipe of the OSL reader, so it is not as important to make end side 4668 curved.

For the FNTD, there are three (3) filter materials. In the embodiment of the present invention shown in FIGS. 46, 47, 48, 49, 50, 51, 52, 53, 54 and 55, one filter material is the raised bed of the FNTD holder that is part of the dosimeter sled made of HDPE and, therefore, acts as neutron converter. A second filter material is made of PTFE and is placed in the bottom face recess and acts as a reference filter material. A third filter material is a lithium fluoride crystal that converts low energy neutrons into recoil alpha particles and tritium particles.

Figure 55:
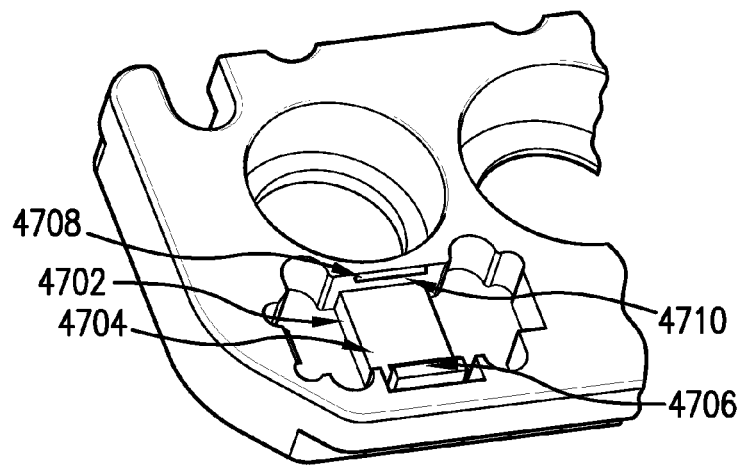
FIG. 55 is a close-up perspective view of the FNTD holder of the dosimeter sled body of FIG. 46.
Figure 56:
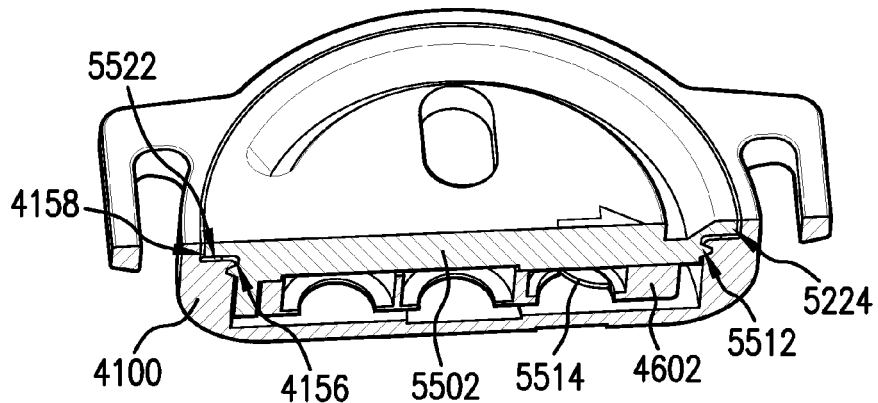
FIG. 56 is a cross-sectional view of a lower housing of a dosimeter, the upper housing of FIG. 41 and the dosimeter sled body of FIG. 46 assembled together.
Figure 57:
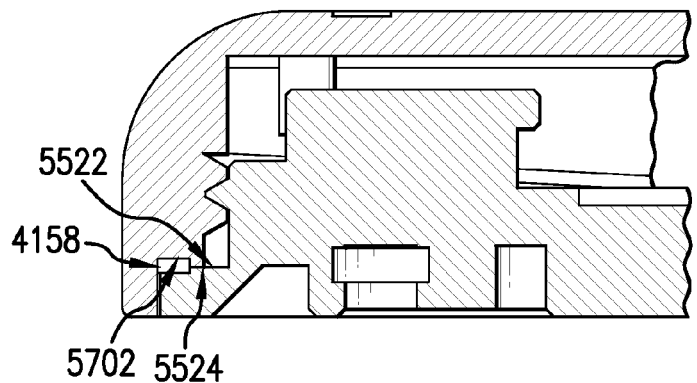
FIG. 57 is a cross-sectional view of a sealing engagement between the lower housing and upper housing of FIG. 56.

FIG. 55 shows a dosimeter lower housing 5502 screwed into dosimeter upper housing 4100. Lower housing 4402 is similar to lower housing 1700. Exterior screw threads 5512 of lower housing 5502 engage interior screw threads 4156 of upper housing 4100. Gasket 4158 provides a seal between a sealing shelf 5522 of upper housing 4100 and a sealing shelf 5524 of lower housing 5502. Dosimeter sled body 4602 is shown slid into lower housing 5502 with an RFID tag 5514 mounted in RFID tag recess 4656. FIG. 57 shows greater detail of how gasket 4158 provides a seal between a sealing shelf 5522 of upper housing 4100 and a sealing shelf 5524 of lower housing 5502. As shown in FIG. 57, gasket 4158 is circumferentially mounted in a circular groove 5702 in sealing shelf 5522.

FIGS. 58, 59, 60, 61, 62 and 63 show an OSL sensor 5802 and the component parts of OSL sensor 5802 according to one embodiment of the present invention. OSL sensor 5802 includes a disc-shaped pellet of OSLM 5810, a filter material disc 5812, a cylindrical cup-shaped inner filter 5814 and a cylindrical cup-shaped outer filter 5816. OSLM 5810 and filter material disc 5812 are held in place in inner filter 5814 by a retaining ring 5818. Filter material disc 5812 is sandwiched between OSLM 5810 and inner filter 5814. Retaining ring 5818 is a spring-type retaining ring and is held in place in inner filter 5814 by compression. Compressed in inner filter 5814, ends 5820 and 5822 of retaining ring 5818 abut each other. Inner filter 5814 is mounted and held in outer filter 5816 by press fitting inner filter 5814 into outer filter 5816. OSLM 5810 has a filtered side 5836, the side of OSLM 5810 filtered by filter material disc 5812, inner filter 5814 and outer filter 5816. OSLM 5810 has an exposed side 5840. Retaining ring 5818 is mounted on exposed side 5840 of OSLM 5810.

OSL sensor 5802 has a width/diameter 5842 and a height 5844. OSLM 5810 has a width/diameter 5852 and a height 5854.

Figure 58:
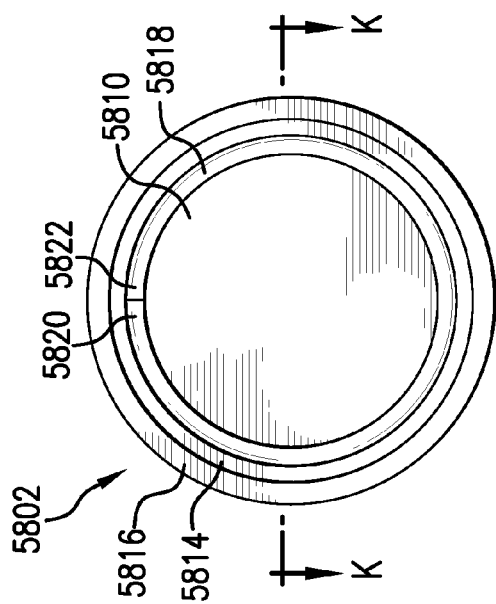
FIG. 58 is a top plan view of an OSL sensor according to one embodiment of the present invention.
Figure 59:
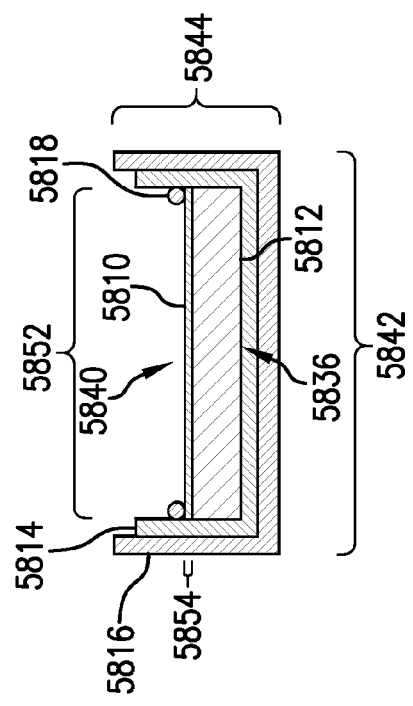
FIG. 59 is a cross-sectional view of the OSL sensor of FIG. 58 taken along line K-K.

For the OSL sensor of FIGS. 58 and 59, if the outer filter is made of copper, the inner filter is made of aluminum, the OSLM comprises an $Al_2O_3$:C material and the filter material disc is made of high-density polyethylene, then the OSL sensor corresponds to neutron-sensitive OSL sensor 626 of FIGS. 6 and 7. In FIGS. 58 and 59, if the outer filter is made of copper, the inner filter is made of aluminum, the OSLM comprises an $Al_2O_3$:C material and the filter material disc is made of polytetrafluoroethylene, then the OSL sensor corresponds to reference OSL sensor 628 of FIGS. 6 and 7.

For the OSL of FIGS. 58 and 59, if the filter material disc is made of a converter material, then the OSL sensor corresponds to neutron-sensitive OSL sensor 3410 of FIGS. 34 and 35. In FIGS. 58 and 59, if the filter material disc is made of a reference filter material, then the OSL sensor corresponds to reference OSL sensor 3412 of FIGS. 34 and 35.

In one embodiment of the present invention, the OSL sensor has a width/diameter of about 7.7 mm to about 7.8 mm. In one embodiment, the OSL sensor has a width/diameter of about 6.8 mm to about 6.9 mm.

In one embodiment of the present invention, the OSLM has a height of about 0.135 mm to about 0.145 mm.

In one embodiment of the present invention, the OSLM has a width/diameter of about 5.9 mm to about 6 mm.

In one embodiment of the present invention, the OSLM has a height of about 0.135 mm to about 0.145 mm.

Figure 60:
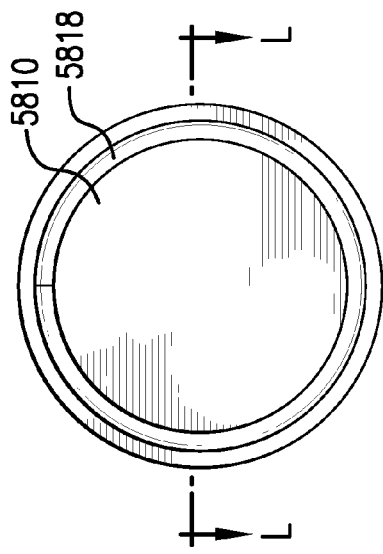
FIG. 60 is a top plan view of an inner filter in which is mounted an OSLM of the OSL sensor of FIG. 58.
Figure 61:
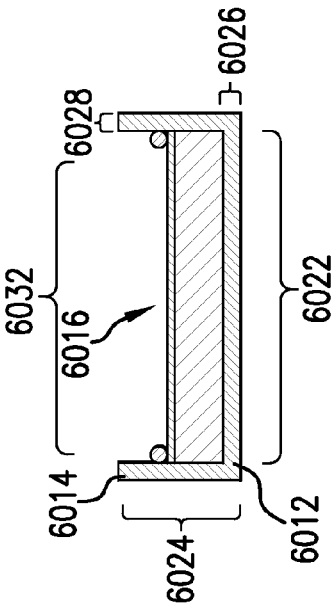
FIG. 61 is a cross-sectional view of an inner filter and OSLM of FIG. 60 taken along line L-L of FIG. 60.

FIGS. 60 and 61 show OSLM 5810 mounted in inner filter 5814. Inner filter 5814 includes a circular base 6012 having a cylindrical wall 6014 extending therefrom forming a recess 6016 in which OSLM 5810 is mounted. Inner filter 5814 has a width/diameter 6022 and a height 6024. Circular base 6012 has a thickness 6026. Cylindrical wall 6014 has a thickness 6028. Recess 6016 has a width/diameter 6032 that is the same as width/diameter 5852 of OSLM 5810.

In one embodiment of the present invention, the inner filter has a width/diameter of about 6.8 mm to about 6.9 mm. In one embodiment of the present invention, the inner filter has a height of about 2.4 mm to about 2.5 mm. In one embodiment of the present invention, the base of the inner filter has a thickness of about 0.2 mm to about 2.1 mm. In one embodiment of the present invention, the cylindrical wall of the inner filter has a width of about 0.2 mm to about 0.21 mm. In one embodiment of the present invention, the recess of the inner filter has a minimum width/diameter of about 6.1 mm to about 6.2 mm.

FIGS. 62 and 63 shows retaining ring 5818 in a relaxed state having a gap 6212 between ends 5820 and 5822. Retaining ring 5818 has a maximum diameter of 6214, a x-thickness 6216 and a y-thickness 6218. Maximum diameter 6214 is slightly greater than the width/diameter 6032 of recess 6016 of inner filter 5814.

In one embodiment of the present invention, the retaining ring has an x-thickness of about 0.6 mm to about 0.62 mm. In one embodiment of the present invention, the retaining ring has an y-thickness of about 0.6 mm to about 0.62 mm.

FIGS. 64 and 65 show outer filter 5816. Outer filter 5816 includes a circular base 6412 having a cylindrical wall 6414 extending therefrom forming a recess 6416. Outer filter 5816 has a width/diameter 6422 and a height 6424. Circular base 6412 has a thickness 6426. Cylindrical wall 6414 has a thickness 6428. Recess 6416 has a width/diameter 6432 that is substantially the same as the width/diameter 6222 of inner filter 5814.

In one embodiment of the present invention, the outer filter has a width/diameter of about 7.7 mm to about 7.75 mm. In one embodiment of the present invention, the outer filter has a height of about 3 mm to about 3.1 mm. In one embodiment of the present invention, the base of the outer filter has a thickness of about 0.36 mm to about 0.37 mm. In one embodiment of the present invention, the cylindrical wall of the outer filter has a width of about 0.4 mm to about 0.41 mm.

Although cylindrical cup-shaped filters used in the embodiments of the OSL sensors of the present invention are described above and shown in the drawings, the filters of the present invention may be any of a variety of shapes. An advantage of cylindrical cup-shaped radiation filters is that they are able to measure a high angle of incidence of radiation. Instead of having a circular base, the filters of the present invention may have bases of other shapes such as oval, triangular, square, rectangular, pentagonal, hexagonal, octagonal, etc. A filter of the present invention may be solid, in which case the filter is mounted above one side of the OSLM or mounted on the OSL. Or, similar to the OSL sensor of FIGS. 58 and 59, the filters may have a recess in which the OSLM may be mounted. The cross-sectional shape of the recess may be similar to the shape of the base, such as the circular cross-sectional shape of the recesses of FIGS. 58, 59, 60, 61, 62 and 63.

An OSL sensor of the present invention may include one, two, three or any other number of filters. When the filters are cup-shaped, the filters may nest, one within each other, as shown in FIGS. 7, 34, 35, 58, 59, 60 and 61. Although cup-shaped filters having circular cross-sections are shown in FIGS. 7, 34, 35, 58, 59, 60, 61, 62 and 63, cup-shaped filters having other cross-sectional shapes such as oval, triangular, square, rectangular, pentagonal, hexagonal, octagonal, etc. may also be nested in each other.

In one embodiment of the present invention, an OSL sensor may use only one cylindrical cup-shaped filter for the neutron-sensitive OSL sensor and the reference OSL sensor as long as both OSL sensors respond similarly to gamma radiation and x-ray radiation.

Although disc-shaped pellets of OSLM used in the embodiments of the OSL sensors of the present invention are described above and shown in the drawings, the OSLM used in the OSL sensors may have a variety of shapes and cross-sections. When mounted in a filter, the OSLM may have a shape that is complementary to the shape of the filter, such as a disc-shaped pellet of OSLM mounted in a cylindrical cup-shaped filter or a cube or rectangular box-shaped pellet of OSLM mounted in a filter with a rectangular box-shaped recess.

In one embodiment of the present invention, the OSLM may be poured into a cup-shaped filter in a liquid form. When the OSLM solidifies, the OSLM takes on the shape of the recess in the cup-shaped filter.

In one embodiment, the OSLM of the present invention may be a disc-shaped pellet comprising $Al_2O_3$:C made from particles having a grain size of 30-40 μm. The thickness of the pellet may vary depending on the particular application.

Although the filters of the present invention in the embodiments described above and shown in the drawing figures are made of copper and aluminum, the filters of the present invention may be made of other materials that are sensitive to radiation. In one embodiment, the filters may be made of plastic having dispersed therein metal particles or a metal powder. The type of metal used in such a plastic/metal filter and the size of the particles may vary depending on the function of the filter. For example, metals having a large atomic weight may be desirable if the filter is used to remove the presence of low energy x-rays. The degree of x-ray absorption can be adjusted by changing the concentration and grain size of the metal particles in the plastic/metal filter. Metals having smaller atomic weights may be used in filters designed to provide less energy compensation. The degree of x-ray absorption can be adjusted by changing the concentration and grain size of the metal particles in the plastic/metal filter.

In one embodiment of the present invention the filters carried by a dosimeter sled may include plastic/metal filters each having different types of metal particles and/or having different concentrations of metal particles and/or having metal particles of different grain sizes dispersed in the plastic material of each filter.

Although in the embodiments shown there are three OSL sensors in the dosimeter sled, in some embodiments of the present invention there may be one, two, or four or more OSL sensors in the dosimeter sled. If necessary, four or more sensors may be accommodated in the dosimeter sled by making each of the OSL sensors smaller or making the dosimeter sled longer, thicker or wider.

If necessary, additional sensors and additional types of radiation sensors may be accommodated in the dosimeter sled by making each of the OSL sensors smaller or making the dosimeter sled longer, thicker or wider.

In one embodiment of the present invention, a converter material disc has a thickness of 1 mm to about 1.1 mm. In one embodiment of the present invention, the converter material may be a film or sheet having a thickness of 0.1 mm to about 0.2 mm. In one embodiment the converter material may be a film of polyethylene having a thickness of less than 1 mm.

In one embodiment the present invention, a reference filter material coating has a thickness of 1 mm to about 1.1 mm. In one embodiment of the present invention, the reference filter material may be a film or sheet having a thickness of 0.1 mm to about 0.2 mm. In one embodiment of the present invention, the reference filter material may be a film of polytetrafluoroethylene having a thickness of less than 1 μm.

In various embodiments of the present invention, including the embodiments shown above and described in the drawings, the radiation dosimeter may include an RFID tag that identifies the radiation dosimeter and the individual associated with the radiation dosimeter i.e. the individual who has been wearing the radiation dosimeter. The identification information from the RFID tag allows an RFID tag reader that is part of a dosimeter reader to access information about the radiation dosimeter and the individual from a database. Such information may include: the identity of the individual who has been wearing the radiation dosimeter, the last time the radiation dosimeter was read, the serial number of the reader used for the last dosage measurement, a record of the results of previous readings of the dosimeter, a record of the individual's cumulative exposure to various types of radiation, an alphanumeric serial number assigned to the dosimeter, an alphanumeric serial number assigned to the upper housing, an alphanumeric serial number assigned to the lower housing, an alphanumeric serial number assigned to the dosimeter sled, etc. In some embodiments, the dosimeter reader may also transmit information to the database to update the information for the radiation dosimeter and the individual in the database. The database may be stored in the dosimeter reader or stored at another location such as a personal computer, a networked computer, a centralized record database, etc.

Although the identification indicia/alphanumeric serial number assigned to the dosimeter sled and upper housing are identical in the embodiments described above and shown in the drawings, in other embodiments the dosimeter sled and lower housing may be assigned different alphanumeric serial numbers. The dosimeter as a whole and the upper housing may also be assigned alphanumeric serial numbers that are the same as or different from the serial numbers assigned to the lower housing and dosimeter sled.

FIG. 66 shows a radiation dosimeter 6602 according to one embodiment of the present invention including a strap member 6604 threaded through openings 6612 and 6614 of respective loops 6616 and 6618 of radiation dosimeter 6602. Strap member 6604 is threaded beneath the lower housing (not shown) of radiation dosimeter 6602. Strap member 6604 includes a buckle 6632 and loop 6634 through which an end 6636 may be slipped so that radiation dosimeter 6602 may be worn on an individual's wrist, similar to the way that a wristwatch is worn. Strap member 6604 may be easily removed from radiation dosimeter 6602 to allow radiation dosimeter 6602 to be read.

FIG. 67 shows a radiation dosimeter 6702 according to one embodiment of the present invention including a strap member 6204 threaded through openings 6712 and 6714 of respective loops 6716 and 6718 of radiation dosimeter 6702. Strap member 6704 is threaded above upper housing 6722 of radiation dosimeter 6702. Strap member 6704 includes a buckle 6732 through which an end 6734 may be slipped so that radiation dosimeter 6702 may be worn on an individual's wrist, similar to the way that a wristwatch is worn. Strap member 6704 may be easily removed from radiation dosimeter 6702 to allow radiation dosimeter 6702 to be read.

Figure 68:
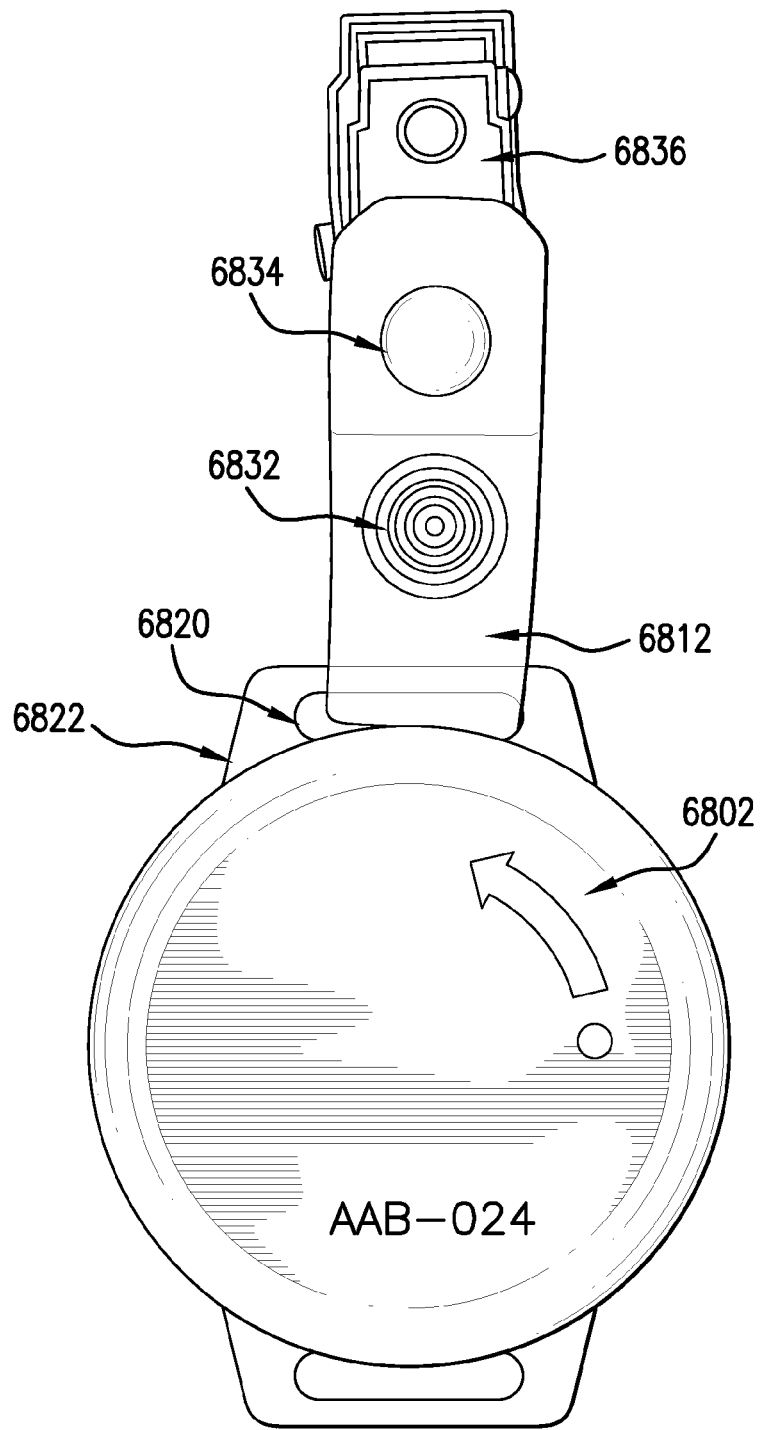
FIG. 68 is an image of a radiation dosimeter of the present invention with a clip according to one embodiment of the present invention.

FIG. 68 shows a radiation dosimeter 6802 according to one embodiment of the present invention that is attached to a clip 6804. Clip 6804 includes a strap member 6812 that is looped through an opening 6820 of a loop 6822 of radiation dosimeter 6802. Strap member 6812 is fastened back on itself by a snap fastener 6832. Attached to strap member 6812 by a bolt 6834 is a spring clip 6836. Spring clip 6836 may be used to clip radiation dosimeter 6802 to a shirt or pants pocket, a shirt lapel, a necklace worn by an individual, etc. Strap member 6812 may be easily removed from radiation dosimeter 6802 to allow radiation dosimeter 6802 to be read.

Although in the embodiment shown, the strap member is a one-piece strap member, in other embodiments of the present invention, the strap member may be a two-piece strap member.

Various types of strap members, both adjustable and non-adjustable, may be used with the dosimeter of the present invention. For example, the strap member may be a one-piece elastic strap. The strap member may also be an adjustable strap where the two ends of the strap are buckled together in a fashion similar to the way that a belt is buckled around an individual's waist or a wristwatch is buckled around an individual's wrist. In such a configuration, one end of the strap member includes a buckle through which the second end of the strap member is inserted. The strap member may also be an adjustable strap member in which one end of the strap member includes a buckle through which the second end of the strap is threaded, thereby allowing the length of the strap member to be adjusted by sliding the second strap through the buckle, similar to the adjustable two-piece straps used in backpacks, shoulder bags, fanny packs, etc. An example of such a two-piece strap member is described in U.S. Pat. No. 5,632,429 to Cantwell, the entire contents and disclosure of which are incorporated herein by reference. The strap member may also be an adjustable strap member whose ends are adjustably fastened together using hook-and-loop fasteners (e.g. Velcro®) with a strip of hooks on one end of the strap member and a strip of loops on the other end of the strap member. Using hook-and-loop fasteners to fasten the strap member together also allows the size of the strap member to be adjusted by making the strip of hooks and/or the strip of loops long enough that the strips may be fastened together to form a strip member of various lengths. Various other types of adjustable and non-adjustable strip members may also be used with the dosimeter of the present invention.

The dosimeter of the present invention may be worn by an individual in a variety of ways. For example, the dosimeter may be worn on a strap around a user's wrist, arm, shoulder, head, waist, ankle, leg, etc. The dosimeter may also be worn on a strap around an article of the individual's clothing such as a helmet, shirtsleeve, pants leg, etc. The dosimeter may also be carried in an individual's shirt pocket, pants pocket, etc.

Figure 69:
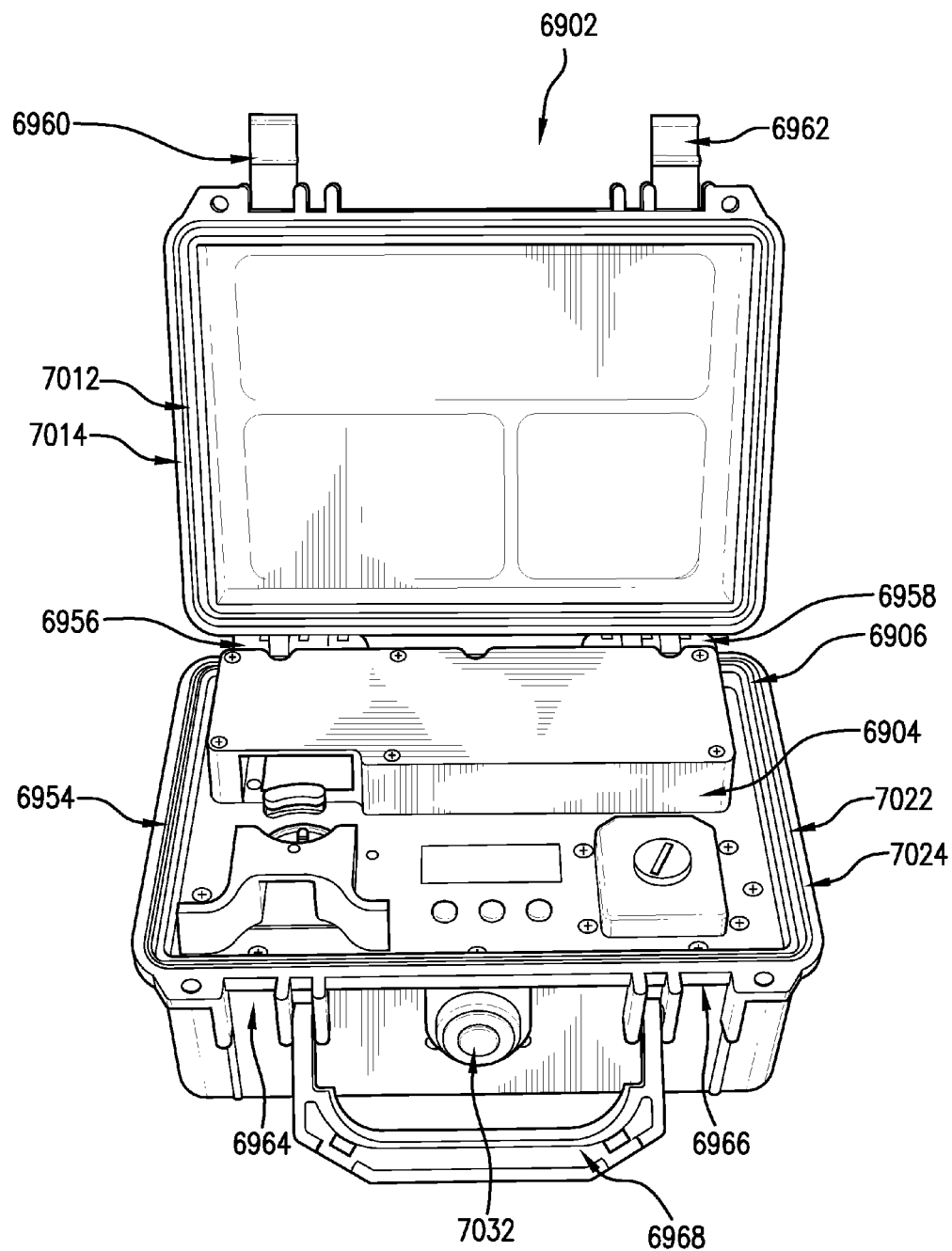
FIG. 69 is an image of a dosimeter reader according to one embodiment of the present invention.
Figure 70:
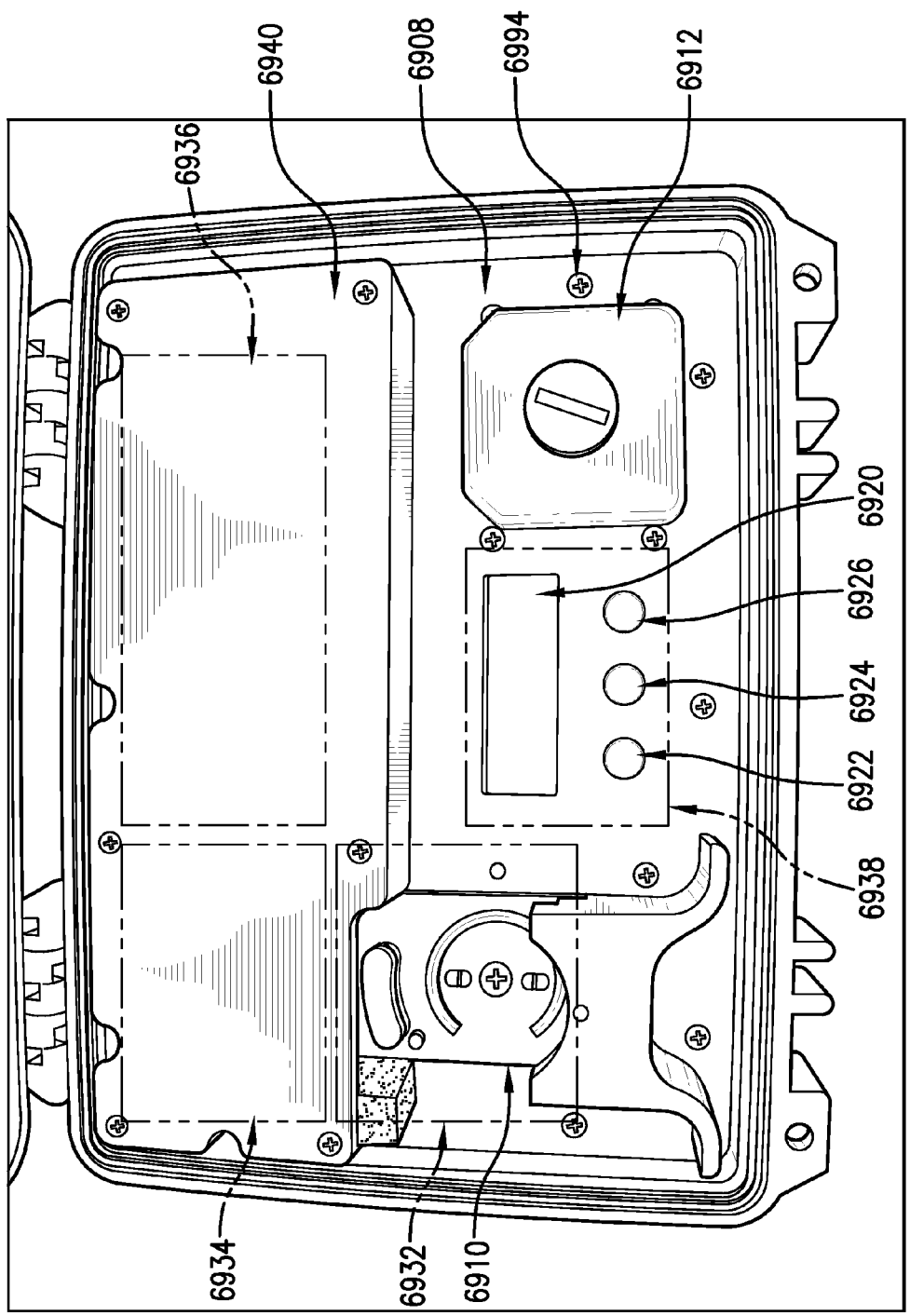
FIG. 70 is a close-up image of a dosimeter reader body of the dosimeter reader of FIG. 69.
Figure 71:
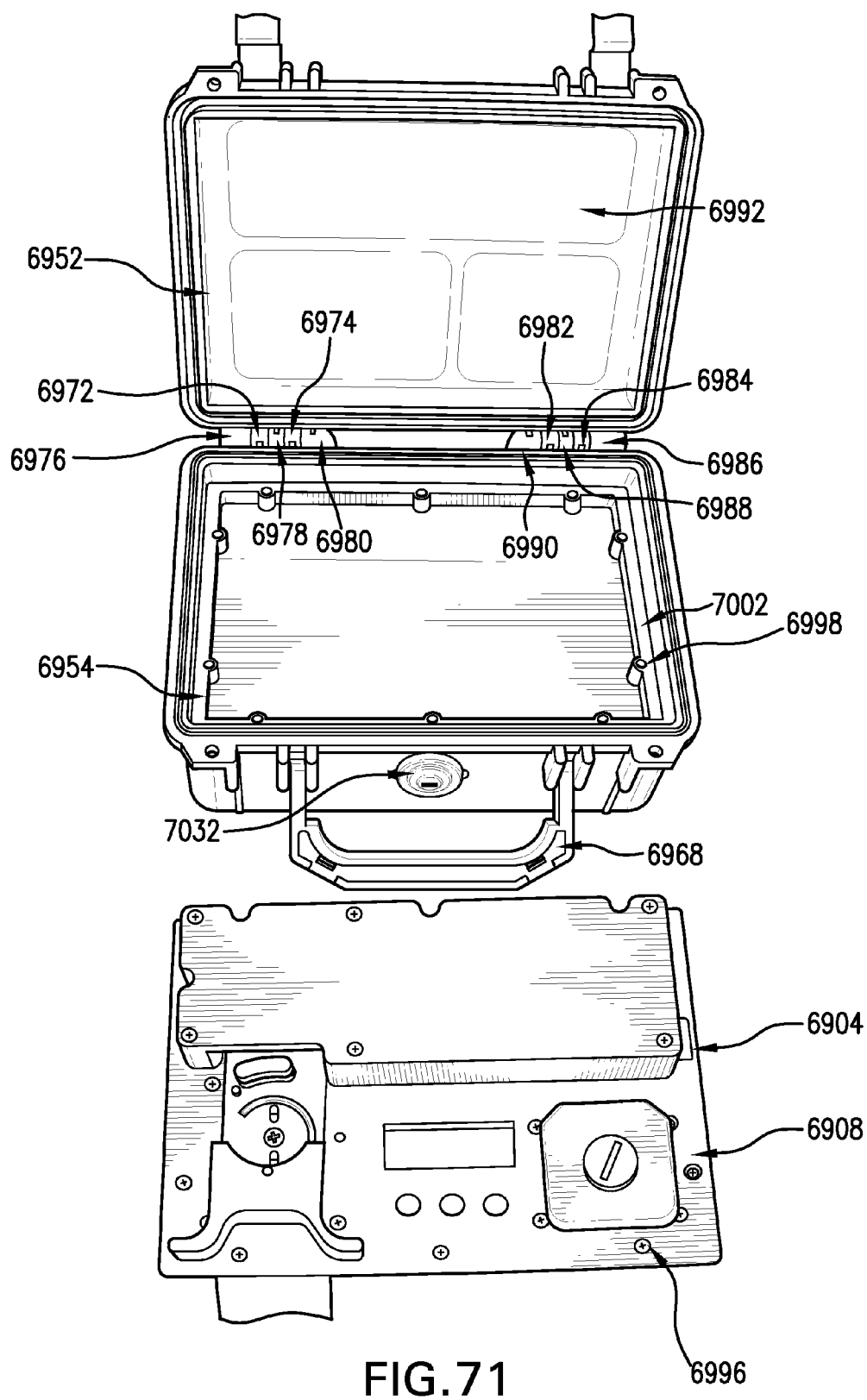
FIG. 71 is an image of a dosimeter reader case and the dosimeter reader body of the dosimeter reader of FIG. 69.

FIGS. 69, 70 and 71 show a portable dosimeter reader 6902 according to one embodiment of the present invention that comprises a dosimeter reader body 6904 mounted in a clamshell type dosimeter reader case 6906. Dosimeter reader body 6904 includes a dosimeter reader chassis 6908, a dosimeter drawer 6910, a battery compartment 6912, a display 6920 and control buttons 6922, 6924 and 6926. Control buttons 6922, 6924 and 6926 may be used by an individual to: turn on and off the power for dosimeter reader 6902, initiate an analytical sequence for dosimeter reader 6902, and turn on a back light for display 6920 for viewing the results in low light. Control buttons 6922, 6924 and 6926 may also be used cycle through various screen displays on display 6920 of: dose results, raw data, calibration factors and other information used in analyzing the results from reading a dosimeter (not shown in FIGS. 69, 70 and 71). Dosimeter reader body 6904 has three regions: a dosimeter loading/unloading region 6932, a dosimeter ready region 6934 and a dosimeter reading region 6936. A housing cover 6940 covers dosimeter ready region 6934 and dosimeter reading region 6936. Contained in battery compartment 6912 are four (4) AA batteries (not visible in FIGS. 69, 70 and 71) that provide power for dosimeter reader

6902. Dosimeter reader case 6906 has an upper shell 6952 and an lower shell 6954 that are pivotably connected to each other by pivot joints 6956 and 6958. Upper shell 6952 includes latches 6960 and 6962 that engage latch receiving structures 6964 and 6966 on lower shell 6954 to hold upper shell 6952 and lower shell 6954 together when upper shell 6952 is pivoted to cover lower shell 6954. A handle 6968, which may be used to carry dosimeter reader 6902, is pivotably mounted on lower shell 6954.

Pivot joint 6956 is comprised of upper pivot structures 6972 and 6974 of upper shell 6952, lower pivot structures 6976, 6978 and 6980 of lower shell 6954, and a pin (not visible in FIGS. 69, 70 and 71) that extends through pivot structures 6972, 6974, 6976, 6978 and 6980. Pivot joint 6958 is comprised of upper pivot structures 6982 and 6984 of upper shell 6952, lower pivot structures 6986, 6988 and 6980 of lower shell 6954, and a pin (not visible in FIGS. 69, 69 and 70) that extends through pivot structures 6982, 6984, 6986, 6988 and 6990. Upper shell 6952 includes operating instructions 6992 for dosimeter reader 6902. Dosimeter reader body 6904 is mounted in a clamshell type dosimeter reader case 6906 by screws 6994 being screwed through openings 6996 into threaded opening 6998 in a frame 7002 mounted in lower shell 6954.

Upper shell 6952 includes a peripheral groove 7012 around a peripheral edge 7014 of upper shell 6952. Lower shell 6954 includes a peripheral ridge 7022 around a peripheral edge 7024 of lower shell 6954. When dosimeter reader case 6906 is closed, peripheral ridge 7022 engages peripheral groove 7012 to form a seal that makes dosimeter reader case 6906 air-tight and water-tight. Lower shell includes a pressure relief valve 7032 that allows dosimeter reader case 6906 to be easily opened when the atmospheric or altitudinal pressure is different during opening than when the dosimeter reader case 6906 is closed. If the pressure inside dosimeter reader case 6906 is much less that the outside pressure, dosimeter reader case 6906 may be hard to open.

Figure 72:
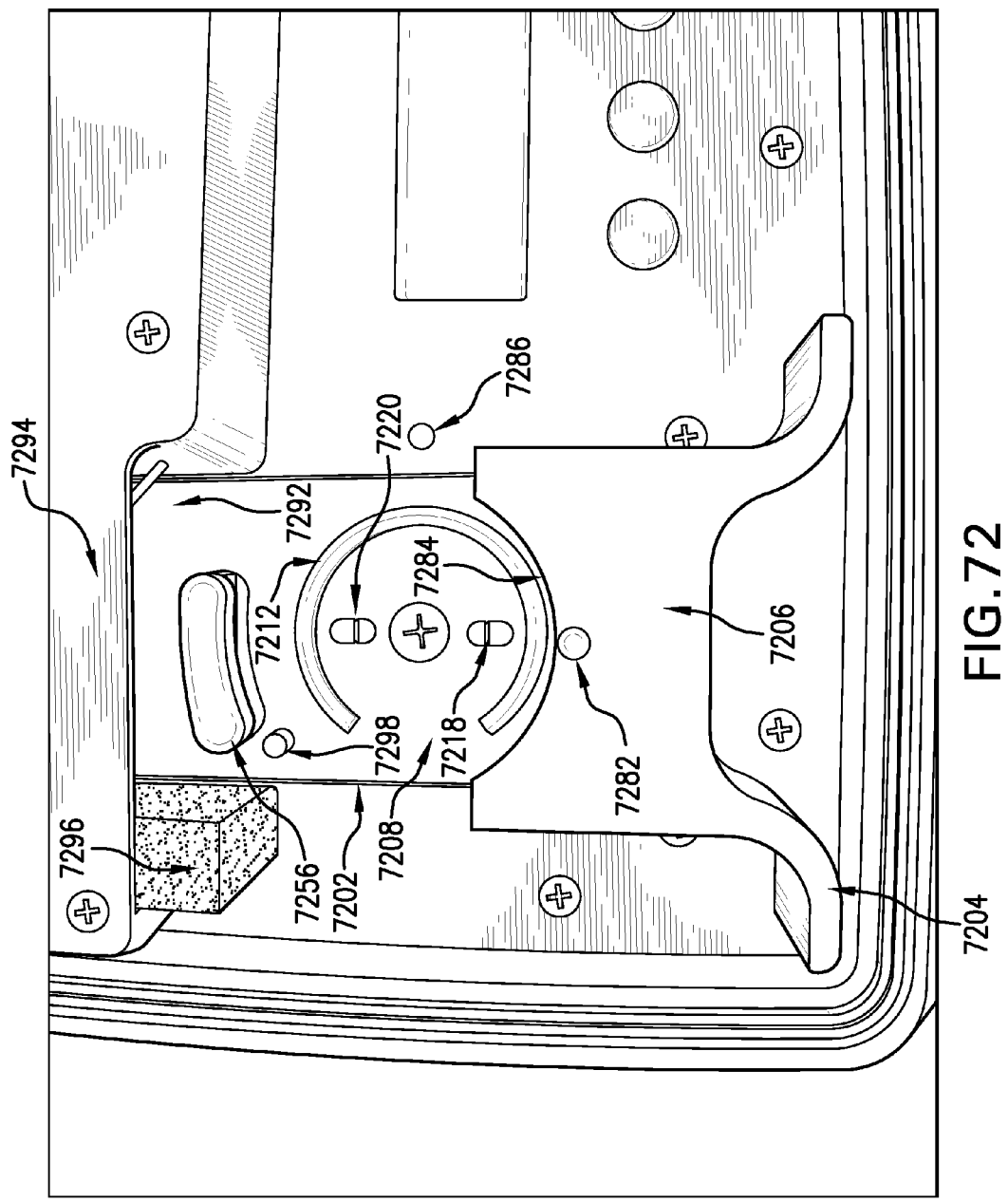
FIG. 72 is an image of a dosimeter drawer of the dosimeter reader of FIG. 69.
Figure 73:
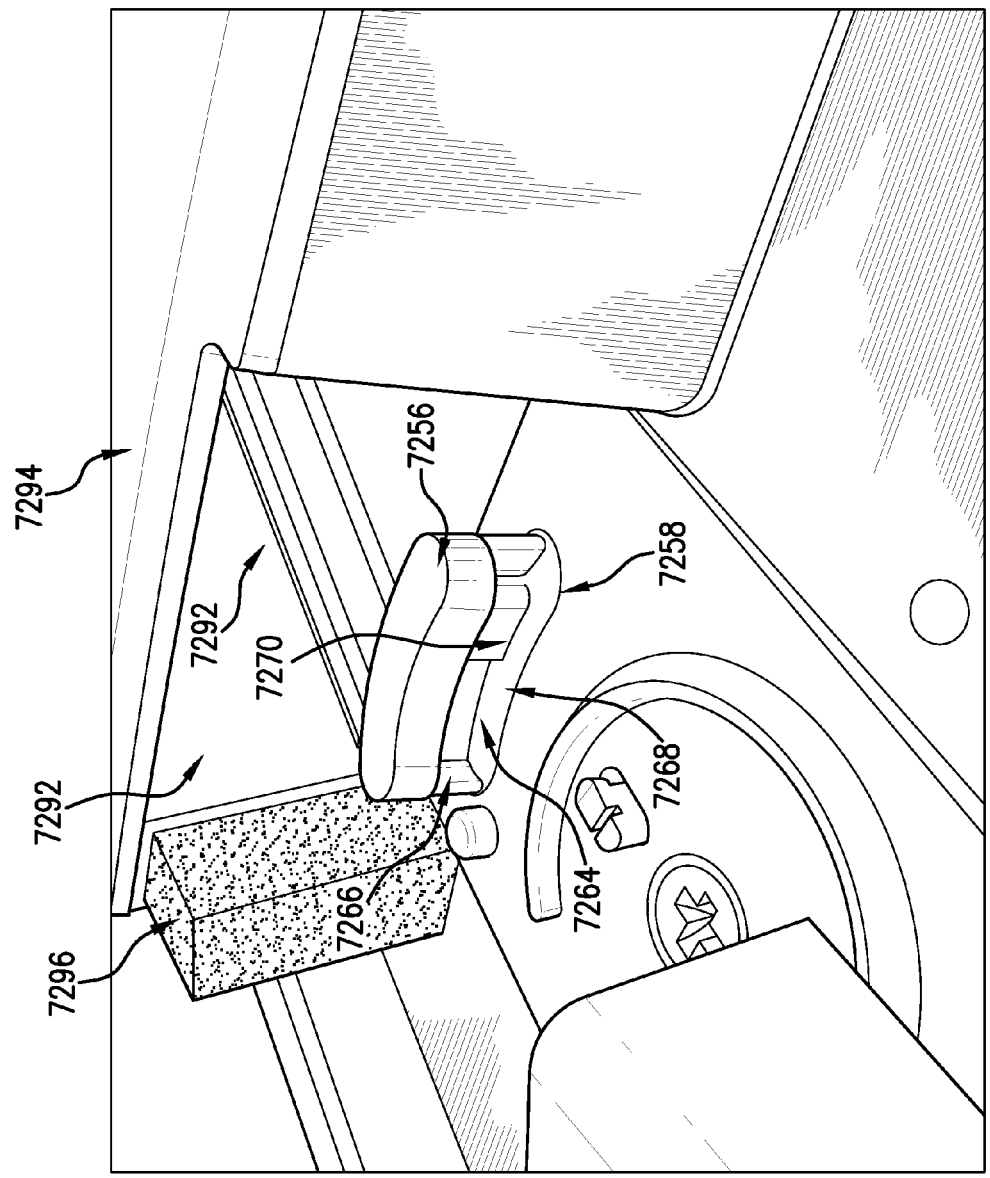
FIG. 73 is a close-up image of one of two loop retainers extending through a drawer base of the dosimeter drawer of FIG. 72.
Figure 74:
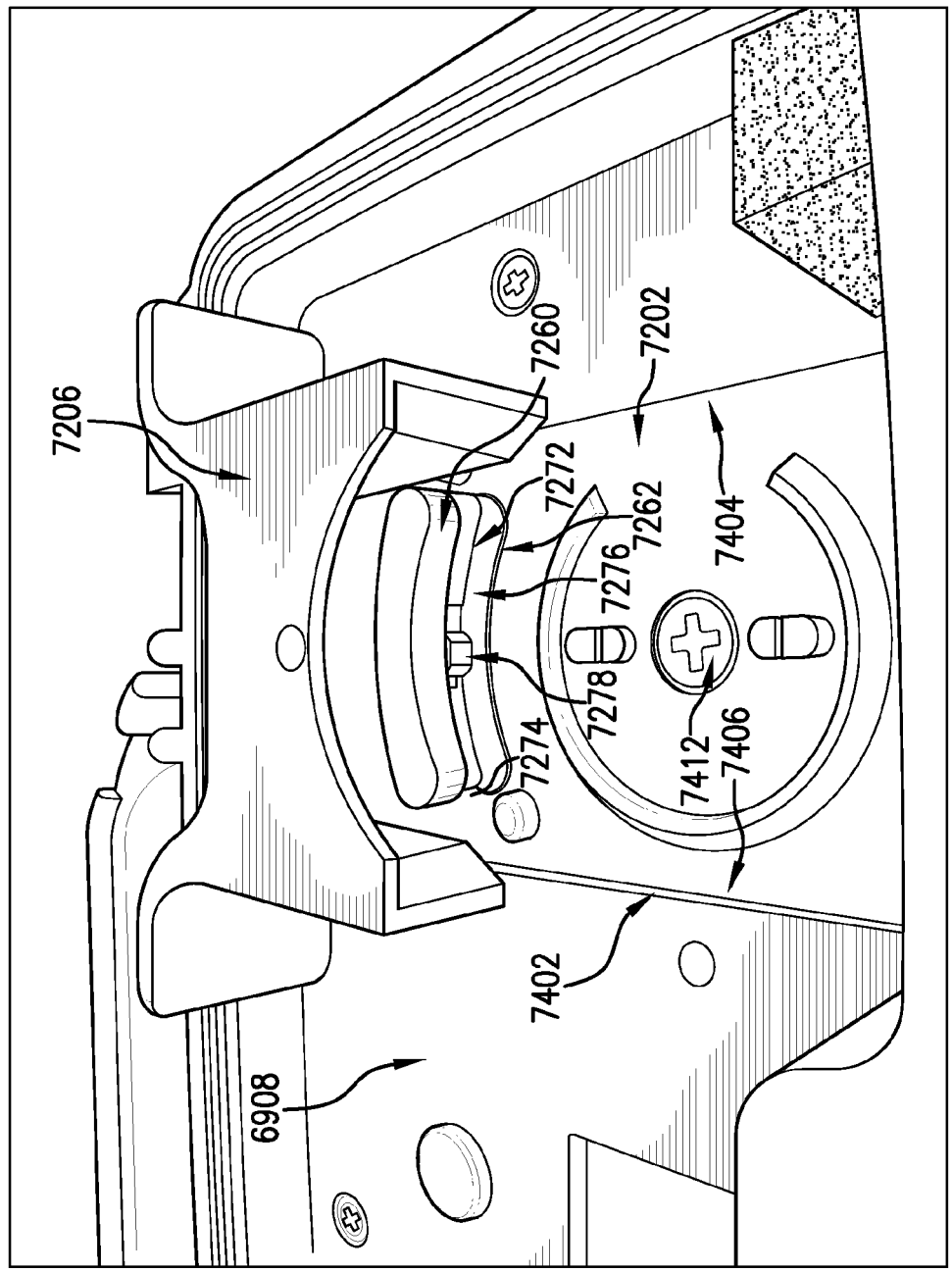
FIG. 74 is a close-up image of the other loop retainer extending through a drawer base of the dosimeter drawer of FIG. 72.
Figure 75:
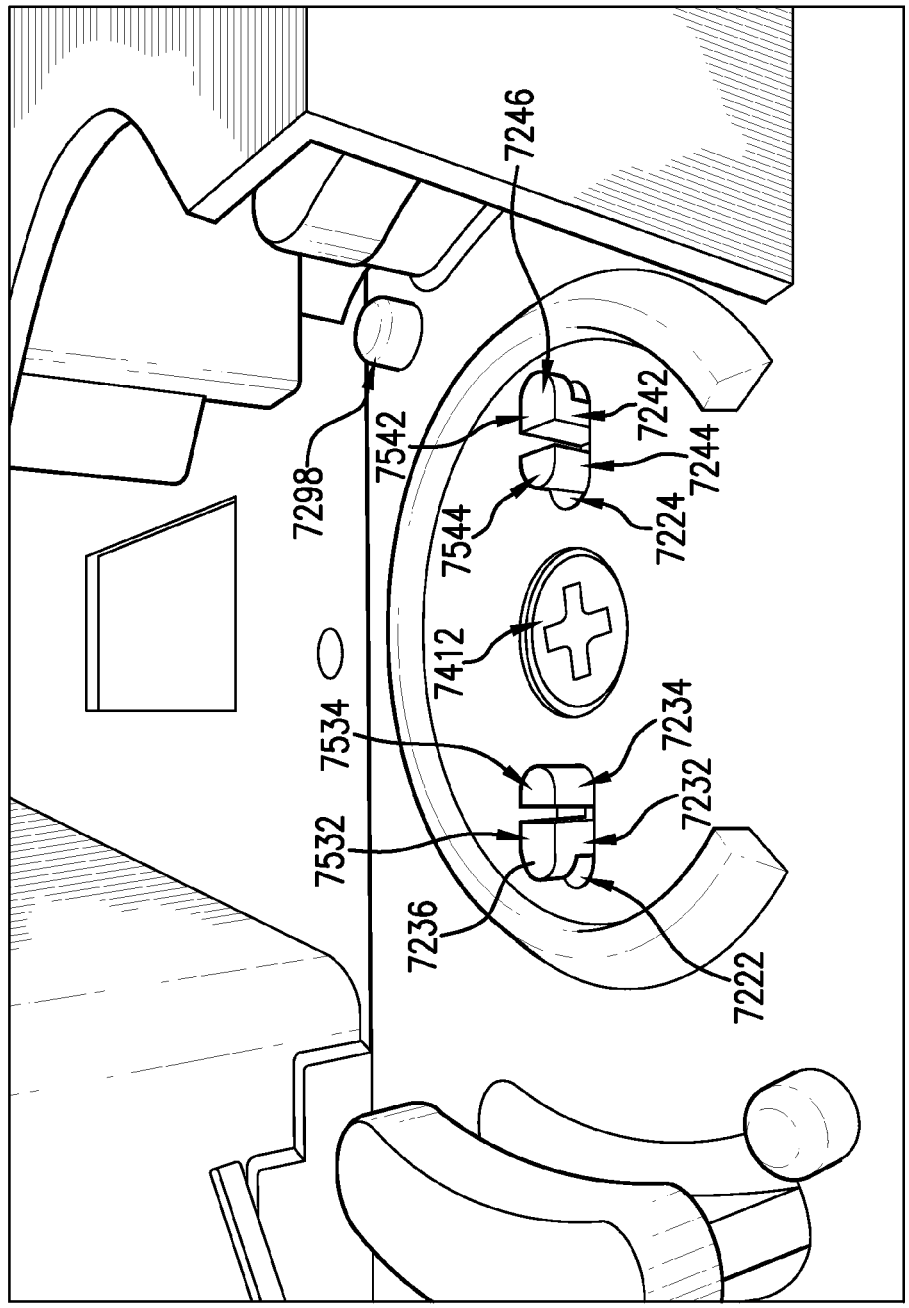
FIG. 75 shows two spring tabs extending through openings in the drawer base of the dosimeter drawer of FIG. 72.

FIGS. 72, 73, 74 and 75 show details of dosimeter drawer 6910 and dosimeter loading/unloading region 6932. Dosimeter drawer 6910 includes a drawer base 7202 (a dosimeter receiving surface) and a drawer handle 7204. Drawer handle 7204 is part of a hollow drawer housing 7206. A top face 7208 of drawer base 7202 includes a C-shaped ridge 7212. Two retaining tabs 7218 and 7220 extend through respective openings 7222 and 7224 in drawer base 7202. Retaining tab 7218 includes an exterior leg 7232 and interior leg 7234. Leg 7232 includes a foot 7236. Retaining tab 7220 includes an exterior leg 7242 and interior leg 7244. Leg 7242 includes a foot 7246. An exposed kidney-shaped dosimeter loop retainer 7256 extends through an opening 7258 in drawer base 7202. A covered kidney-shaped dosimeter loop retainer 7260 extends through an opening 7262 in drawer base 7202 and is covered by drawer housing 7206. Dosimeter loop retainer 7260 is slightly longer than dosimeter loop retainer 7256. Dosimeter loop retainer 7256 includes a receiving slot 7264, an end wall 7266, a base 7268 and a spring tab 7270. Dosimeter loop retainer 7260 includes a receiving slot 7272, an end wall 7274, a base 7276 and a spring tab 7278. Drawer housing 7206 includes an alignment dot 7282 at a curved edge 7284 of drawer housing 7206. Another alignment dot 7286 is located on dosimeter reader chassis 6908 adjacent to drawer base 7202. Also visible in FIGS. 72, 73 and 75 is an entrance 7292 into a ready region housing 7294 covered by housing cover 6940. To one side of entrance 7292 there is a piece of foam cushioning 7296. Drawer base 7202 also includes a loop stop 7298. Drawer base 7202 is slidably mounted an opening 7402 in dosimeter reader chassis 6908. Opening 7402 is located between edges 7404 and 7406. A screw 7412 is used to mount an axis mount (not visible in FIGS. 72, 73, 74 and 75) on a bottom face (not visible in FIGS. 72, 73, 74 and 75) of drawer base 7202. Exterior leg 7232 has an exterior leg top 7532, interior leg 7234 has an interior leg top 7534, exterior leg 7242 has an exterior leg top 7542 and interior leg 7344 has an interior leg top 7544.

Figure 76:
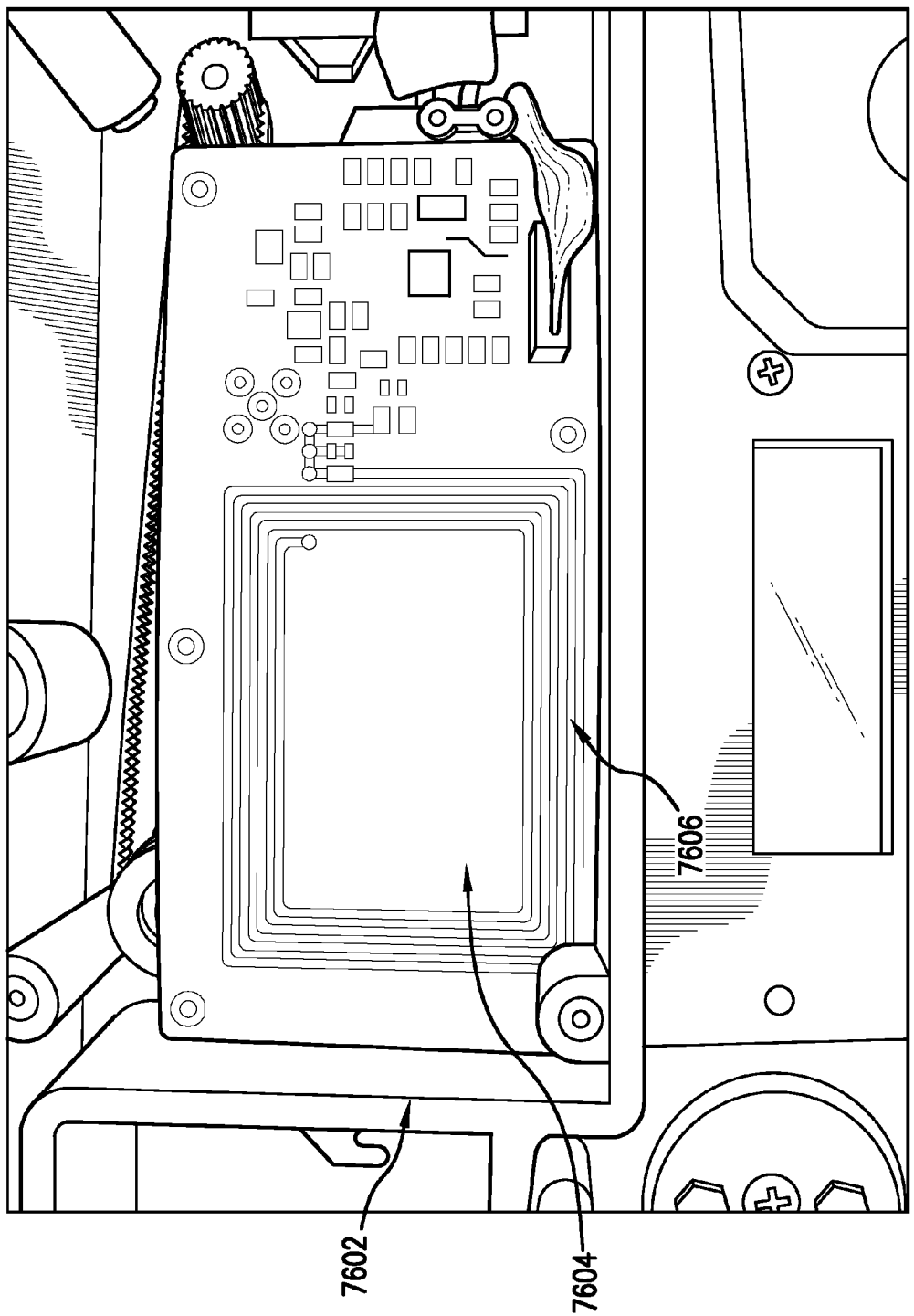
FIG. 76 is an image of the dosimeter reader of FIG. 69 with a housing cover removed to provide a close-up image of the RFID tag reader of the dosimeter reader of FIG. 69.

In FIG. 76 housing cover 6940 is removed to show a reader housing 7602 and RFID tag reader 7604 in dosimeter reading region 6936 that are usually covered by housing cover 6940. RFID tag reader 7604 includes an RF antenna 7606. RF antenna 7606 may be used to communicate with the RF antenna of an RFID tag of a dosimeter sled (not shown) that is positioned below RFID tag reader 7604.

Figure 77:
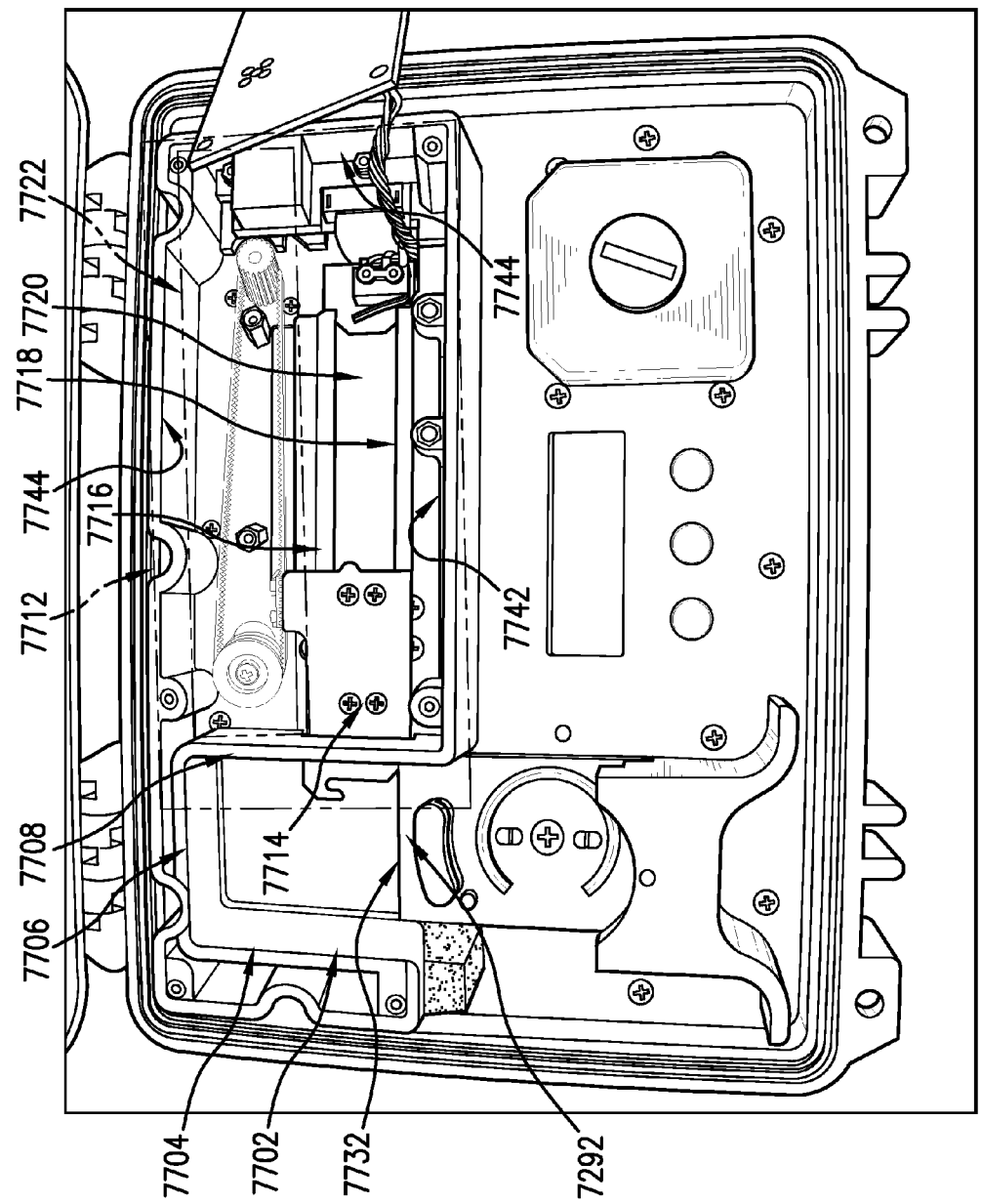
FIG. 77 image of the dosimeter reader body of the dosimeter reader of FIG. 69 with the housing cover removed to show details of a ready region housing, a reader housing and an OSL reader of the dosimeter reader of FIG. 69.

In FIG. 77 housing cover 6940 is removed to show ready region housing 7702 and reader housing 7602 that are normally covered by housing cover 6940. Ready region housing 7702 has three walls 7704, 7706 and 7708. RFID tag reader 7604 is removed to show OSL reader 7712. OSL reader 7712 includes a sled slider 7714 that travels on rails 7716 and 7718 of slide rail base 7720. Sled slider 7714 is moved back and forth on rails 7716 and 7718 by drive mechanism 7722. In FIG. 77 a distal end 7732 of drawer base 7202 is at entrance 7292 of ready region housing 7294. Reader housing 7602 includes walls 7742, 7744, 7746 and 7708. Wall 7708 is shared with ready region housing 7702.

Figure 78:
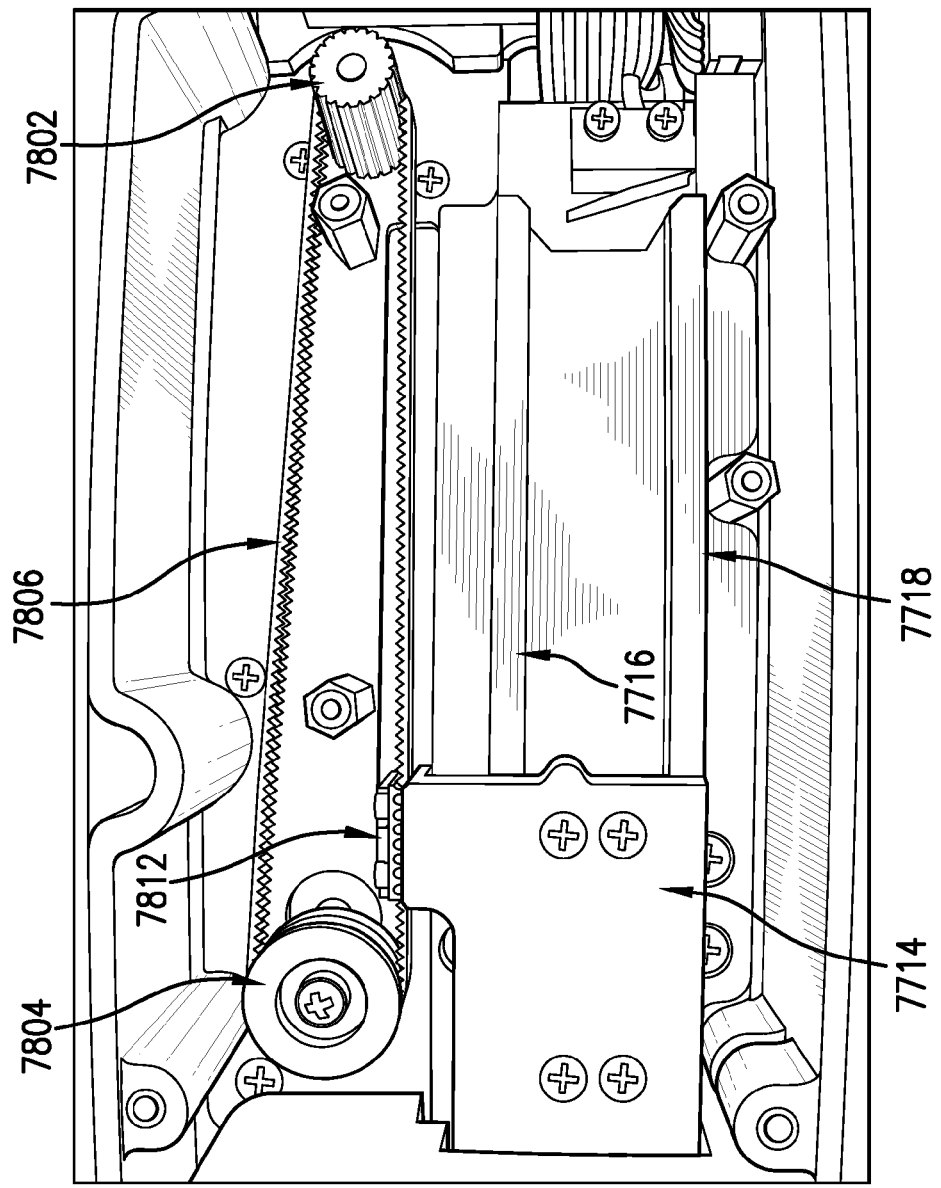
FIG. 78 is an image showing a sled slider of the OSL reader of FIG. 77.

FIG. 78 shows drive gear 7802, return wheel 7804 and toothed belt 7806 of drive mechanism 7722. Toothed belt 7806 is driven by drive gear 7802 and travels around drive gear 7802 and return wheel 7804. Sled slider 7714 is mounted on toothed belt 7806 by a carriage 7812.

Figure 79:
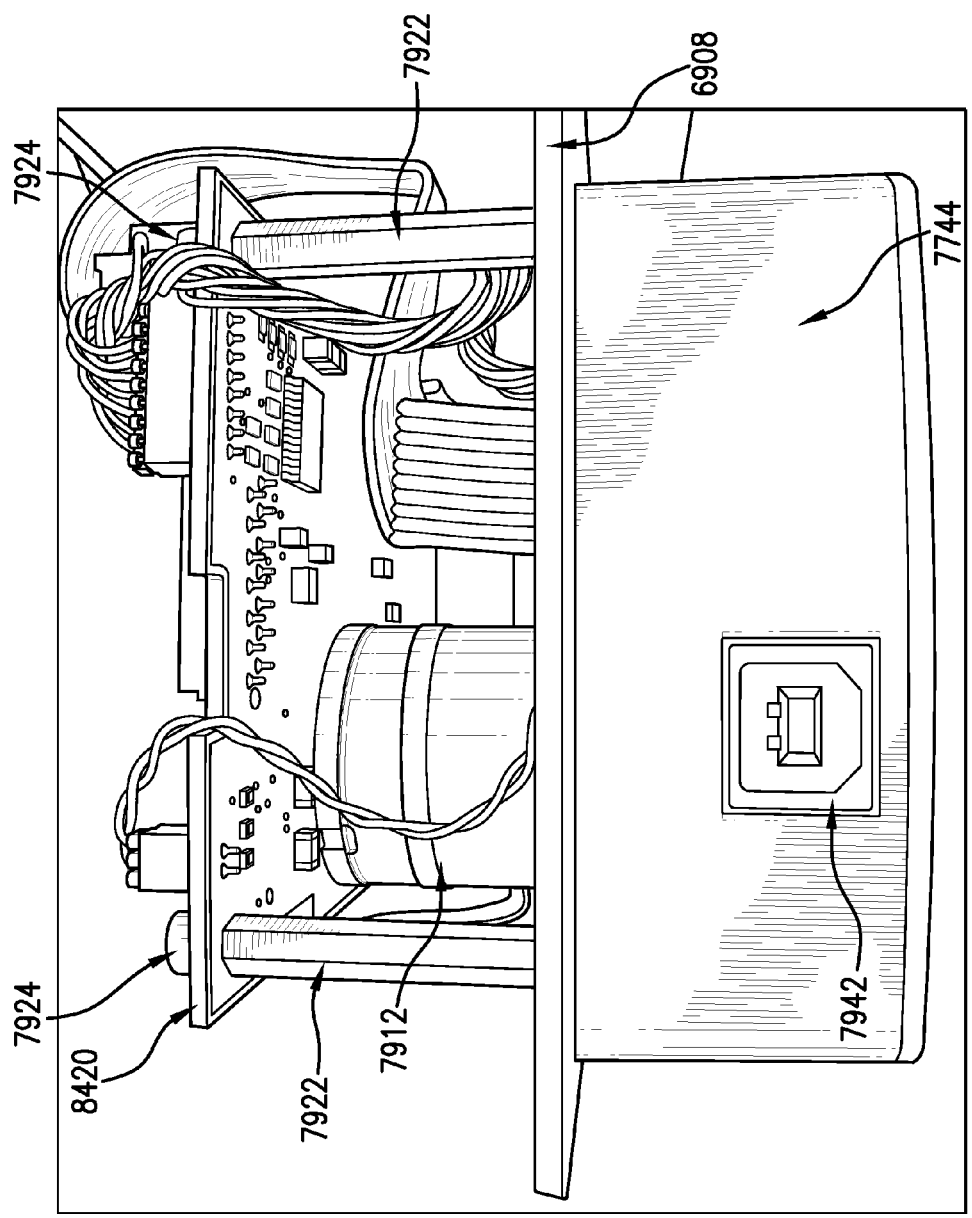
FIG. 79 is an image showing a sled slider motor of the OSL reader of FIG. 77 and a wall of the reader housing.

FIG. 79 shows a sled slider motor 7912 mounted on dosimeter reader chassis 6908. Sled slider motor 7912 includes a rotating drive shaft (not visible in FIG. 79) on which drive gear 7802 (not visible in FIG. 79) is mounted. Sled slider motor 7912 drives drive gear 7802 using the rotating drive shaft, thereby controlling the motion of sled slider 7714 (not visible in FIG. 79). FIG. 79 also shows PCB 8420 of OSL reader 7712 mounted underneath dosimeter reader chassis 6908 using screw posts 7922 and screws 7924. Only two screw posts 7922 and two screws 7924 are visible in FIG. 79, but four screw posts 7922 and four screws 7924 are used to mount PCB 8420 to dosimeter reader chassis 6908. PCB 8420 is spaced from dosimeter reader chassis 6908 by screw posts 7922 to allow motor 7912 to be located between dosimeter reader chassis 6908 and PCB 8420. In addition, FIG. 79 shows a USB port 7942 in wall 7744 of reader housing 7602. USB port 7942 allows dosimeter reader 6902 to communicate with other electronic devices, such as a computer, a data storage device, a printer, a monitor, etc. using a USB cable (not shown) plugged into USB port 7942.

Although one way of moving the sled slider is described above and show in the drawings, the motion of the sled slider may be moved in other ways. For example, the sled slide may be moved back and forth using a rack and pinion drive system in which a rotatable pinion gear is mounted on the sled slider and the sled slider is moved back and forth by rotating the pinion gear along a toothed rack.

Figure 80:
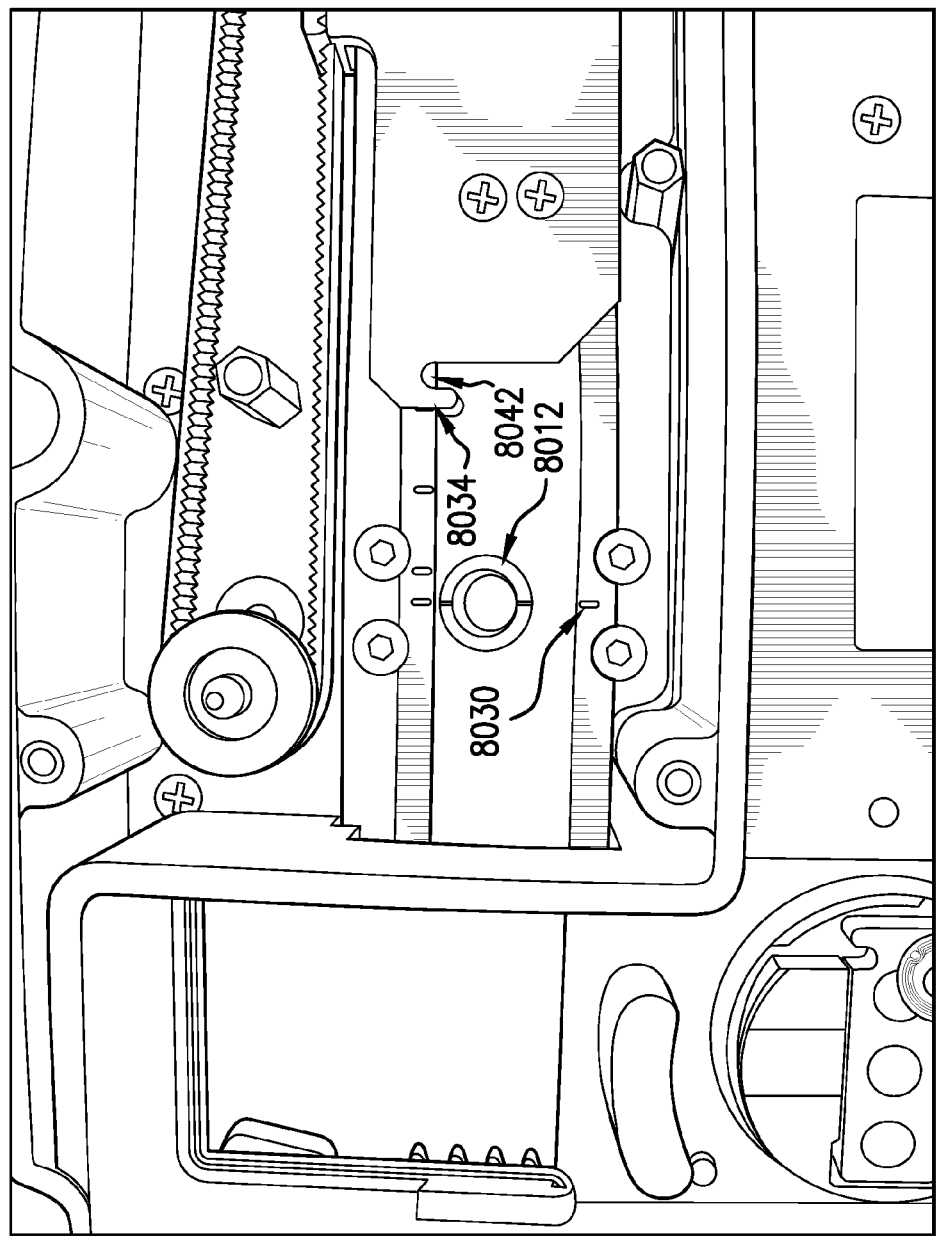
FIG. 80 is an image of the OSL reader of FIG. 77 with the slider positioned so that the optical light pipe of the OSL reader may be seen.
Figure 81:
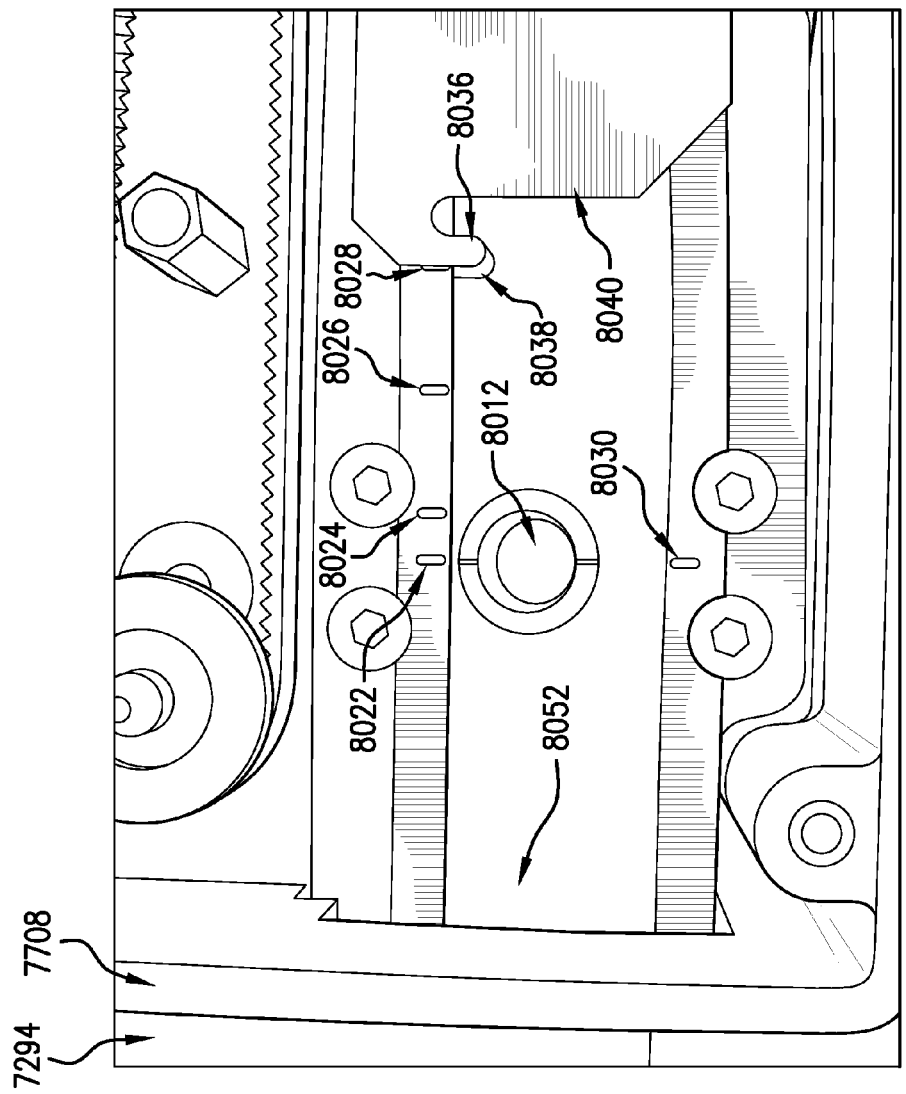
FIG. 81 is a close-up image of the optical light-pipe of FIG. 80.

FIGS. 80 and 81 show additional details of OSL reader 7712. Visible in FIGS. 80 and 81 is an optical light pipe 8012 of OSL reader 7712. Alignment marks 8022, 8024, 8026 and 8028 on rail 7716 and alignment mark 8030 may be used to position sled slider 7714 for various functions. Sled slider 7714 includes a bifurcated tang 8034 that includes prongs 8036 and 8038 on either side of rail 7716. Sled slider 7714 also includes a pusher end 8040. Between bifurcated tang 8034 and pusher end 8040 is a U-shaped detent 8042. Prior to a dosimeter sled (not shown in FIGS. 80 and 81) being pushed by dosimeter drawer 6910 into ready region housing 7294, sled slider 7714 travels through an opening 8052 in wall 7708 so that a respective U-shaped detent and tang of a dosimeter sled, such as U-shaped detent 678 and tang 679 of dosimeter sled 600, will be pushed to engage bifurcated tang 8034 and U-shaped detent 8042, respectively.

Each OSL sensor is moved to a respective reading position by dosimeter reader 6902 determining the distance that sled slider 7714 has moved the dosimeter sled. The slider motor includes an encoder that counts the number of revolutions or steps the drive shaft of the motor makes. This information may be correlated to a movement distance. Alignment marks 8022, 8024, 8026 and 8028 on rail 7716 and alignment mark 8030 correspond to a number of steps from a reference point.

Figure 82:
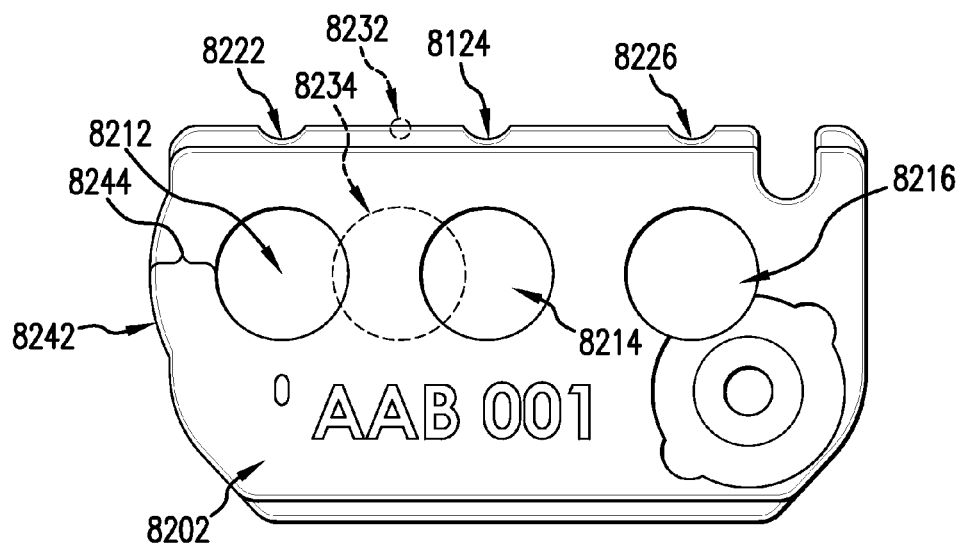
FIG. 82 is a schematic drawing that shows how a dosimeter sled blocks the light path of a photo-optic sensor according to one embodiment of the present invention when the dosimeter sled is not in a reading position for an OSL sensor.
Figure 83:
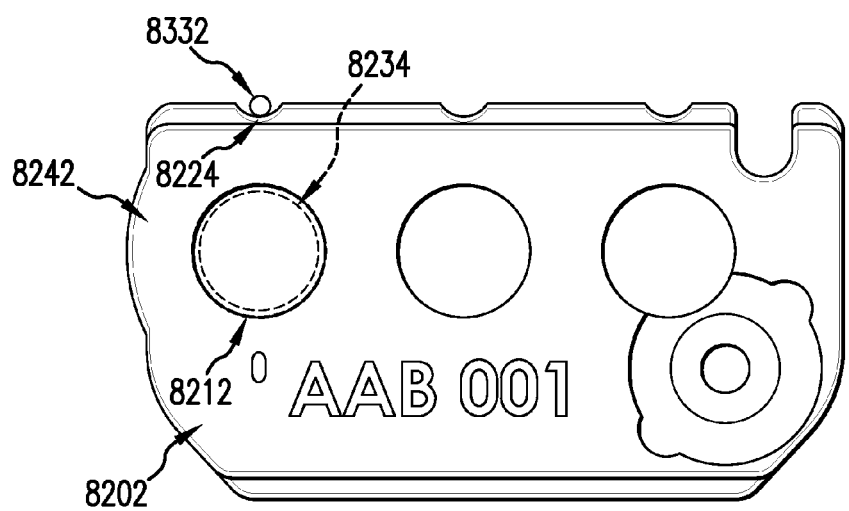
FIG. 83 is a schematic drawing that shows how a notch in the dosimeter sled opens the light path of the photo-optic sensor of FIG. 82 when the dosimeter sled in a reading position for an OSL sensor.

In one embodiment of the present invention, the dosimeter reader may include a photo-optic sensor for sensing when each of the OSL sensors of the dosimeter sled are aligned with the optical light pipe of the dosimeter reader. The photo-optic sensor may be mounted below one of the rails on which the slider slides and may be aligned with an alignment mark on one of the rails. FIGS. 82 and 83 show how the positioning notches of a dosimeter sled may be used to align the OSL sensors with the optical path of an OSL reader so that the stimulation light and luminescence light are consistently applied and captured. FIG. 82 shows a dosimeter sled 8202 having a sled body 8204 and three OSL sensors 8212, 8214 and 8214 in a non-reading position. OSL sensor 8212 is aligned with a semicircular positioning notch 8222, OSL sensor 8214 is aligned with a semicircular positioning notch 8224 and OSL sensor 8216 is aligned with a semicircular positioning notch 8226. A light path, shown by dashed circle 8232, of the photo-optic sensor is blocked by sled body 8204, indicating an optical light pipe 8234, the position of which is shown by a dashed circle, is not aligned with any of the three OSL sensors. Sled body 8204 has a curved end side 8242. OSL sensor 8212 is the closest OSL sensor to curved end side 8242. Between OSL sensor 8212 and curved end side 8242 is a region 8244. FIG. 83 shows a reading position for OSL sensor 8214. Notch 8224 creates an open space through which the light path, shown by solid circle 8332, of the photo-optic sensor may pass, indicating that optical light pipe 8234, the position of which is shown by a double dashed circle, is aligned with sensor 8212. Notches 8224 and 8226 may be used in a similar way to indicate the reading positions for OSL sensor 8214 and 8216, respectively. Curved end side 8242 ensures that region 8244 between OSL sensor 8212 and curved end side 8242 is large enough so that optical light pipe 8234 is fully covered when OSL sensor 8212 is read. As shown in FIGS. 82 and 83, optical light pipe 8012 is about the same diameter as the interior diameter of each of the OSL sensors.

Figure 84:
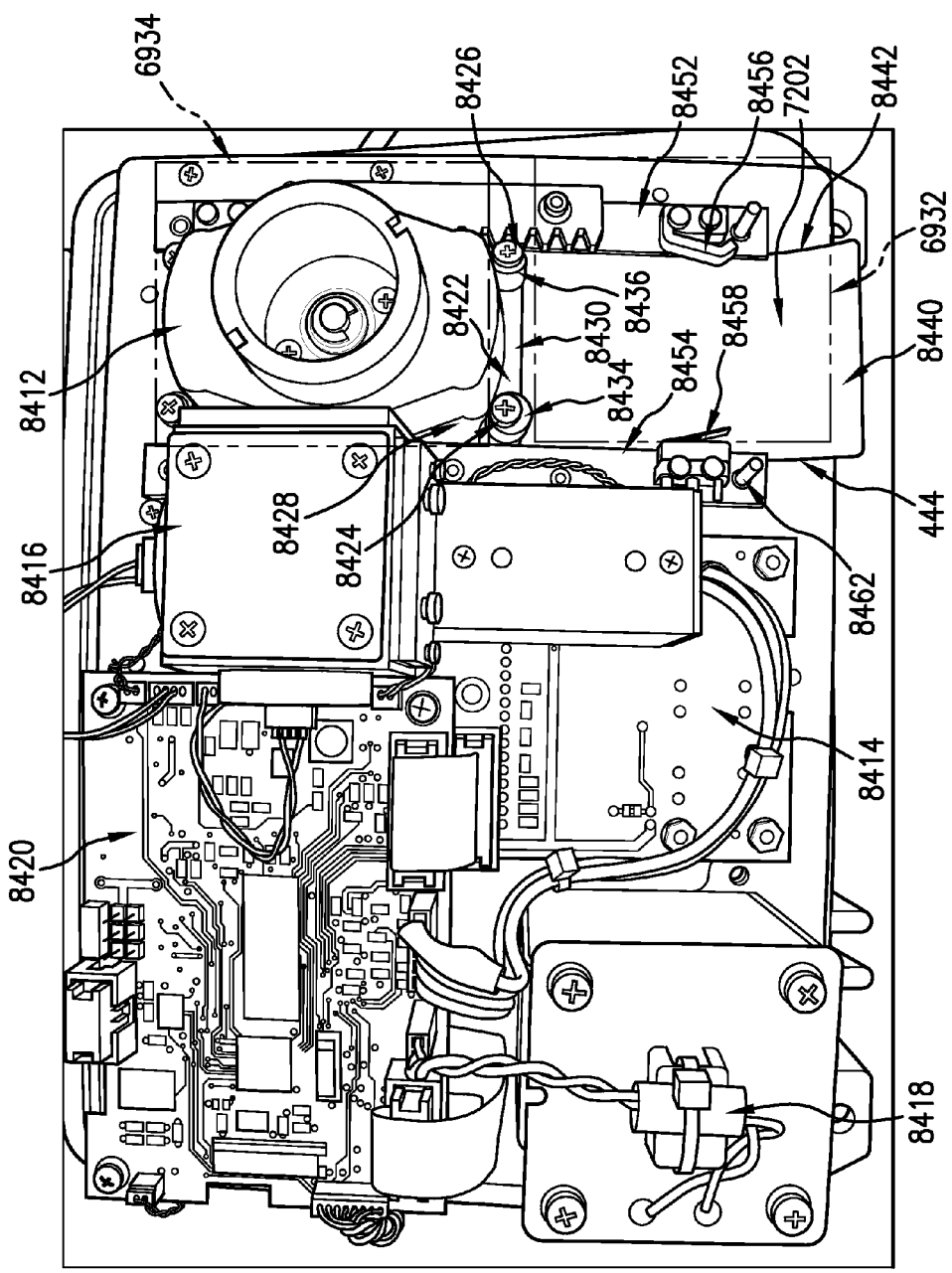
FIG. 84 is an image of the underside of the dosimeter reader body of the dosimeter reader of FIG. 69.

FIG. 84 shows underside 8402 of dosimeter reader body 6904 including an elevator carriage 8412, control electronics 8414, a photo-optical engine frame 8416, an electronic connector 8418 to battery compartment 6912 and a printed circuit board (PCB) 8420 for OSL reader 7712. A proximal mounting strip 8422 and screws 8424 and 8426 are used to mount drawer housing 7206 on a bottom face 8428 of drawer base 7202 at a proximal end 8430 of drawer base 7202. Screws 8424 and 8426 are screwed into screw posts 8432 and 8434 of proximal mounting strip 8422. Mounting strip 8422 and screws 8424 and 8426 are also used to mount a proximal flap 8440 on drawer base 7202 proximal end 8430 of drawer base 7202. Proximal flap 8440 includes edges 8442 and 8444. Slide tracks 8452 and 8454 are mounted on dosimeter reader chassis 6908. One edge (not visible in FIG. 84) of drawer base 7202 slides in a slide groove (not visible in FIG. 84) in slide track 8452 and a second edge (not visible in FIG. 84) of drawer base 7202 slides in a slide groove (not visible in FIG. 84) in slide track 8454, thereby allowing drawer base 7202 to slide when pushed and pulled by drawer handle 7204. Edges 8442 and 8444 of proximal flap 8440 also slide in the slide grooves of slide tracks 8452 and 8454, respectively. As can be seen by the bending of proximal flap 8440 is flexible, allowing proximal flap to bend or curl downwardly when forced against dosimeter reader case 6906 by dosimeter drawer 6910 moving from dosimeter ready region 6934 towards dosimeter loading/unloading region 6932. Mounted on slide track 8452 is a proximal spring stop 8456. Mounted on slide track 8454 is a proximal sensor switch 8458. Proximal spring stop 8456 prevents elevator carriage 8412 from moving beyond proximal spring stop 8456 and proximal sensor switch 8458 when elevator carriage 8412 moves in the direction from dosimeter ready region 6934 to dosimeter loading/unloading region 6932. Proximal sensor switch 8458 is part of a sensor device 8462 that senses when screw post 8434 contacts sensor switch 8458, indicating that drawer housing 7206 is in dosimeter loading/unloading region 6932.

Figure 85:
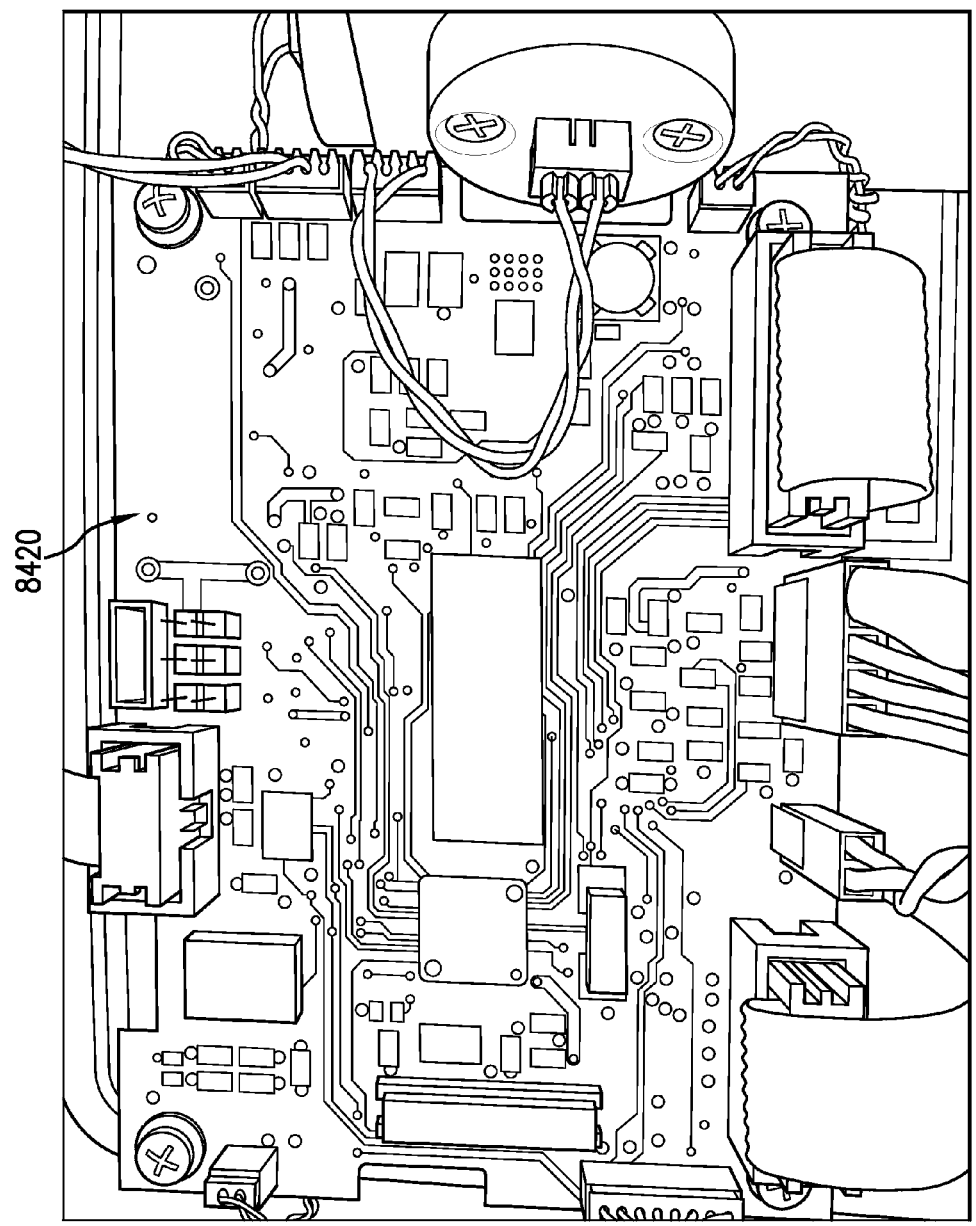
FIG. 85 is an image of the underside of the OSL reader of FIG. 77.

FIG. 85 is a close-up view of PCB 8420 for OSL reader 7712.

Figure 86:
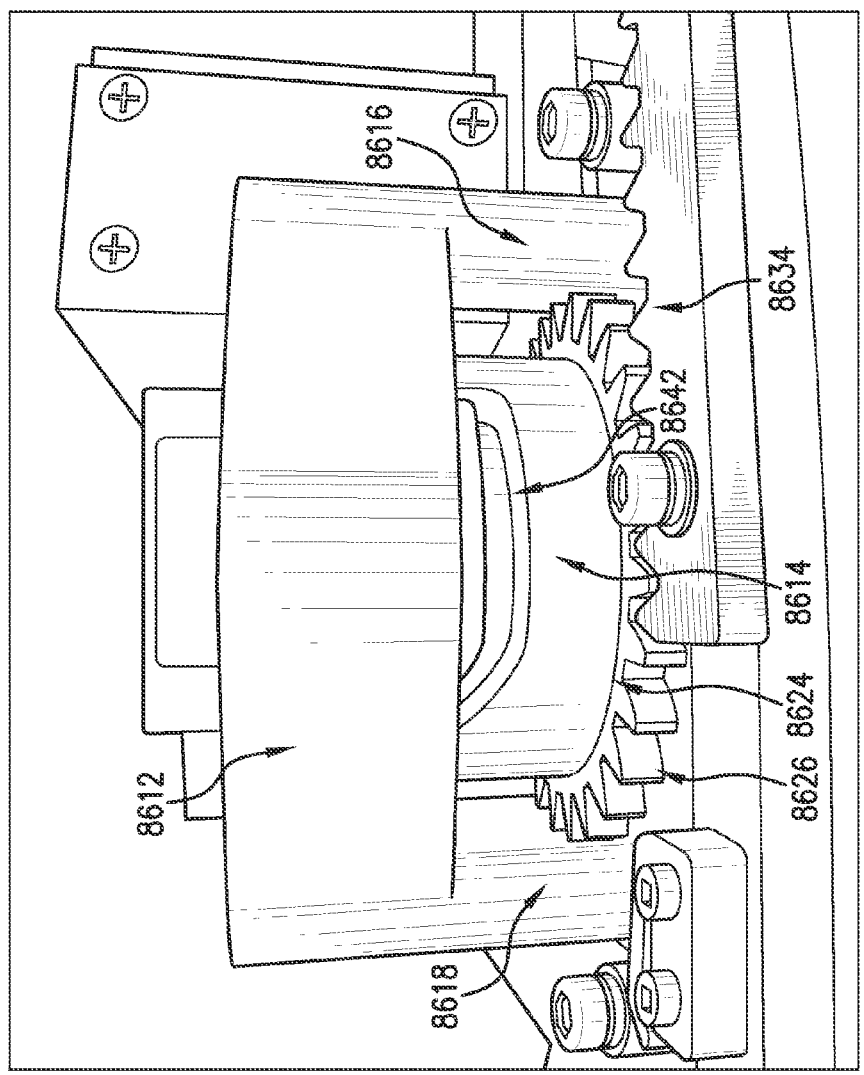
FIG. 86 is an image of the loop retainer elevator of an elevator carriage of the dosimeter reader body of FIG. 84 in a fully lowered position.
Figure 87:
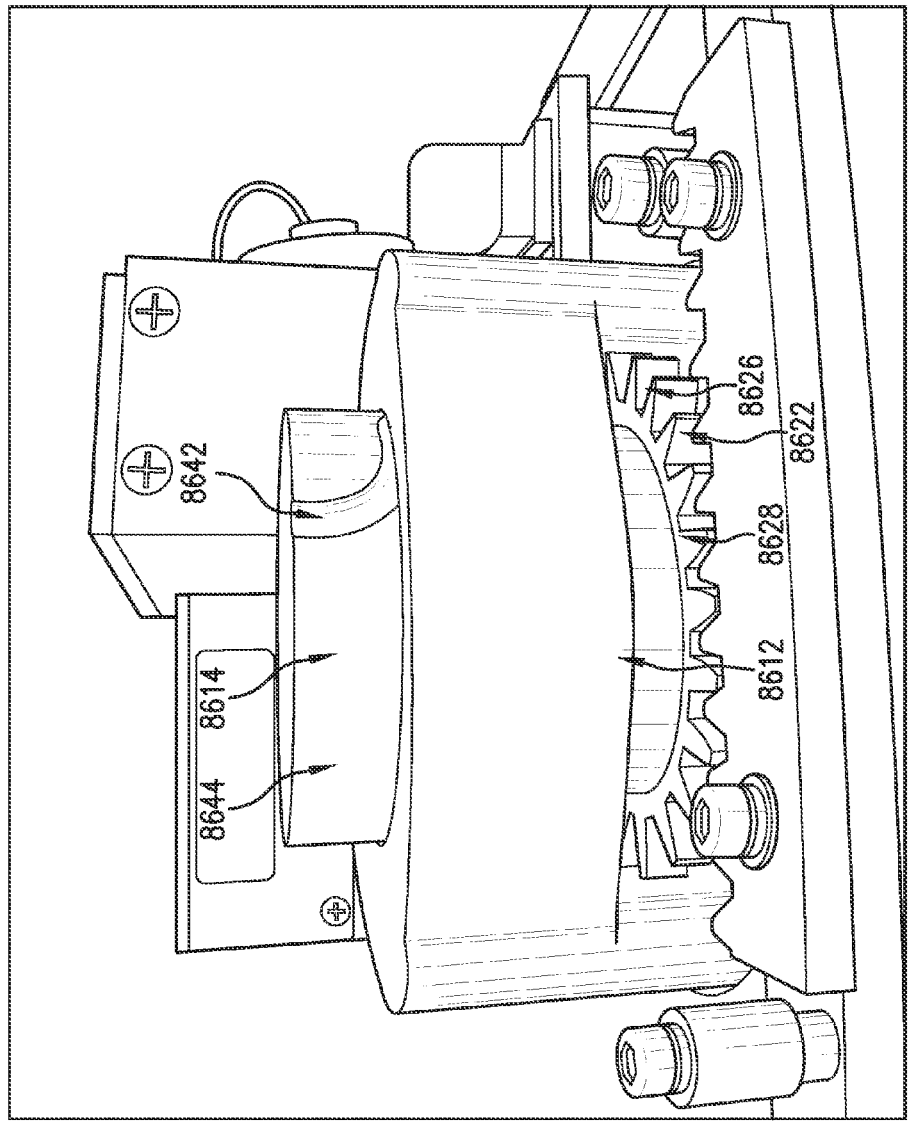
FIG. 87 is an image of the loop retainer elevator of FIG. 87 in an intermediate raised position.
Figure 88:
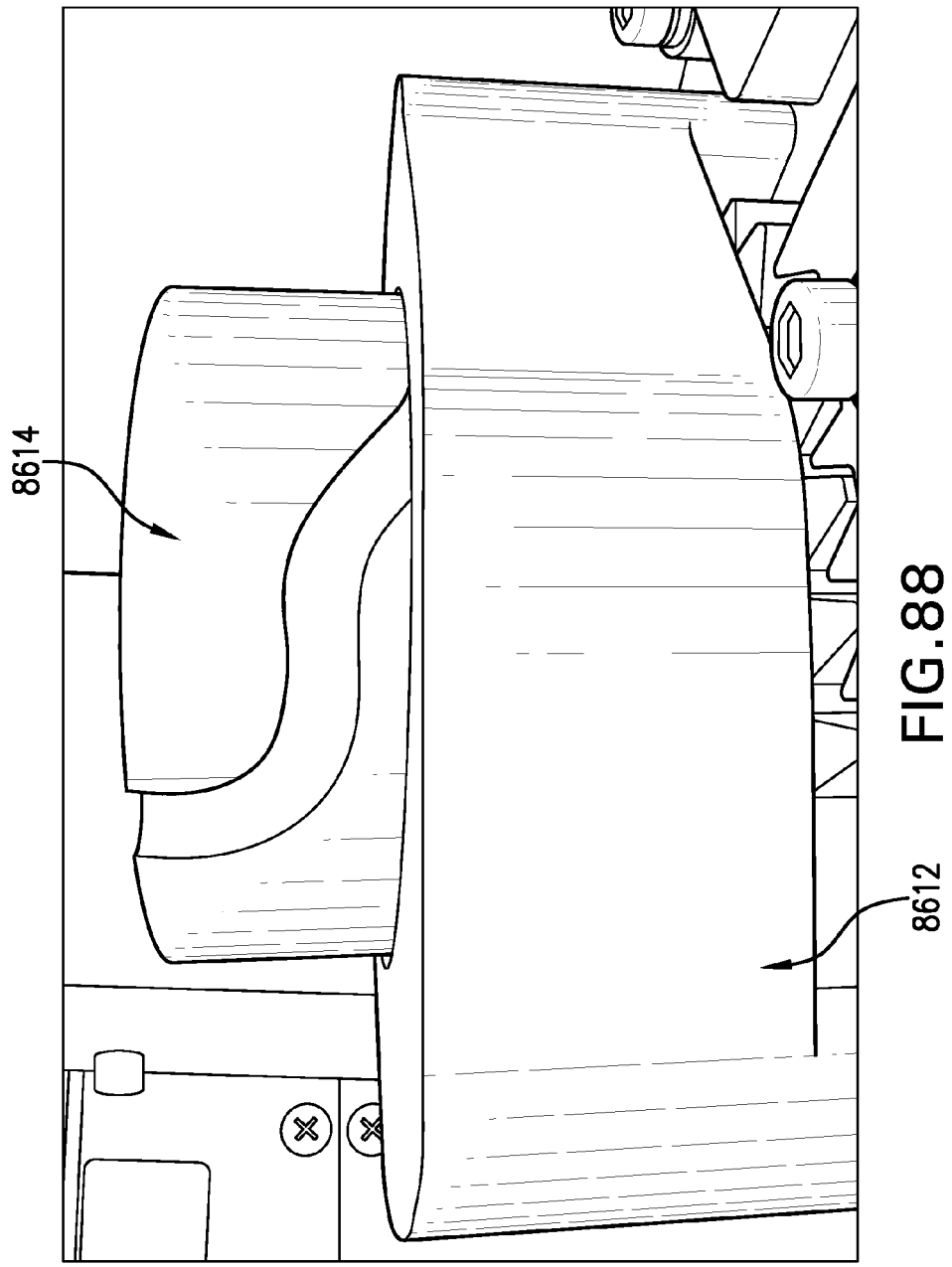
FIG. 88 is an image of the loop retainer elevator of FIG. 87 in a fully raised position.
Figure 89:
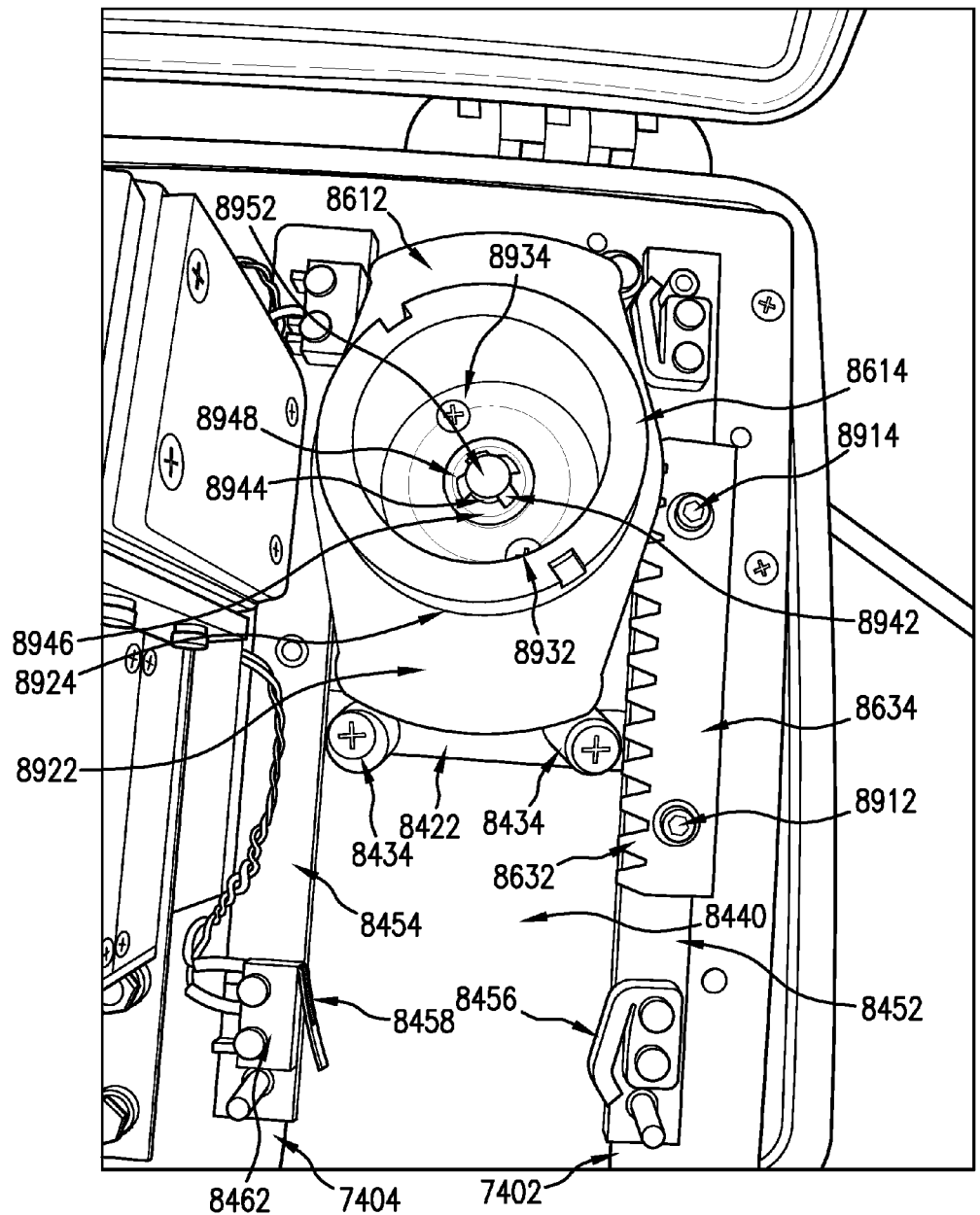
FIG. 89 is an image of the elevator carriage of the dosimeter reader body of FIG. 84.

FIGS. 86, 87, 88 and 89 show the operation of elevator carriage 8412. In FIGS. 86, 87, 88 and 89, dosimeter reader 6902 is shown upside down so that motion of elevator carriage 8412 from left to right corresponds to elevator carriage 8412 and dosimeter drawer 3914 moving from loading/unloading region 6932 toward dosimeter ready region 6934. Elevator carriage 8412 includes a barrel 8614 and a loop retainer elevator 8612. Loop retainer elevator 8612 includes two kidney-shaped posts 8616 and 8618. Post 8616 is part of loop retainer 7256. Post 8618 is part of loop retainer 7260. Barrel 8614 includes a pinion gear 8622 mounted on barrel top 8624 of barrel 8614. Teeth 8626 of pinion gear 8622 extend through an opening 8628 in loop retainer elevator 8612 to mesh with teeth 8632 of a rack 8634. Looking at inner barrel from underneath dosimeter reader body 6904, as pinion gear 8622 rotates counterclockwise, elevator carriage 8412 travels along rack 8634 from dosimeter loading/unloading region 6932 toward dosimeter ready region 6934 until elevator carriage 8412 reaches the position shown in FIG. 86. As elevator carriage 8412 moves towards dosimeter ready region 6934 from dosimeter loading/unloading region 6932, a tongue 8636 on an inner side 8638 of loop retainer elevator 8612 travels in a groove 8642 on an exterior wall 8644 of barrel 8614 and loop retainer elevator 8612 is driven upward, thereby causing loop retainers 7256 and 7260 to move upwards i.e. up through respective openings 7258 and 7262 in drawer base 7202. Also, as elevator carriage 8412 moves towards dosimeter ready region 6934 from dosimeter loading/unloading region 6932, a tongue 8646 on inner side 8638 of loop retainer elevator 8612 travels in a groove 8648 on an exterior wall 8644 of barrel 8614. FIG. 86 shows elevator carriage 8412 at dosimeter loading/unloading region 6932 with loop retainer elevator 8612 at lowered position. FIG. 87 shows elevator carriage 8412 between dosimeter loading/unloading region 6932 and dosimeter ready region 6934 with loop retainer elevator 8612 at a partially raised position. FIGS. 88 and 89 show elevator carriage 8412 moved fully towards dosimeter ready region 6934 with loop retainer elevator 8612 at a fully raised position.

FIG. 89 shows rack 8634 and slide track 8452 mounted on chassis edge 7404 using screws 8912 and 8914. Slide track 8452 is sandwiched between rack 8634 and chassis edge 7404. FIG. 89 also shows a bottom face 8922 of loop retainer elevator 8612 a circular opening 8924 in loop retainer elevator through which barrel 8714 extends. Screws 8932 and 8934 are used to mount pinion gear 8622 on barrel 8714. An axis post 8942 extends through an opening 8944 in a circular bearing 8946. A spacer clip 8948 ensures that space is maintained between circular bearing 8946 and a base 8952 of axis post 8942 as barrel 8714 and pinion gear 8622 rotate around post 8942. Axis post 8942 is part of an axis mount (not visible in FIG. 89) that is mounted in a fixed position on drawer base 7202.

The process shown in FIGS. 86, 87, 88 and 89 may also be reversed. As elevator carriage 8412 moves from dosimeter ready region 6934 towards dosimeter loading/unloading region 6932, tongues 8636 and 8646 of loop retainer elevator 8612 travel in grooves 8642 and 8648, respectively, on exterior wall 8644 of barrel 8614, loop retainer elevator 8612 is driven downward, thereby causing loop retainers 7256 and 7260 to move downward i.e. down through respective openings 7258 and 7262 in drawer base 7202.

Figure 90:
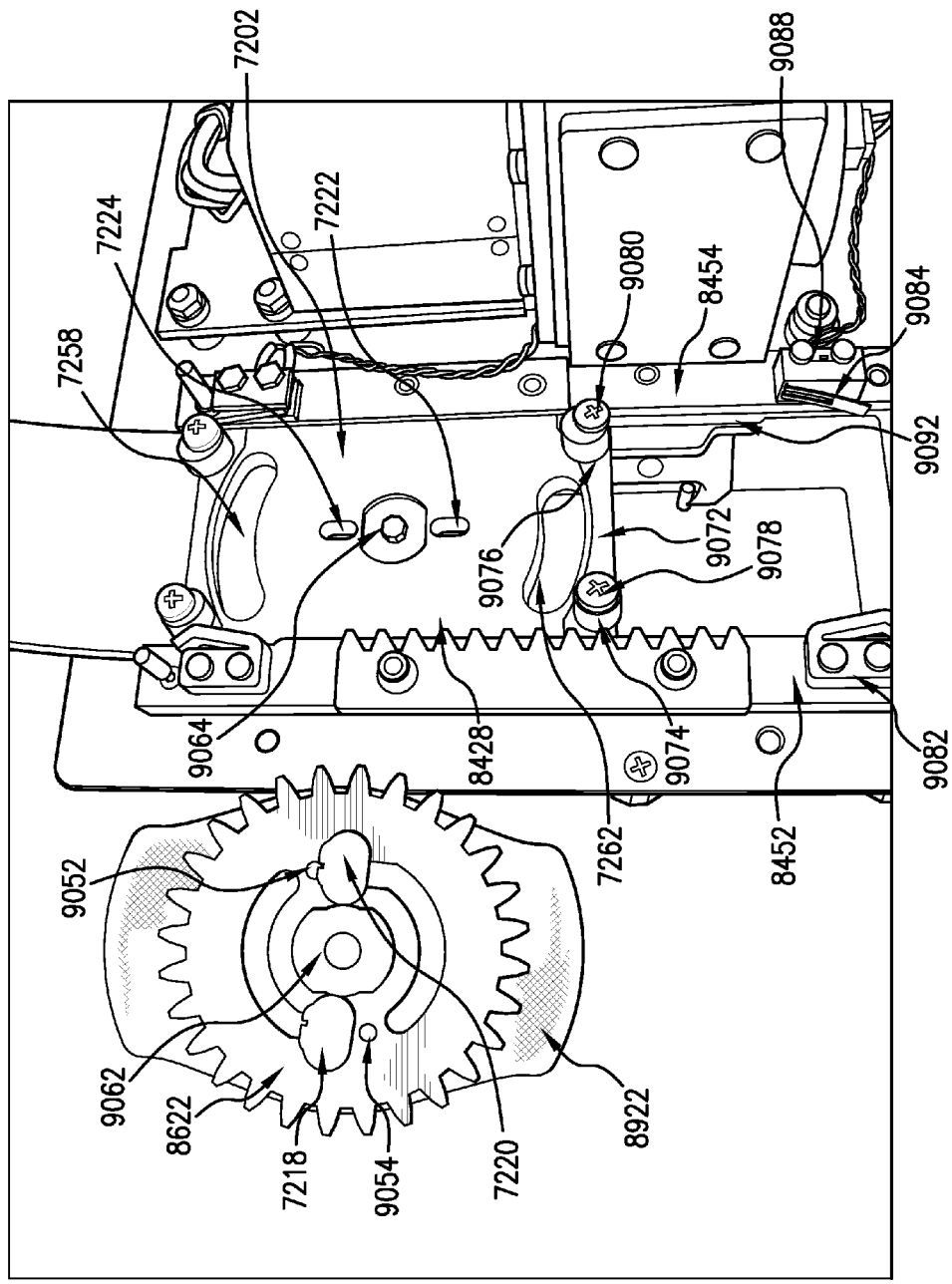
FIG. 90 is an image showing a pinion gear of the elevator carriage and two retaining tabs slidably mounted in curved slots in the pinion gear.
Figure 91:
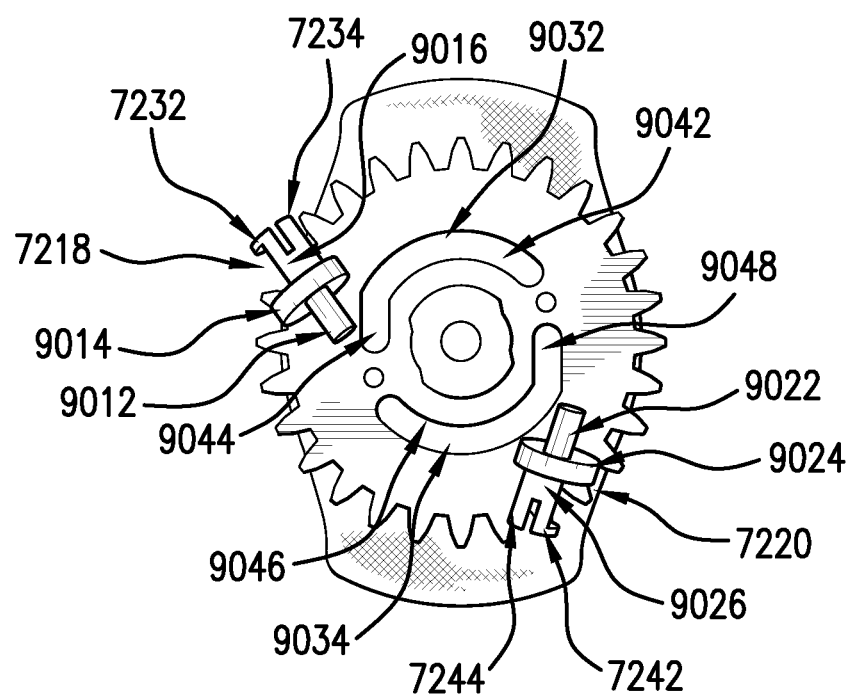
FIG. 91 is a close up image of the pinion gear and retaining tabs of FIG. 89.

FIGS. 90 and 91 details of retaining tab 7218, retaining tab 7220, pinion gear 8622 and drawer base 7202. As shown in FIG. 91, retaining tab 7218 has a pin 9012 that extends from a tab base 9014. Retaining tab 7218 also has an upper body 9016 that extends from tab base 9014. Exterior leg 7232 and interior leg 7234 extend from tab upper body. Retaining tab 7220 has a pin 9022 that extends from a tab base 9024. Retaining tab 7220 also has an tab upper body 9026 that extends from tab base 9014. Exterior leg 7242 and interior leg 7244 extend from tab upper body. Retaining tab 7218 is slidably mounted in curved slot 9032 of pinion gear 8622 using pin 9012. Retaining tab 7220 is slidably mounted in curved slot 9034 of pinion gear 8622 using pin 9012. Tab bases 9014 and 9024 rest on top of respective curved slots 9032 and 9034, so that exterior leg top 7532, interior leg top 7534, exterior leg top 7542 and interior leg top 7544 are maintained at the same height above pinion gear 8622 as pins 9012 and 9022 travel in curved slots 9032 and 9034, respectively. Curved slot 9032 includes a flat portion 9042 and a curved portion 9044. Curved slot 9034 includes a flat portion 9046 and a curved portion 9048. As pinion gear 8622 rotates along rack 8634, retaining tabs 7218 and 7220 are prevented from moving with pinion gear 8622 by openings 7222 and 7224 in drawer base 7202, respectively, and, therefore, pins 9012 and 9022 travel in respective curved slots 9032 and 9034 as pinion gear 8622 rotates along rack 8364.

Figure 106:
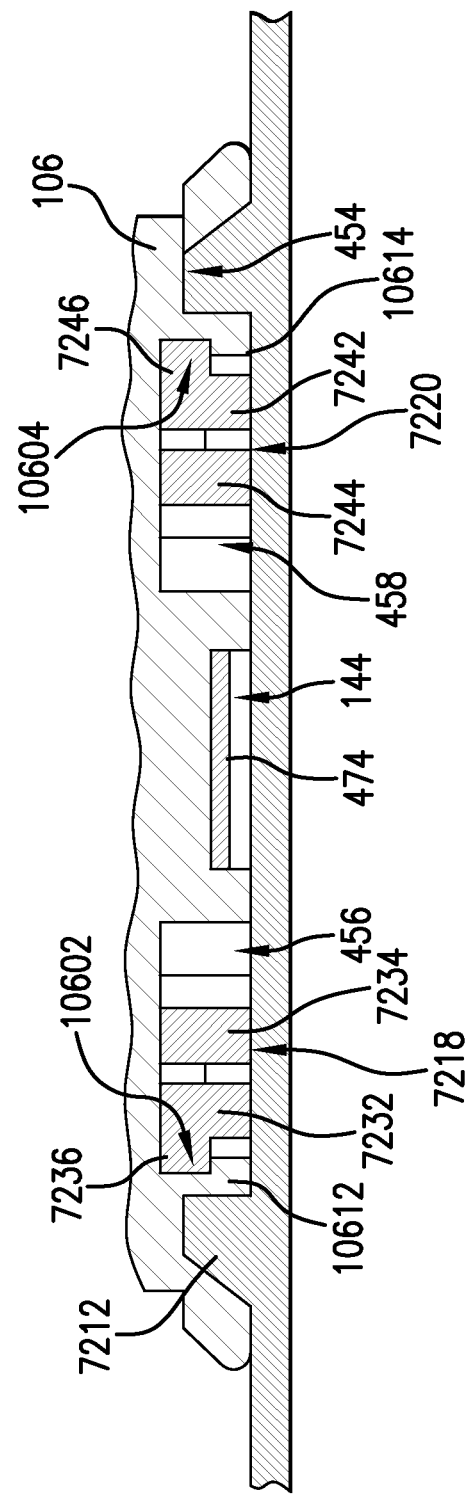
FIG. 106 is a cross-sectional view of a portion of the lower housing of the radiation dosimeter of FIG. 103 and the two spring tabs of the dosimeter reader of FIG. 69 showing how the two spring tabs of the dosimeter reader retain the lower housing of the radiation dosimeter on the drawer base of the dosimeter drawer of FIG. 103 as dosimeter drawer and radiation dosimeter are pushed towards a dosimeter ready region of the dosimeter reader.

When elevator carriage 8412 and pinion gear 8622 are in dosimeter loading/unloading region 6932, pins 9012 and 9022 are in flat portion 9042 of curved slot 9032 and flat portion 9046 of curved slot 9034, respectively. As pinion gear 8622 rotates along rack 8634 from dosimeter loading/unloading region 6932 to dosimeter ready region 6934, pins 9012 and 9022 are forced to move along curved portion 9044 of curved slot 9032 and curved portion 9048 of curved slot 9034, respectively. Because curved portions 9044 and 9048 are farther apart from each other than flat portions 9042 and 9046, when pins 9012 and 9022 travel in curved portions 9044 and 9048, retaining tabs 7218 and 7220 are forced to spread outwardly from each other as shown in FIG. 106 and described below.

FIGS. 90 and 91 also show additional features of pinion gear 8622 and drawer base 7202. Pinion gear 8622 includes openings 9052 and 9054 through which screws 8932 and 8934 (not shown in FIGS. 90 and 91) are screwed to mount pinion gear 8622 on barrel 8614 of elevator carriage 8412. An axis mount 9062 includes axis post 8942 on which pinion gear 8622 rotates. Axis mount 9062 is mounted in a recess 9064 in bottom face 8428 of drawer base 7202 using screw 7412 (not visible in FIGS. 90 and 91). A distal mounting strip 9072 including screw posts 9074 and 9076 is mounted on bottom face 8428 of drawer base 7202 using screws 9078 and 9080. Mounted on slide track 8452 is a distal spring stop 9082. Mounted on slide track 8454 is a distal sensor switch 9094. Distal spring stop 9082 prevents elevator carriage 8412 from moving beyond distal spring stop 9082 and distal sensor switch 9084 when elevator carriage 8412 moves in the direction from dosimeter loading/unloading region 6932 to dosimeter ready region 6934. Distal sensor switch 9084 is part of a sensor device 9088 that senses when screw post 9076 contacts distal sensor switch 9084, indicating that drawer housing 7206 is in dosimeter ready region 6934.

Also visible in FIG. 90 is a slide groove 9092 of slide track 8454. Slide track 8452 includes an identical slide groove (not visible in FIG. 90). One edge of drawer base 7202 slides in slide groove 9092 and a second edge of drawer base 7202 slides in the slide groove of slide track 8452, thereby allowing drawer base 7202 to slide when pushed and pulled by drawer handle 7204.

In FIG. 90, pinion gear 8622 is separated from barrel 8614 and is shown resting on bottom face 8922 of loop retainer elevator 8612.

Figure 92:
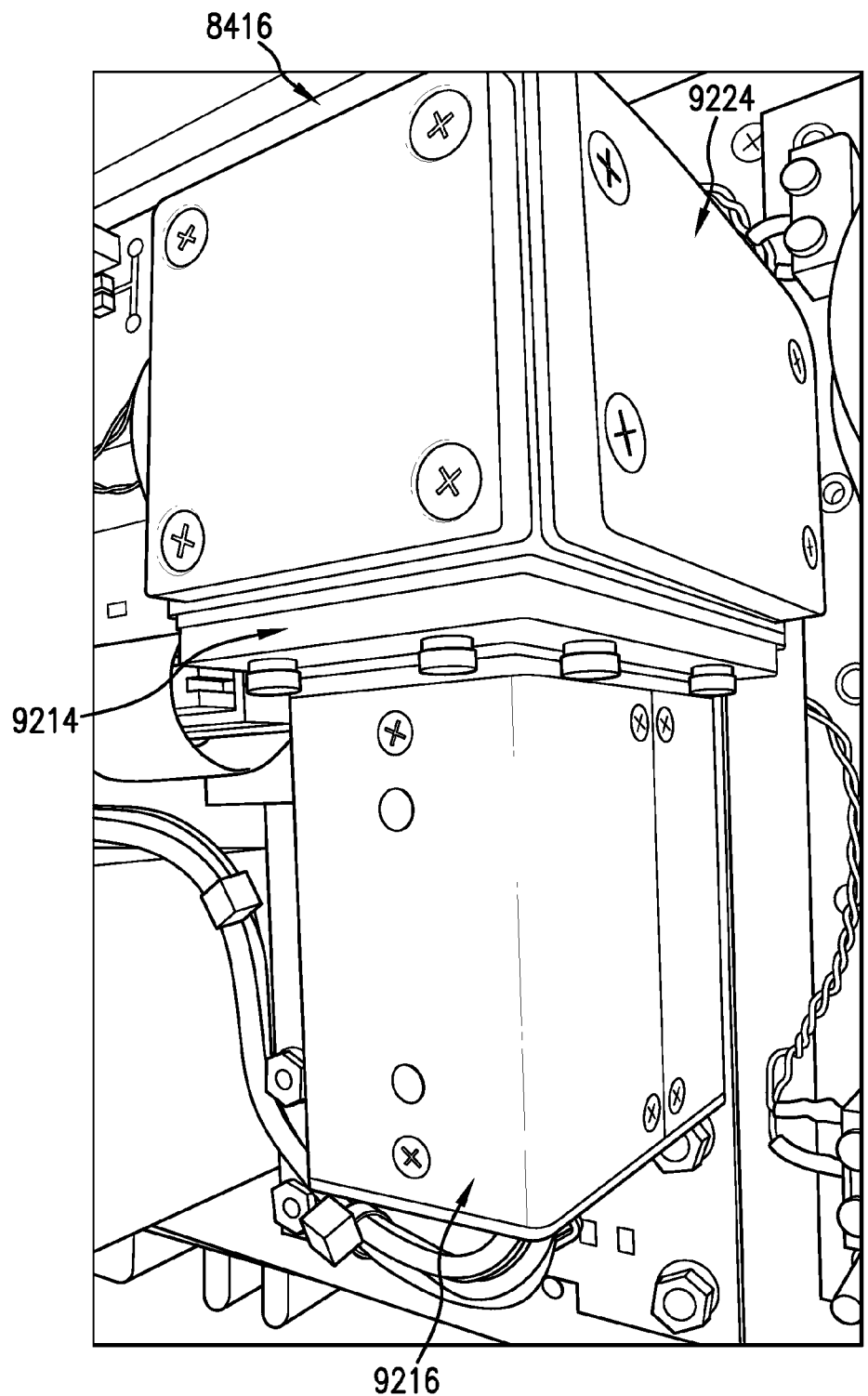
FIG. 92 is an image of the photo-optical engine frame of the dosimeter reader of FIG. 69.
Figure 93:
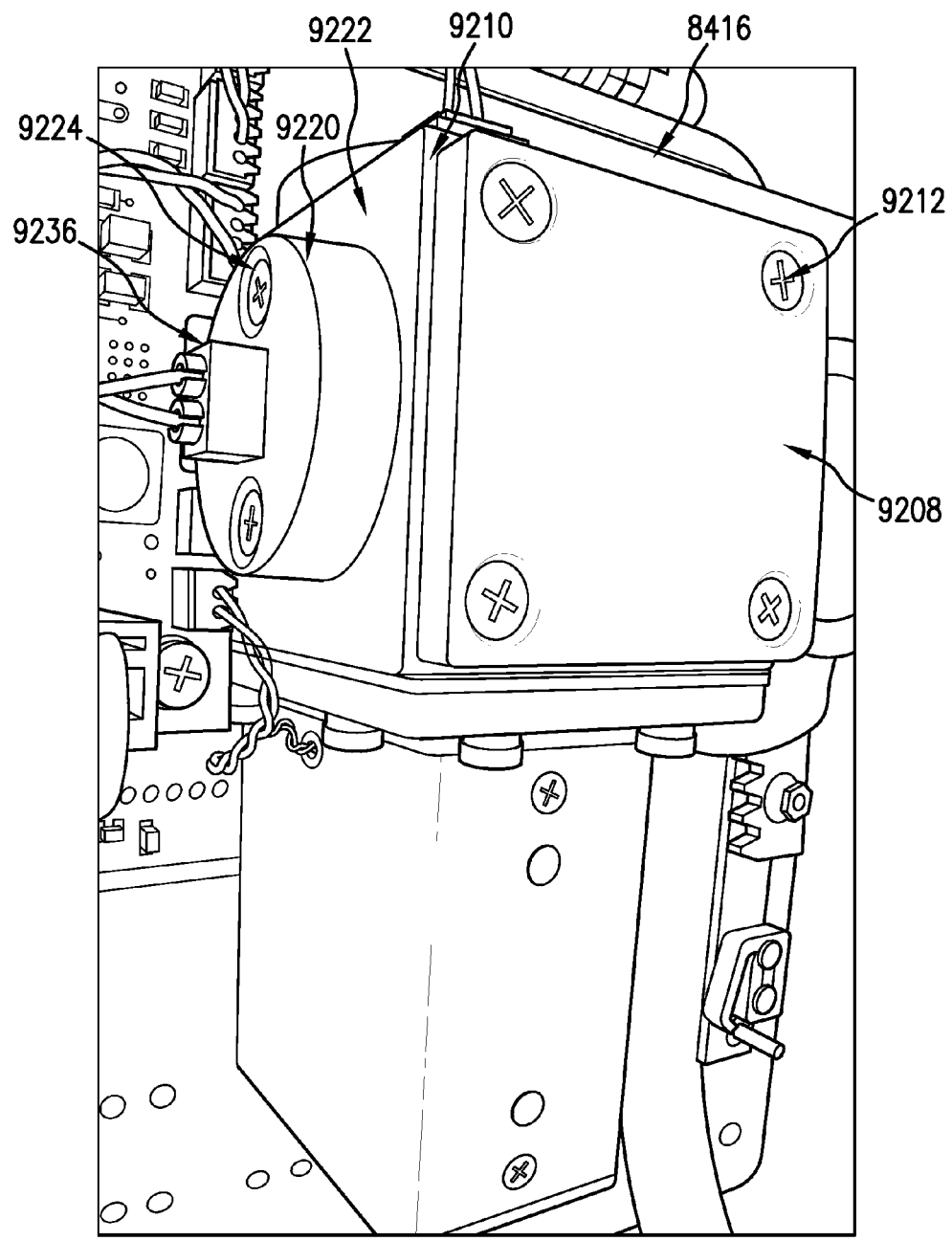
FIG. 93 is an image of the photo-optical engine frame of FIG. 92 from a different angle.
Figure 94:
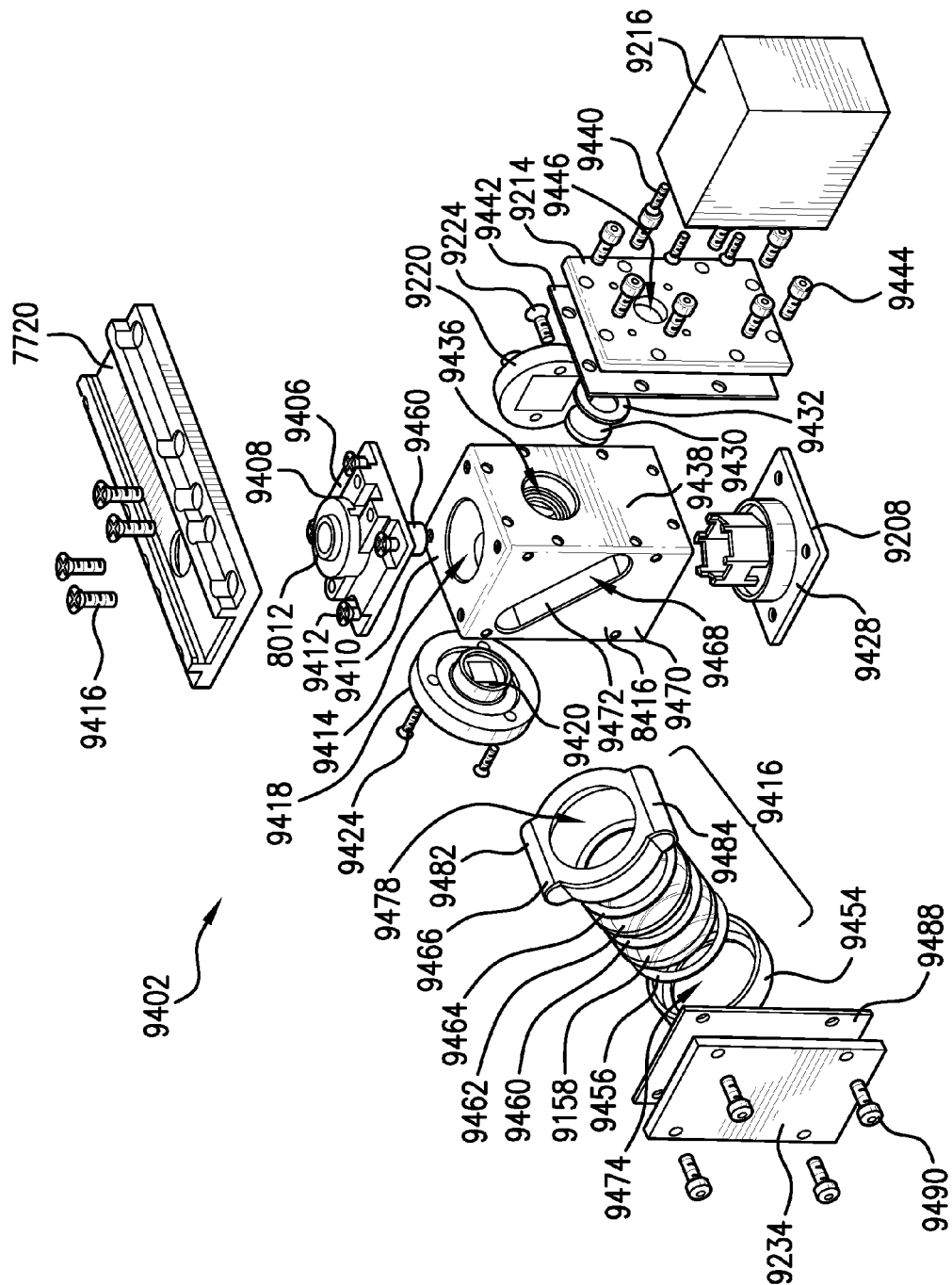
FIG. 94 is an exploded view of a photo-optical engine of the OSL reader of the dosimeter reader of FIG. 69.
Figure 95:
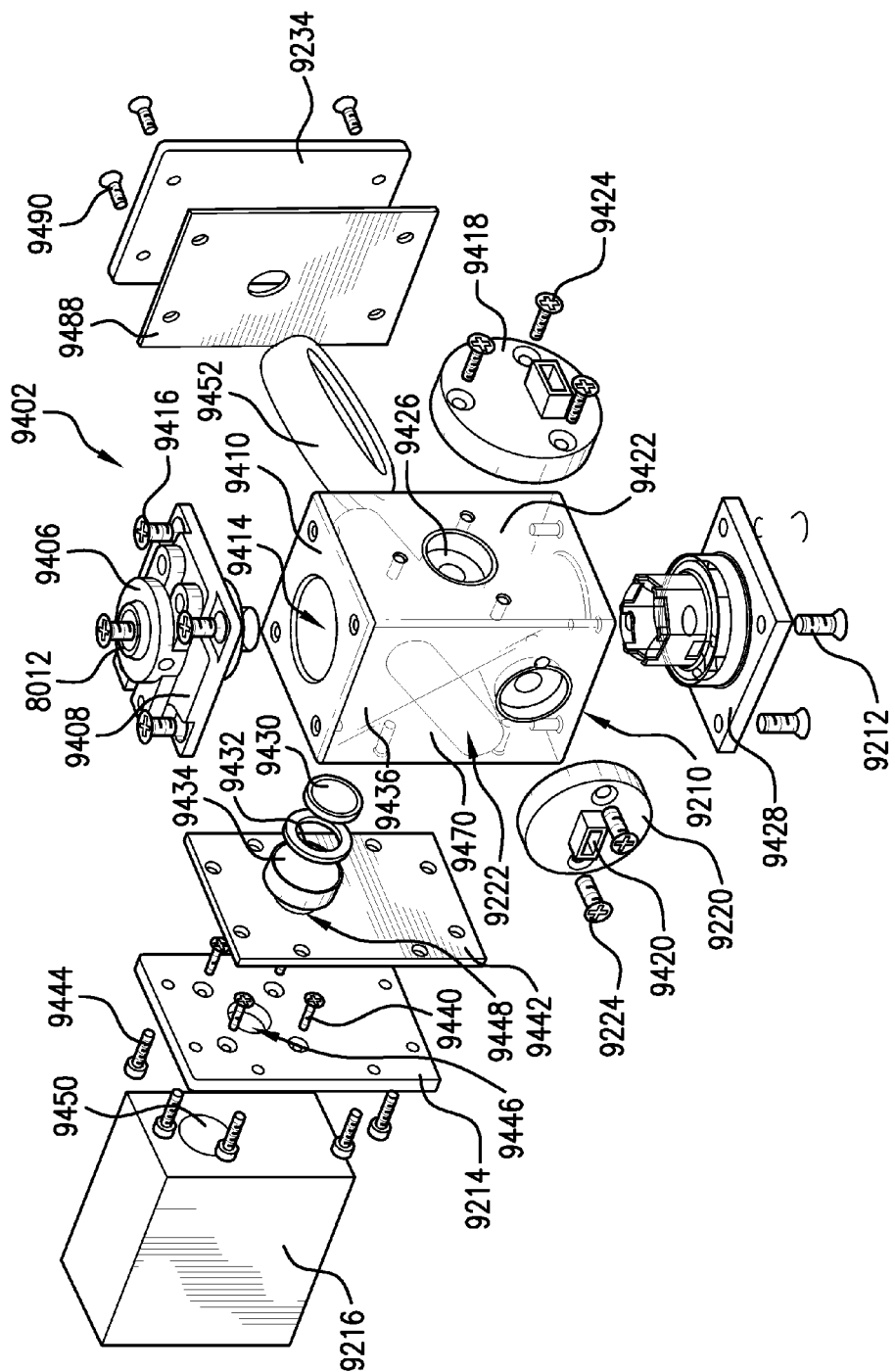
FIG. 95 is a partially exploded view of the photo-optical engine of FIG. 94 with the filter optical assembly shown in simplified form in an assembled state and the sides of the body of the photo-optical engine made transparent to better show interior detail.
Figure 96:
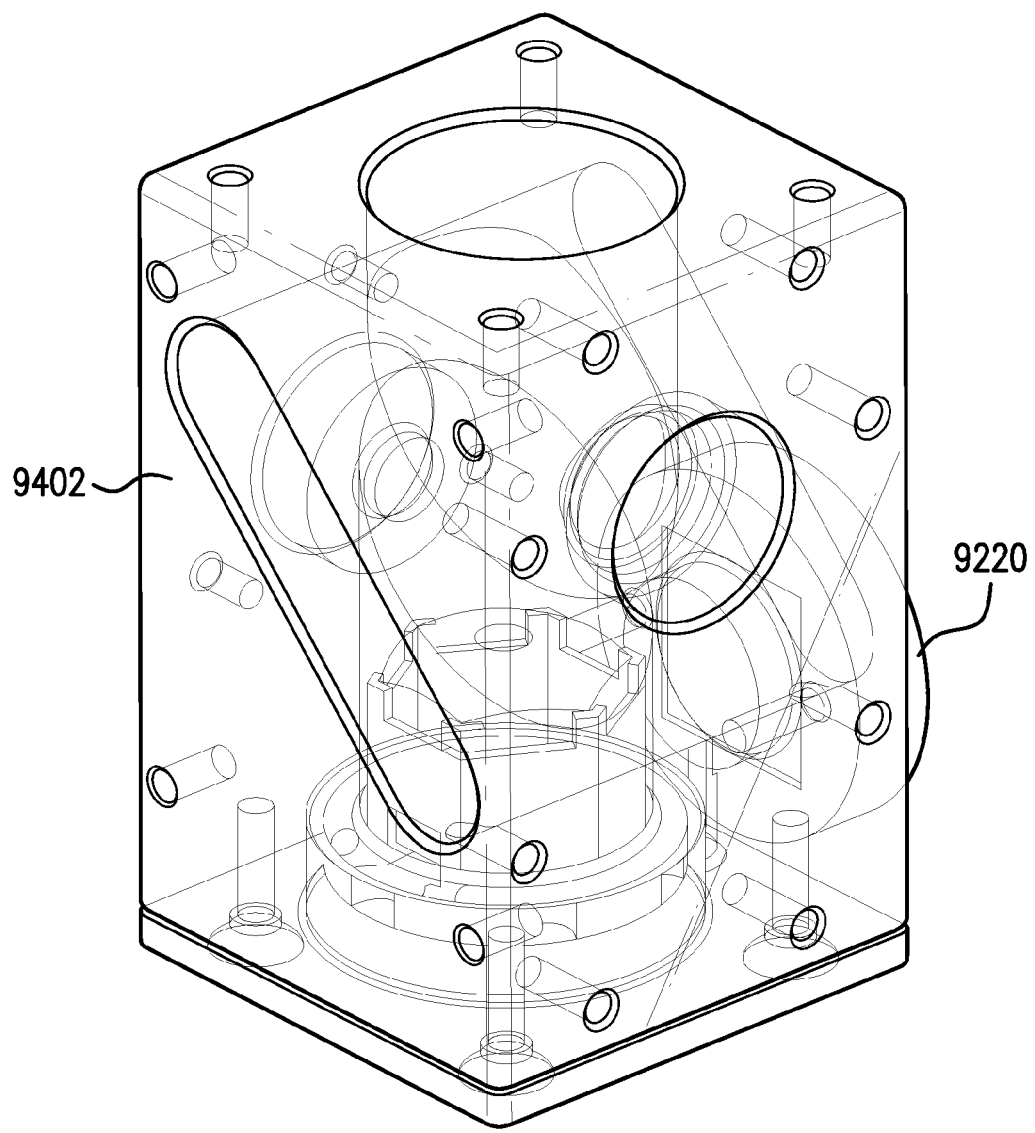
FIG. 96 is a perspective view of the photo-optical engine of FIG. 94 in a partially assembled state with various features of the photo-optical engine made transparent to better show interior detail.

FIGS. 92 and 93 show photo-optical engine frame 8416, LED board assembly base 9208 mounted on a bottom face 9210 of photo-optical engine frame 8416 by screws 9212, a photomultiplier tube (PMT) mount plate 9214, a PMT 9216, an LED interconnect PCB assembly 9220 is mounted on a side face 9222 of photo-optical engine frame 8416 using screws 9224, and a filter panel 9234 mounted on photo-optical engine frame 8416. LED interconnect PCB assembly 9220 includes a power jack 9236.

FIGS. 94, 95, 96, 97, 98, 99 and 100 show a photo-optical engine 9402 and various components of photo-optical engine 9402 of OSL reader 7712. An optical light pipe assembly 9406 that includes optical light pipe 8012 that extends through an optical light pipe mount 9408 is mounted on a top face 9410 of photo-optical engine frame 8416 using screws 9412 so that optical light pipe 8012 extends into opening 9414. A slide rail base 7720 is mounted on optical light pipe mount 9408 using screws 9416. A photodiode printed circuit board (PCB) assembly 9418 including a photodiode 9420 is mounted on a side face 9422 of photo-optical engine frame 8416 using screws 9424 so that photodiode 9420 extends into opening 9426. An LED board assembly 9428 including LED board assembly base 9208 is mounted on bottom face 9210 of photo-optical engine frame 8416 using screws 9212. A photomultiplier tube (PMT) lens 9430, a PMT lens gasket 9432 and a blue glass filter 9434 are mounted in an opening 9436 in a side face 9438 of photo-optical engine frame 8416. PMT mount plate 9214 is mounted on PMT 9216 using screws 9440. PMT mount plate 9214 and PMT mount plate gasket 9442 are mounted on side face 9438 of photo-optical engine frame 8416 using screws 9444. LED interconnect PCB assembly 9220 mounted on a side face 9222 of photo-optical engine frame 8416 using screws 9224. PMT mount plate includes an opening 9446 and PMT mount plate gasket 9442 includes an opening 9448 that is aligned with (PMT) lens 9430 and blue glass filter 9434. PMT 9216 includes photocathode 9450.

An OSL filter optic assembly 9452 includes an assembly mount bottom 9454, an open circle-shaped lower gasket 9456, a green glass filter 9458, an open circle-shaped middle gasket 9460, a dichroic mirror 9462 aligned with green glass filter 9458, an open circle-shaped upper gasket 9464 and an assembly mount top 9466. Assembly mount top 9466 fits over assembly mount bottom 9454, and together assembly mount top 9466 and assembly mount bottom 9454 enclose the remaining components of OSL filter optic assembly 9452: lower gasket 9456, green glass filter 9458, middle gasket 9460, dichroic mirror 9462 and upper gasket 9464. When OSL filter optic assembly 9452 is mounted in an opening 9468 in a side face 9470 of photo-optical engine frame 8416. Mounted in an opening 9468, assembly mount top 9466 and assembly mount bottom 9454 are held together by a lozenge-shaped interior wall 9472 of opening 9468, thereby holding together the remaining components of OSL filter optic assembly 9452 so that: lower gasket 9456 is sandwiched between assembly mount bottom 9454 and green glass filter 9458, middle gasket 9460 is sandwiched between green glass filter 9458 and a dichroic mirror 9462 and upper gasket 9464 is sandwiched between dichroic mirror 9462 and assembly mount top 9466. When held together, OSL filter optic assembly 9452 has a shape that complentarily engages interior wall of 9472 of opening 9468. Assembly mount bottom 9454 has a circular opening 9474 and assembly mount top 9404 has a circular opening 9478 that allows light to travel through OSL filter optic assembly 9416. Assembly mount top 9466 has two curved ends 9482 and 9484. OSL filter optic assembly 9452 in held in place in opening 9468 by filter panel 9234 and filter panel gasket 9488 that are mounted on side face 9470 of photo-optical engine frame 8416 using screws 9490.

The various gaskets of the present invention may be made of a resilient material such as rubber or plastic. Each gasket shown in FIGS. 94 and 95 used in connection with a filter, lens or mirror includes an opening therein through which light may pass.

LED board assembly 9428 includes a LED (not shown) that transmits the stimulation light used in photo-optical engine 9402.

Photodiode PCB assembly 9418 includes photodiode 9420 that functions as an activity sensor. Photodiode PCB assembly 9418 includes a female electrical connector 9492 for connecting with a male power jack (not shown) to provide photodiode PCB assembly 9418 with power.

Figure 97:
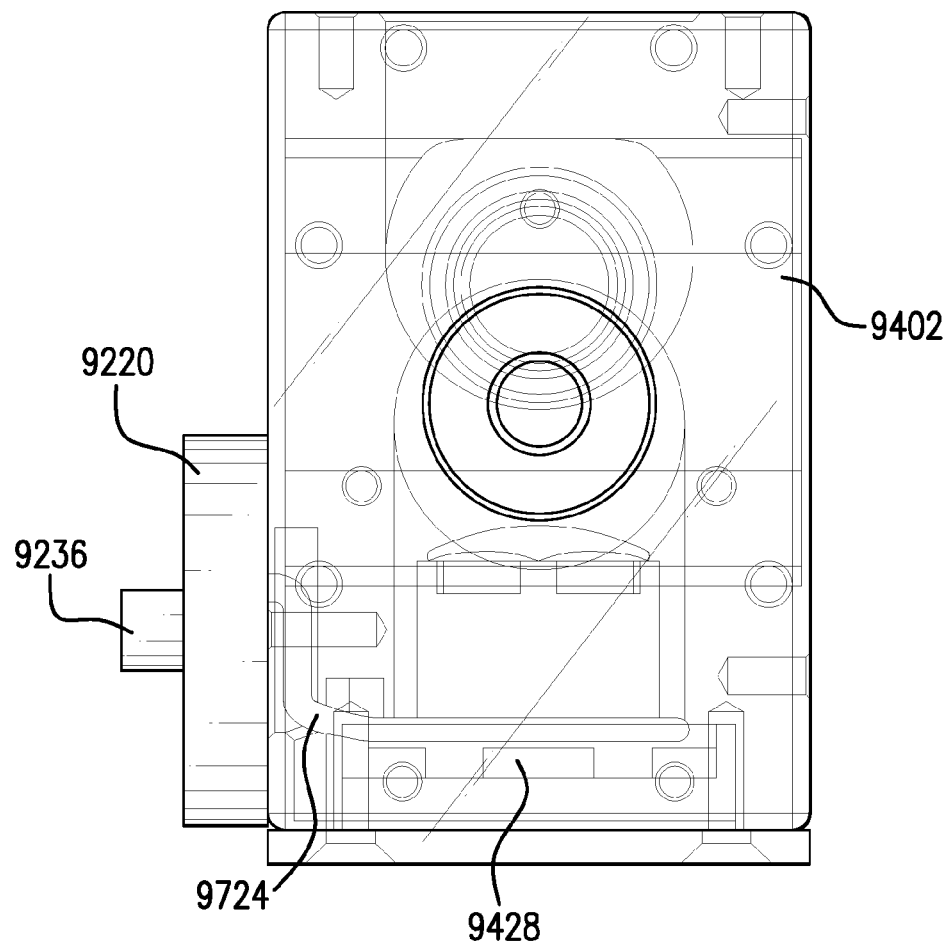
FIG. 97 is a side view of the partially assembled photo-optical engine of FIG. 96 with various features of the photo-optical engine made transparent to better show interior detail.
Figure 98:
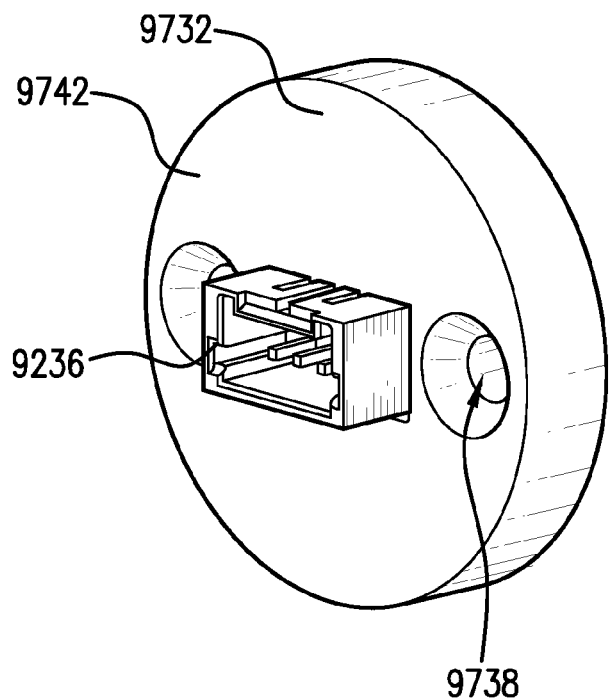
FIG. 98 is a perspective view of an LED interconnect PCB assembly of the photo-optical engine of FIG. 94.
Figure 99:
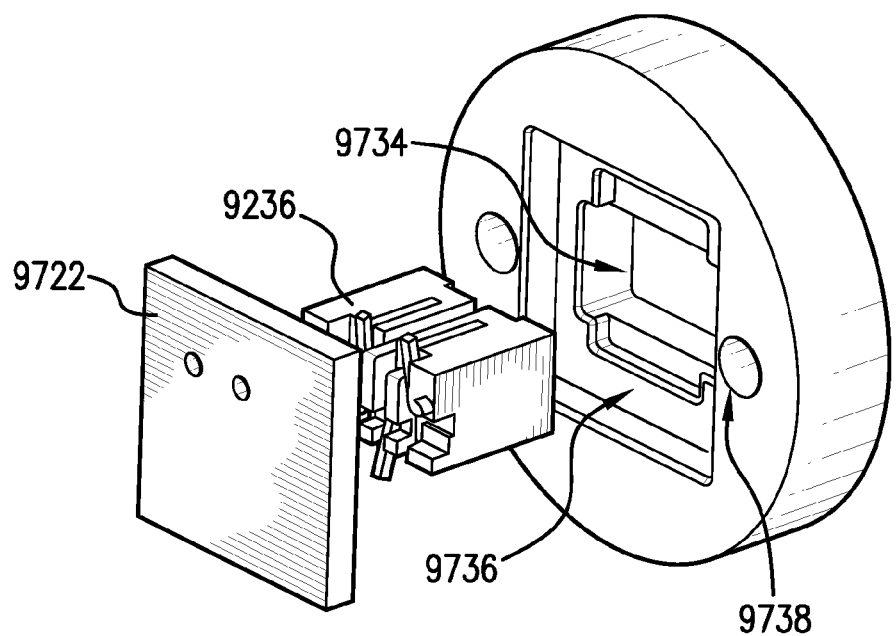
FIG. 99 is an exploded view of the LED interconnect PCB assembly of FIG. 98 with the PCB of the LED interconnect PCB assembly shown in a simplified form.

As shown in FIGS. 97, 98 and 99, LED interconnect PCB assembly 9220 includes a PCB 9722 that is electrically connected by an electrical connection 9724 to LED board assembly 9428. LED interconnect PCB assembly 9220 includes a power jack 9236 to provide LED 10242 of LED board assembly 9428 with power. LED interconnect PCB assembly 9220 includes an assembly body 9732, having an opening 9734 in which power jack 9236 is mounted. Assembly body 9732 includes a complementary recess 9736 in which PCB 9722 is mounted and openings 9738 for receiving screws 9224.

The OSL filter optic assembly of FIGS. 94, 95, 96, 97, 100 and 101 is more compact than many previous filter optic assemblies for OSL readers and less subject to becoming misaligned by motion or vibrations, because the OSL filter optic assembly is also mounted in an opening so that the OSL filter optic assembly does not substantially move or vibrate when the photo-optical engine is moved or vibrated.

Although a particular type of optical filter is described above as being used in the filter optical assembly, optical filters filtering a variety of different colors may be used in the optical filter assembly of the present invention depending on the wavelength used as a light source for the stimulation light and the wavelength at which the OSLM of the OSL sensor absorbs light. Also, although a particular type of optical filter is described above as being used as a filter for the emitted light detector detecting emitted light from the OSL sensor, optical filters filtering a variety of different colors may be used with the emitted light detector of the present invention depending on the wavelength at which OSLM of the OSL luminesces.

Figure 100:
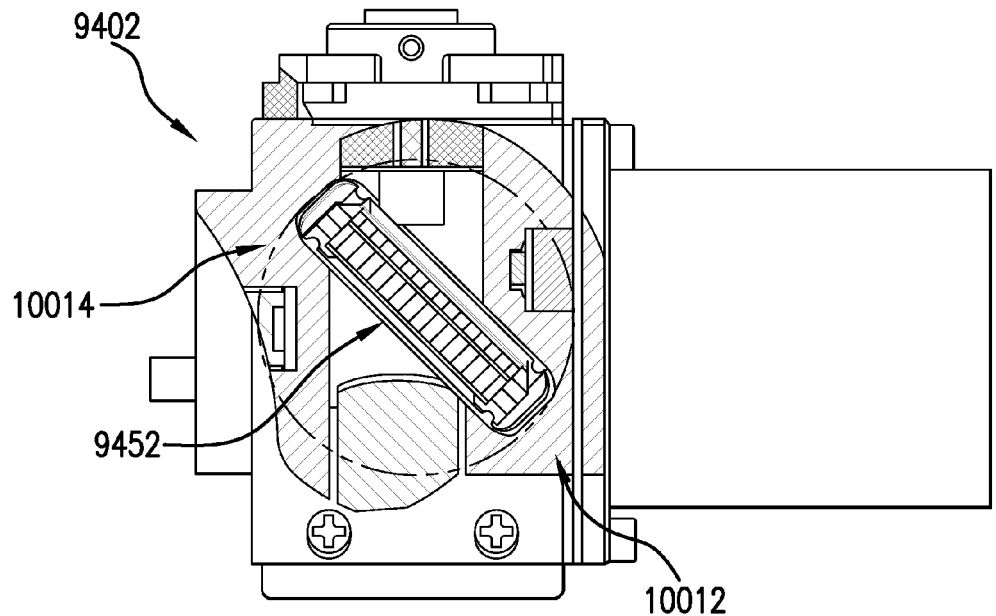
FIG. 100 is a side view of the photo-optical engine of FIG. 94 in an assembled state with part of the photo-optical engine broken away to show interior details.
Figure 101:
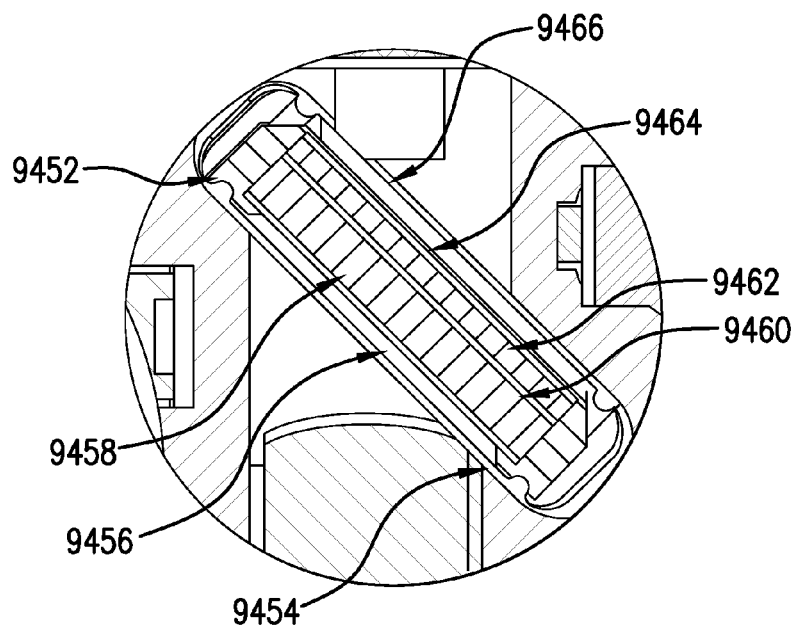
FIG. 101 is a cross-sectional view of the circled region of the photo-optical engine in FIG. 99.

FIG. 100 shows photo-optical engine 9402 in an assembled configuration with a portion 10012 broken away to show a cross-sectional view of OSL filter optic assembly 9452. A circled region 10014 of portion 10012 of FIG. 100 is shown in greater detail in FIG. 101. FIG. 101 provides a cross-sectional view of OSL filter optic assembly 9452 showing: lower gasket 9456 sandwiched between assembly mount bottom 9454 and green glass filter 9458, middle gasket 9460 sandwiched between green glass filter 9458 and dichroic mirror 9462 and upper gasket 9464 sandwiched between dichroic mirror 9462 and assembly mount top 9466.

The alignment of lenses, mirrors and filters of the photo-optical engine of FIGS., 94, 95, 96, 97, 98, 99, 100 and 101 is also not significantly affected by vibrations when a dosimeter reader including photo-optical engine is moved, because all the components of the photo-optical engine are fixed in place on or in the photo-optical engine frame. These components include: the OSL filter optic assembly, the optical light pipe assembly, the blue glass filter, PMT, activity sensor, LED board assembly, etc. In one embodiment of the present invention, an OSL reader employing the photo-optical engine of FIGS. 94, 95, 96, 97, 98, 99, 100 and 101 may even be used to read an OSL while the OSL reader is being moved. The lens, mirrors and filters of the photo-optical engine are less subject to misalignments caused by vibrations than the lenses, mirrors and filters of other OSL readers because the small distances between components maximize the solid angles through which the various light beams must pass for correct transmission through the optical pathway. The close arrangement of the components minimizes losses due to dispersion In one embodiment of the present invention, four (4) AA batteries provide all the power required for operating the dosimeter reader including the power to operate: the OSL reader, the engine that drives the drive gear that controls the motion of the sled slider, the electronic controls of the dosimeter reader, the electronic sensors of dosimeter reader, the display of the dosimeter reader, and the communications port for interfacing with external databases. Battery life depends on the number of analyses performed, the stimulation protocol employed and the time between analyses in which the reader is idle but still powered. Typically, more than 250 analyses can be performed for one set of four AA batteries. In one embodiment of the present invention, other types of chargeable and non-chargeable batteries may be used as a power supply for the dosimeter reader. For example, one or more alkaline batteries, one or more lithium batteries, etc. may be used as a power supply for the dosimeter reader. In one embodiment, the total weight of the one or more batteries is less than about 100 g.

In one embodiment of the present invention, the dosimeter reader requires a current of about 90 mA or less for about 1 second to read an OSL sensor. In one embodiment of the present invention, the dosimeter reader requires 80 mA or less of current when the dosimeter reader is powered and in an idle state and ready to read a radiation dosimeter. In one embodiment, when the dosimeter reader is turned on, the current in the dosimeter reader may be 235 mA or less for less than 10 seconds.

In one embodiment of the present invention, the dosimeter reader, with the dosimeter case in a closed configuration, has a maximum depth of about 19 cm or less, a maximum width of about 23.5 cm or less and a maximum height of about 11 cm or less. In one embodiment, the dosimeter reader, with the dosimeter case in a closed configuration has a total volume of about 3,065 cm$^3$ or less.

In one embodiment of the present invention, the dosimeter reader, including the dosimeter reader case, has a weight of less than about 2,600 g, excluding the weight of the one or more batteries that power the dosimeter reader, thereby allowing the dosimeter reader to be carried by a single individual. In one embodiment of the present invention, the dosimeter reader, including the dosimeter reader case, of the present invention has a weight of less than about 2,700 including the weight of the one or more batteries that power the dosimeter reader, thereby allowing the dosimeter reader to be carried by a single individual.

Figure 102:
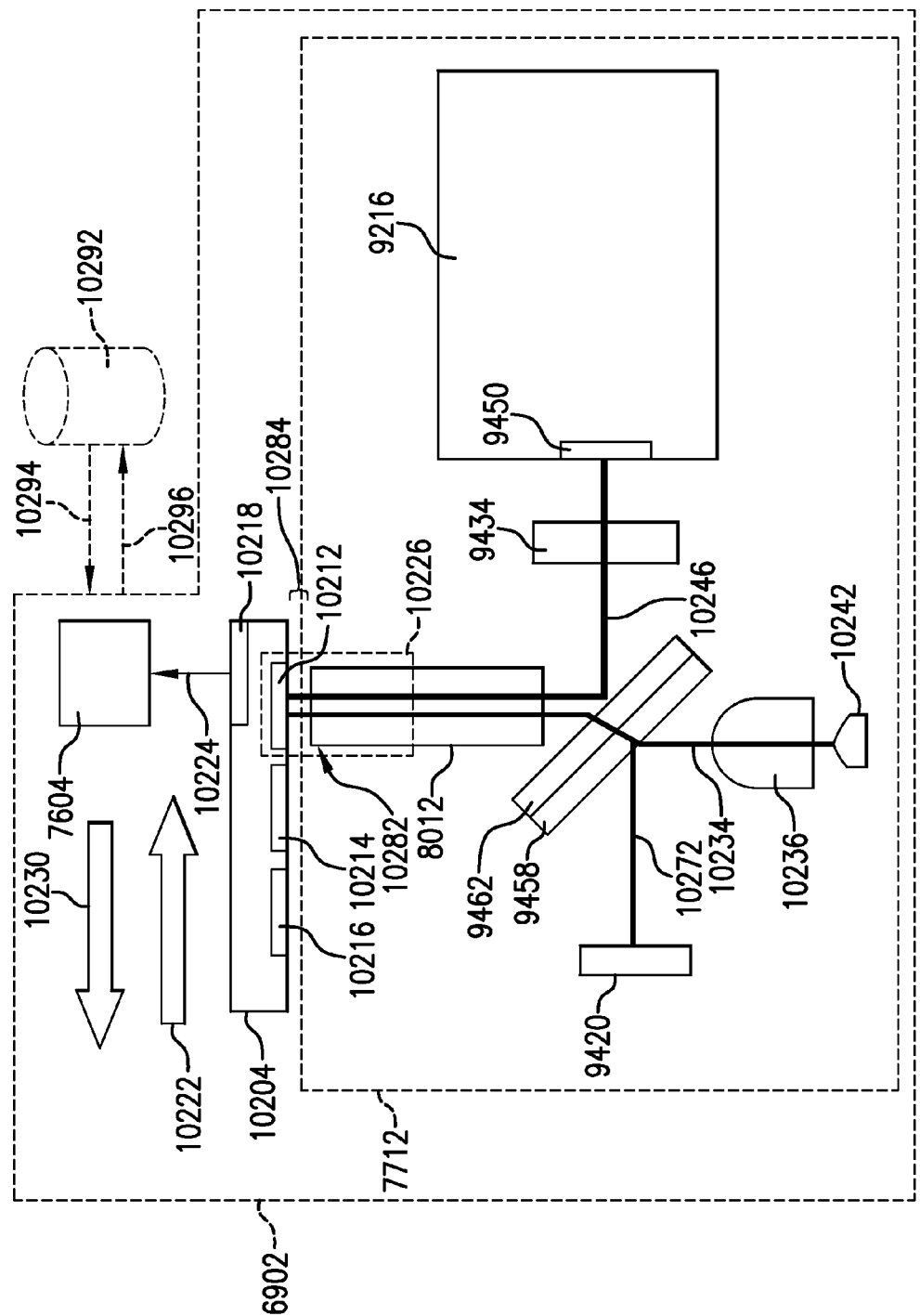
FIG. 102 is a schematic diagram of the OSL reader and RFID tag reader of the dosimeter reader of FIG. 69.

FIG. 102 shows OSL reader 7712 and RFID tag reader 7604 of dosimeter reader 6902 in operation reading a dosimeter sled 10204. For simplicity of illustration with respect to OSL reader 7712, only photo-optical engine 9402 of OSL reader 7712 are shown and other components of OSL reader 7712, such as sled slider 7714, are omitted from FIG. 102. Dosimeter sled 10204 includes three OSL sensors: OSL sensor 10212, OSL sensor 10214 and OSL sensor 10216 and an RFID tag 10218. OSL sensors 10212, 10214 and 10216 include an OSLM (not shown) comprising an $Al_2O_3$:C material. Dosimeter sled 10204 is pulled out of a radiation dosimeter (not shown) by sled slider 7714 in the direction shown by arrow 10222 so that OSL sensor 10212, OSL sensor 10214 and OSL sensor 10216 are each in turn read by OSL reader 7712 at a reading position 10226. FIG. 102 shows OSL sensor 10212 in the process of being read.

OSL reader 7712 includes an LED 10242 that is part of LED board assembly 9428. LED 10232 is a source of transmitted green stimulation light 10234 having a wavelength of about 520 nm. Green stimulation light 10234 is concentrated by a concentrator 10236 that is part of LED board assembly 9428 and then passes through green glass filter 9458 and dichroic mirror 9462 aligned with green glass filter 9458. Green glass filter 9458 filters out non-green light from green stimulation light 10234, i.e., green glass filter 9458 is a green filter that passes green light. Green stimulation light 10234 is then channeled by optical light pipe 8012 so that an OSL sensor at reading position 10226, OSL sensor 10212 in FIG. 102, is exposed to green stimulation light 10234, causing the OSLM material in OSL sensor 10212 to luminesce and emit blue emitted light 10246 with a wavelength of about 420 nm. Blue emitted light 10246 is reflected by dichroic mirror 9462, passes through a blue glass filter 9434 that filters out non-blue light from blue light in blue emitted light 10246, i.e., blue glass filter 9434 is a blue filter that passes blue light. Blue glass filter 9434 also filters out any stray light or green stimulation light 10234 that is not removed by green glass filter 9458. Blue emitted light 10246 is then detected and measured by photocathode 9450 of photomultiplier tube (PMT) 9216. PMT 9216, operating in a photon counting mode, quantifies the luminescence created in the OSL sensor based on the detected blue emitted light 10246. A portion of transmitted green stimulation light 10234 is reflected back by dichroic mirror 9462 through green glass filter 9458 so that green reflected light 10272 is detected by activity sensor/photodiode 9420.

Green stimulation light 10234 in FIG. 102 defines a light path from LED 10242 to OSL sensor 10212. Blue emitted light 10246 defines a light path from OSL sensor 10212 to photocathode 9450. Stimulation light 10234 exits optical light pipe 8012 at an exit 10282 and travels a distance 10284 from exit 10282 to OSL sensor 10212.

Before, during or after OSL sensor 10212 is read, RFID tag reader 7604 reads RFID tag 5418 to retrieve identification information stored in the RFID tag as shown by arrow 10224. This information may be displayed on display 6920 (not shown in FIG. 102) or on a separate display in data communication with the dosimeter reader 6902. After OSL sensor 10212, OSL sensor 10214 and OSL sensor 10216 are read by OSL reader 7712, RFID tag reader 7604 updates RFID tag 10218 with information based on the readings of OSL sensor 10212, OSL sensor 10214 and OSL sensor 10216. RFID tag reader 7604 may also transmit updated information as each OSL sensor of the three OSL sensors is read. After OSL sensor 10212, OSL sensor 10214 and OSL sensor 10216 have been read, sled slider 7714 pushes dosimeter sled 10204 in the direction of arrow 10230 and back into the radiation dosimeter.

A database 10292 may optionally be in communication with dosimeter reader 6902 or be a part of dosimeter reader 6902. Information about the radiation dosimeter and/or individual wearing the radiation dosimeter may be retrieved from database 10292 as shown by dashed arrow 10294. Updated information about the radiation dosimeter and/or individual wearing the radiation dosimeter may be sent to database 10292 as shown by dashed arrow 10296.

In one embodiment of the present invention, the OSLM in each OSL sensor at the reading position for the OSL sensor is approximately 1 mm from the exit of the light guide/optical light pipe.

The activity sensor/photodiode of the photo-optical engine of FIG. 102 is designed to determine that the photo-optical engine is functional when a non-zero reading is received by the activity sensor/photodiode due to stimulated light reflected back to the activity sensor/photodiode.

In one embodiment of the present invention, the emitted light detector in FIG. 102 is part of a PMT that uses a high sensitivity counting system. The amount of blue light emitted during optical stimulation by the green stimulation light is directly proportional to the radiation dose and the intensity of the green stimulation light. A dose calculation algorithm is then applied to the measurement to determine exposure results.

The photo-optical engine of FIG. 102 may employ stimulation light having various pulse rates. The photo-optical engine of FIG. 102 may also employ various pulse durations of stimulation light.

Although in FIG. 102 a particular photo-optical engine employing particular transmitted and detected light wavelengths to determine the dosages of various types of radiation to which a particular type of OSLM is exposed, photo-optical engines transmitting and detecting different wavelengths may be used with different optically stimulated luminescent materials may be employed. The photo-optical engine may also be a pulsed stimulation system.

FIGS. 103, 104, 105, 106, 107, 108, 109, 110, 111, 112, 113, 114 and 115 shown an example of a reading process of the present invention using radiation dosimeter 102.

Figure 103:
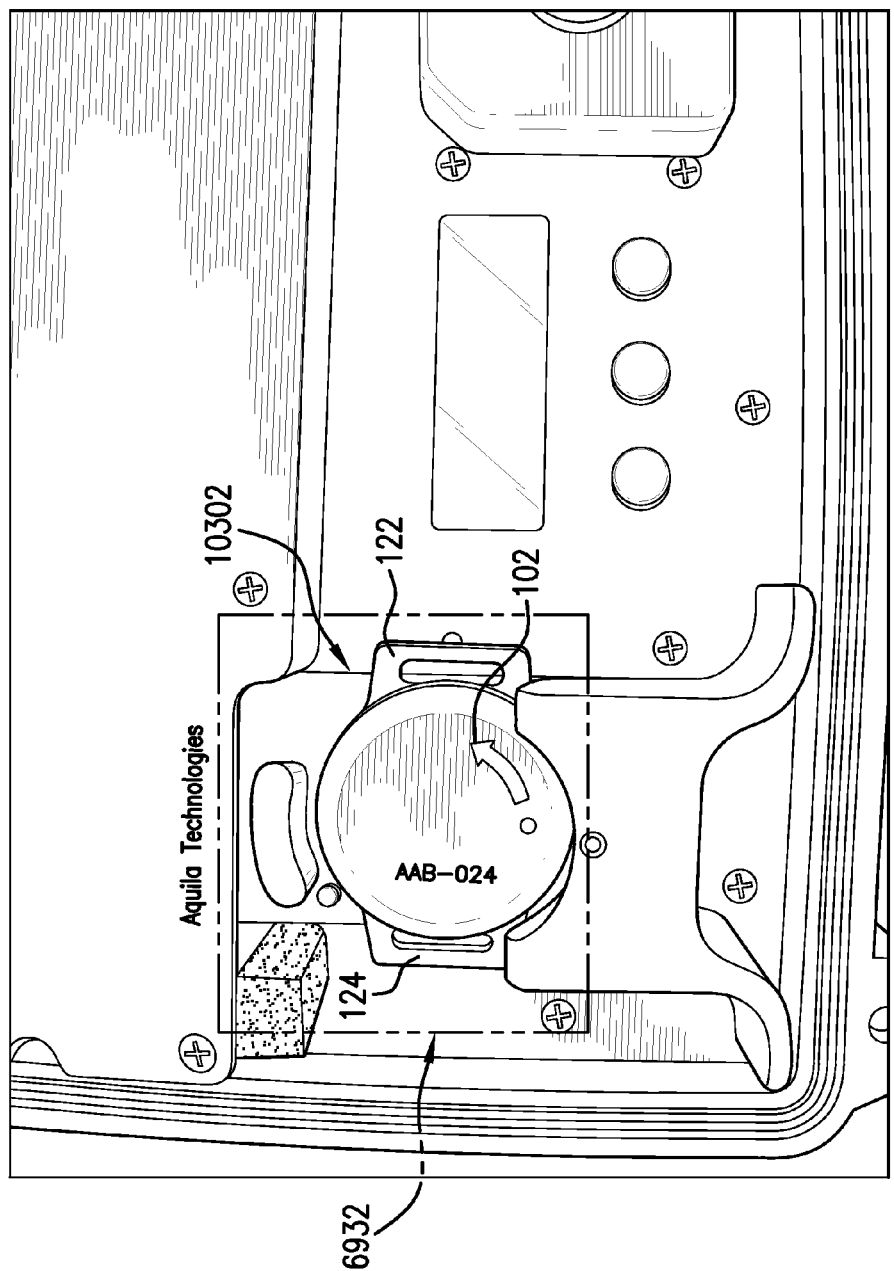
FIG. 103 is an image of a radiation dosimeter of the present invention loaded in the dosimeter drawer of the dosimeter reader of FIG. 69 with the radiation dosimeter in a starting position.
Figure 104:
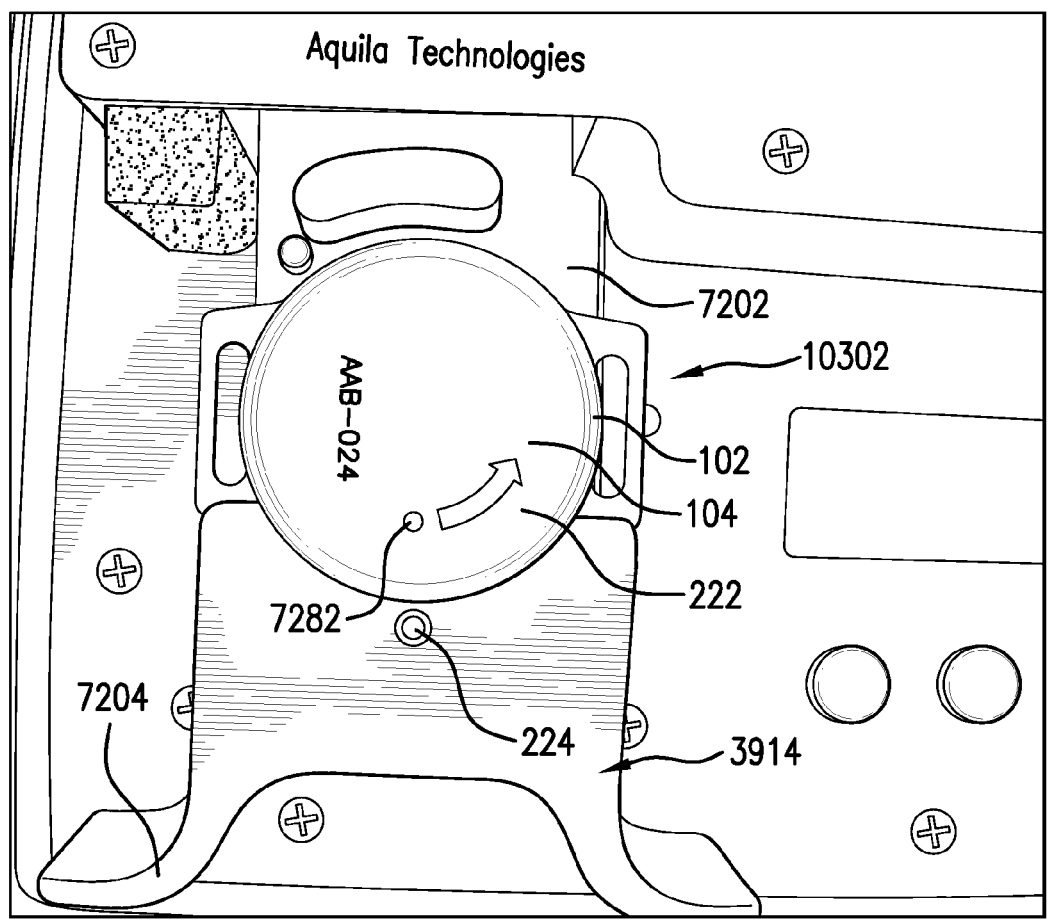
FIG. 104 is a close-up image of the radiation dosimeter and dosimeter drawer of FIG. 103.

FIGS. 103 and 104 show radiation dosimeter 102 placed in a starting position 10302 in loading/unloading region 6932. An individual places radiation dosimeter 102 in starting position 10302 so that C-shaped ridge 7212 (not visible in FIGS. 103 and 104) engages C-shaped groove 454 (not visible in FIGS. 103 and 104) of radiation dosimeter 102. Lozenge-shaped recesses 456 and 458 (not visible in FIGS. 103 and 104) of radiation dosimeter 102 (not visible in FIGS. 103 and 104) fit over retaining tabs 7218 and 7220 (not visible in FIGS. 103 and 104), respectively, of dosimeter reader 6902. Circular alignment symbol 224 of upper housing 104 is aligned with alignment dot 7282. Curved arrow 222 indicates the direction in which upper housing 104 should be rotated to release upper housing 104 from lower housing 109 (not visible in FIGS. 103 and 104).

Figure 105:
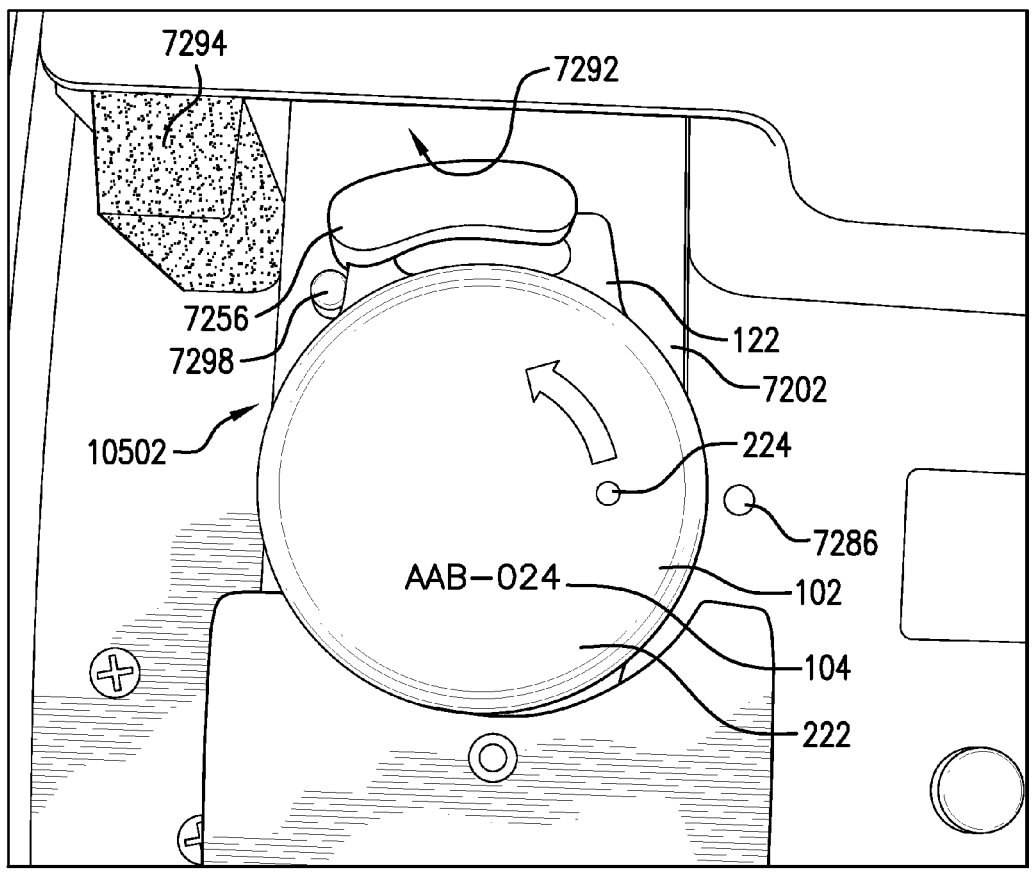
FIG. 105 is an image showing the radiation dosimeter of FIG. 103 rotated to a rotated position where the upper housing of the radiation dosimeter is released from the lower housing of the radiation dosimeter.

FIG. 105 shows upper housing 104 of radiation dosimeter 102 rotated so that radiation dosimeter 102 is in a rotated position 10502 in loading/unloading region 6932. By grasping loops 122 and 124, an individual rotates upper housing 104 approximately 90° until circular alignment symbol 224 is aligned with alignment dot 7286 so that radiation dosimeter 102 is in rotated position 10502 where upper housing 104 is released from lower housing 106. As upper housing 104 is rotated, loop 122 rotates into and engages receiving slot 7264 of dosimeter loop retainer 7256. Loop 122 is prevented from rotating further by end wall 7266 of dosimeter loop retainer 7256 and loop stop 7298. Loop 122 also engages spring tab 7270 and rests on base 7268 of loop retainer 7256. Also, as upper housing 104 is rotated, loop 124 rotates into and engages receiving slot 7272 of dosimeter loop retainer 7260 (not visible in FIG. 105). Loop 124 is prevented from rotating further by end wall 7274 (not visible in FIG. 105) of dosimeter loop retainer 7260 and loop stop 7298. Loop 122 also engages spring tab 7278 (not visible in FIG. 105) and rests on base 7276 (not visible in FIG. 105) of loop retainer 7260. While upper housing 104 is rotated, lower housing 106 (not visible in FIG. 105) is prevented from rotating by the engagement of C-shaped ridge 7212 (not visible in FIG. 105) with C-shaped groove 454 (not visible in FIG. 105) of radiation dosimeter 102 and the engagement of lozenge-shaped recesses 456 and 458 (not visible in FIG. 105) with retaining tabs 7218 and 7220 (not visible in FIG. 105), respectively, of dosimeter reader 6902. FIG. 105 shows drawer base 7202 in a position that corresponds to the position of elevator carriage 8412 shown in FIGS. 88 and 89.

A user pushes drawer handle 7204 of dosimeter drawer 3914 so that radiation dosimeter 102 is moved by drawer base 7202 into ready region housing 7294. As radiation dosimeter 102 is pushed into ready region housing 7294, retaining tabs 7218 and 7220 spread outwardly so that foot 7236 of exterior leg 7232 retaining tab 7218 and foot 7246 of exterior leg 7242 of retaining tab 7220 engage undercuts 10602 and 10604 of lozenge-shaped recesses 456 and 458, respectively as shown in FIG. 106. Retaining tabs 7218 and 7220 are spread outwardly from each other due to the interactions of retaining tabs 7218 and 7220 with openings 7222 and 7224 of drawer base 7202 and curved slots 9032 and 9034 of pinion gear 8622, as described in greater detail above with respect to FIGS. 90 and 91. In the state shown in FIG. 106, foot 7236 captures lip 10612 of lozenge-shaped recess 456, and foot 7246 captures lip 10614 of lozenge-shaped recess 458, thereby allowing retaining tab 7218 and retaining tab 7220 to hold lower housing 106 on drawer base 7202 as upper housing 104 (not shown in FIG. 106) is lifted up from lower housing 106 as radiation dosimeter 102 is moved from dosimeter loading/unloading region 6932 to dosimeter ready region 6934. Retaining tabs 7218 and 7220 are spread outwardly by the interaction of retaining tabs 7218 and 7220 with respective curved slots 9032 and 9034 of pinion gear 8622 as pinion gear 8622 travels along rack 8634, as described above with respect to FIGS. 93 and 94.

Although a particular combination of complementary lower housing rotation preventing engagement structures, i.e. a C-shaped recess on the lower housing engaging a C-shaped ridge on the drawer base, are used in the embodiment of the present invention shown in FIGS. 103, 104, 105, 106, 107, 108, 109, 110, 111, 112, 113, 114 and 115, other combinations of rotation preventing engagement structures may be used in the present invention. For example, the drawer base could includes two or more posts and the lower housing could includes recesses for receiving and engaging the posts.

Although a particular combination of lower housing retaining structures, i.e. the retaining tabs engaging the lips and undercuts of the lozenge-shaped recesses, are used in the embodiment of the present invention shown in FIGS. 103, 104, 105, 106, 107, 108, 109, 110, 111, 112, 113, 114 and 115, other combinations of lower housing retaining structures may be used in the present invention.

Figure 107:
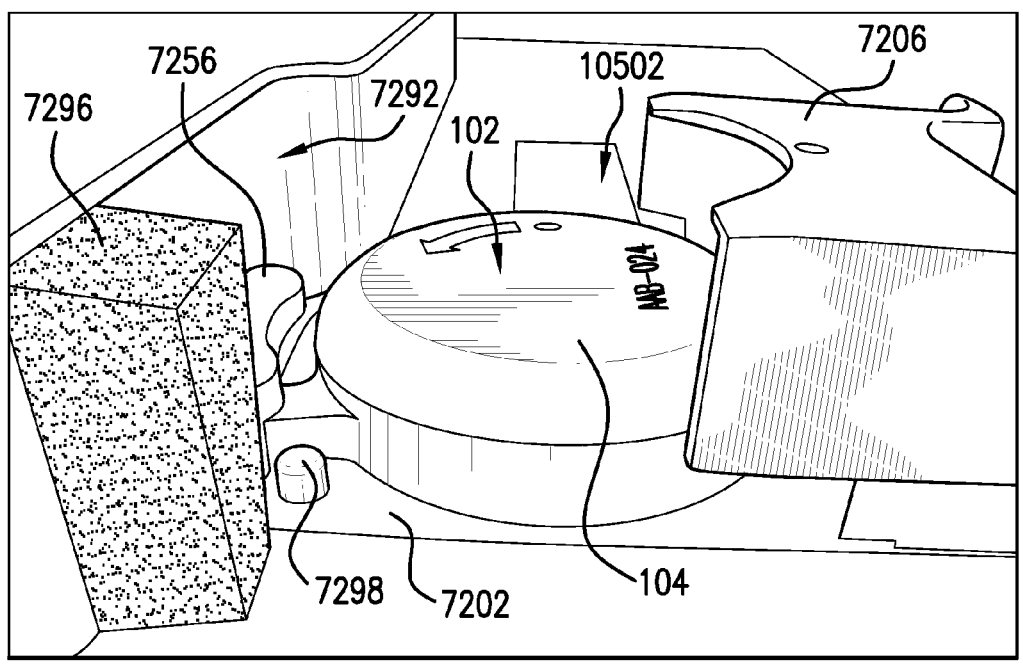
FIGS. 107, 108 and 109 are images showing the radiation dosimeter and dosimeter drawer of FIG. 103 being pushed into the ready region housing of the dosimeter reader of FIG. 69 and the upper housing of the radiation dosimeter being raised above the lower housing of the radiation dosimeter.
Figure 108:
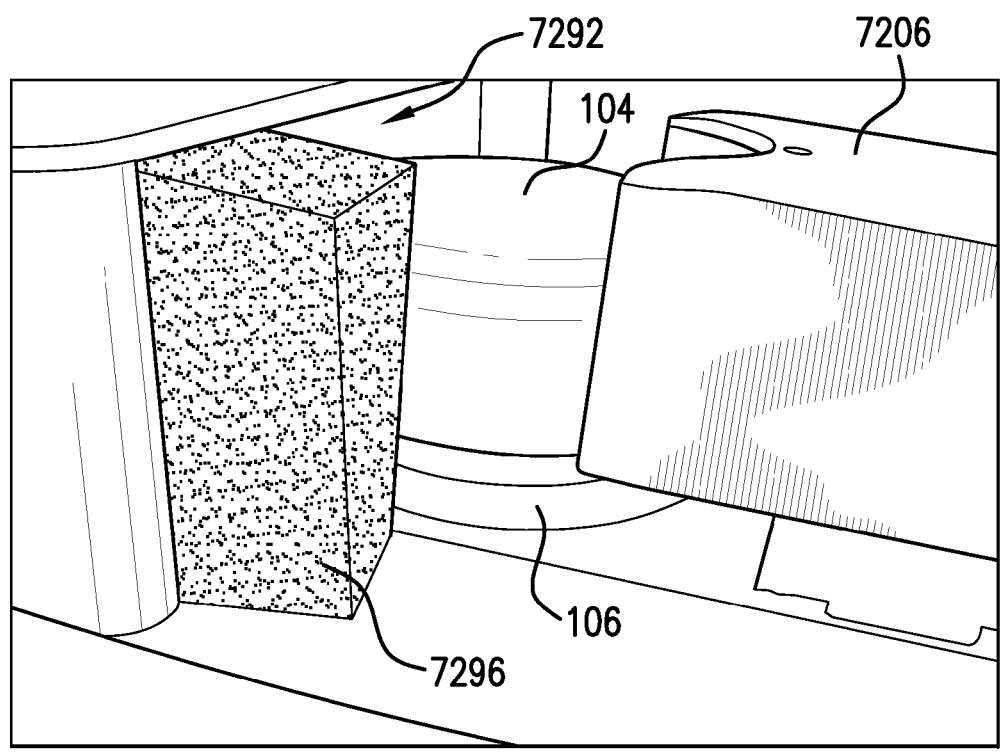
Figure 109:
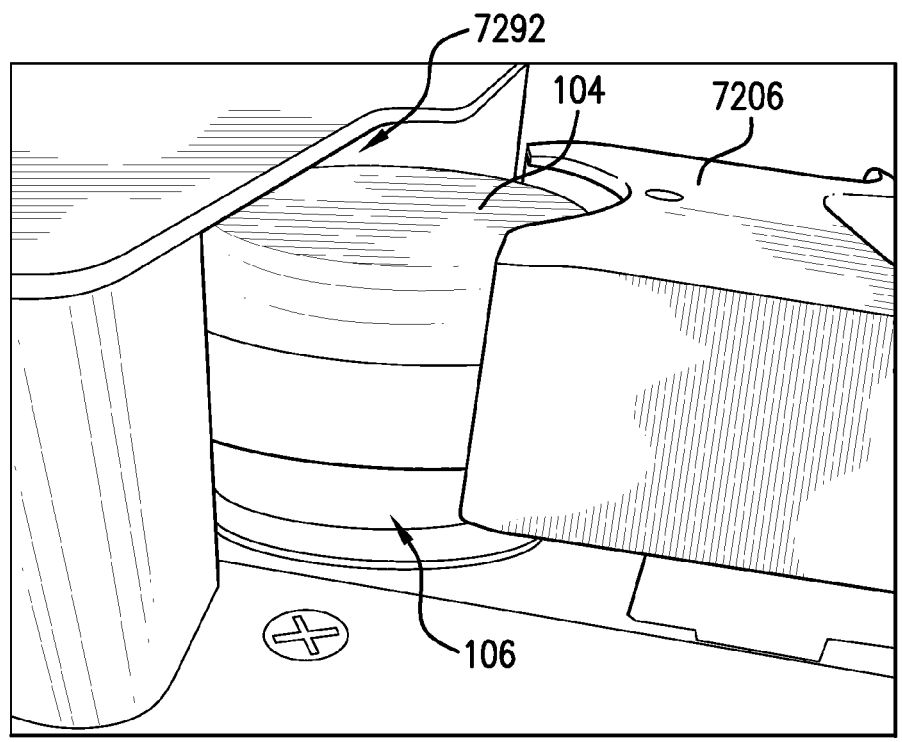

FIG. 107 shows radiation dosimeter 102 in rotated position 10502 of FIG. 105 from the side. FIG. 108 shows radiation dosimeter 102 is moved by drawer base 7202 into ready region housing 7294. As shown in FIG. 108, upper housing 104 has been lifted above lower housing 106 by loop retainers 7256 and 7260 being elevated by loop retainer elevator 8612 (not visible in FIG. 108) as radiation dosimeter 102 moved by drawer base 7202 into ready region housing 7294. FIG. 109 shows radiation dosimeter 102 moved further by drawer base 7202 into ready region housing 7294 and upper housing 104 being lifted further above lower housing 106 by loop retainers 7256 and 7260 being further elevated by loop retainer elevator 8612 (not visible in FIG. 109). Foam cushioning 7296 is removed in FIG. 109 to show greater detail of upper housing 104 and lower housing 106.

Figure 110:
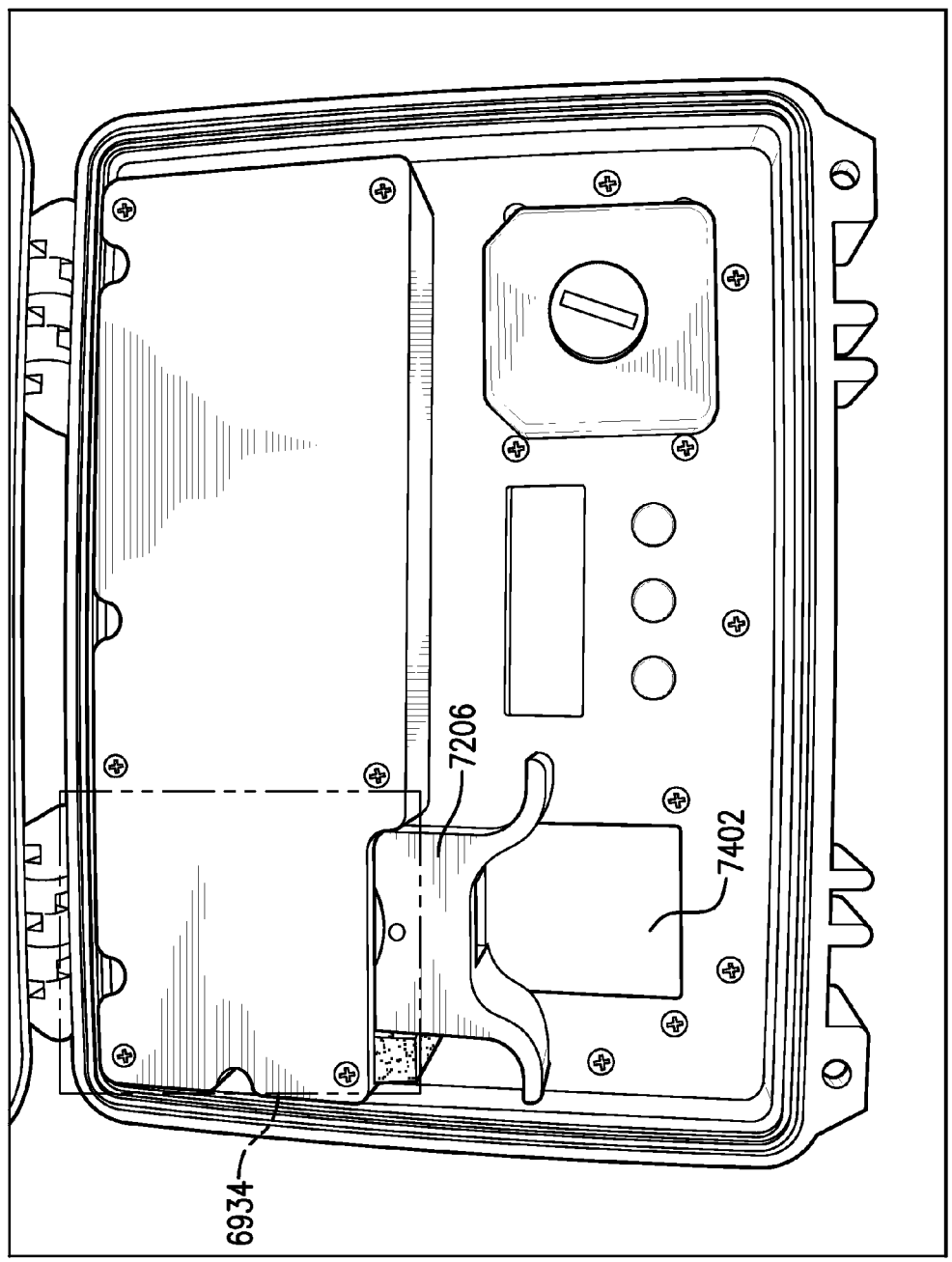
FIG. 110 is an image showing the radiation dosimeter and dosimeter drawer of FIGS. 106, 107 and 108 fully pushed into the ready region housing.
Figure 111:
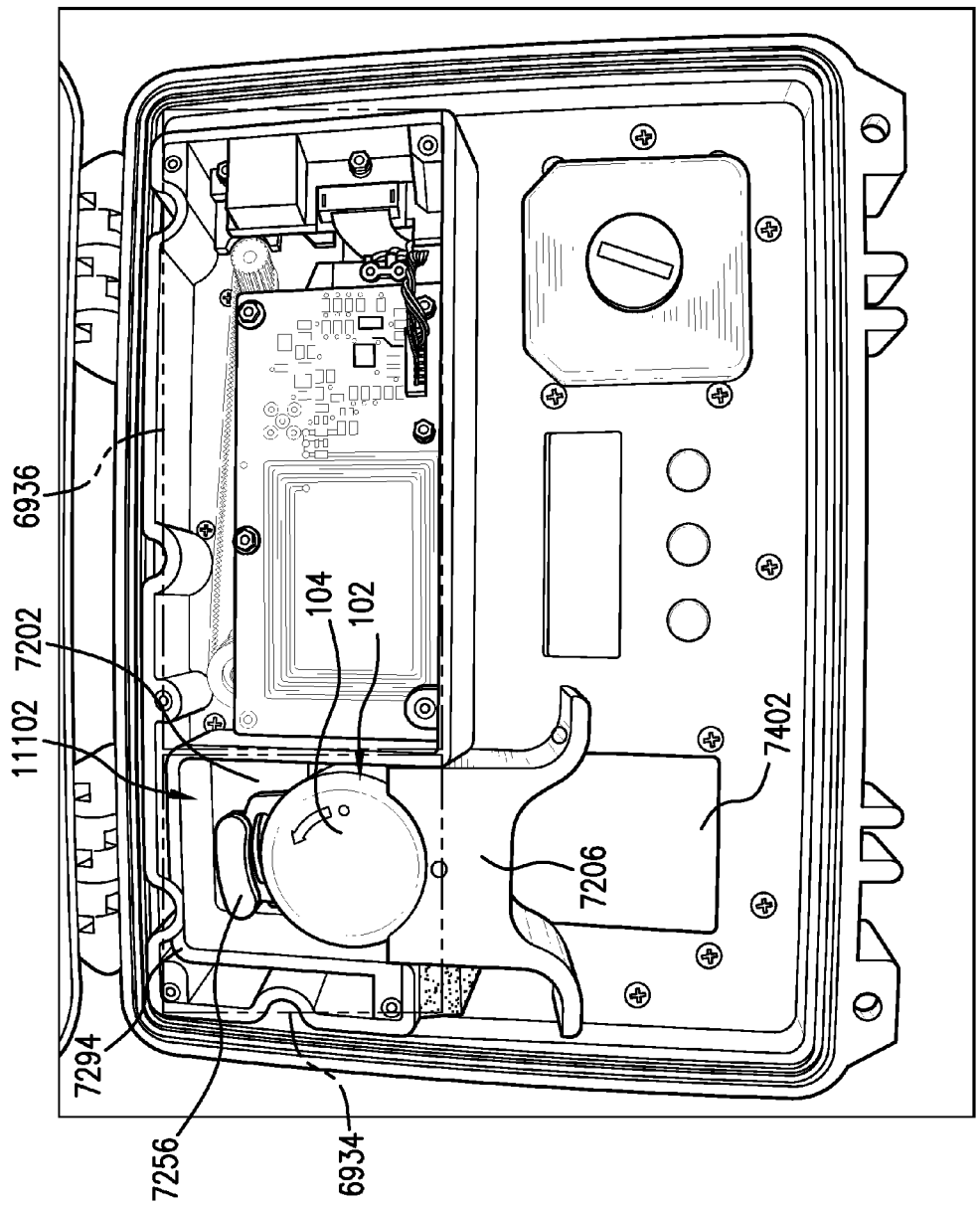
FIG. 111 shows the dosimeter reader in the state shown in FIG. 110 in which the housing cover is removed to show interior details including the radiation dosimeter in the ready region housing housing.
Figure 112:
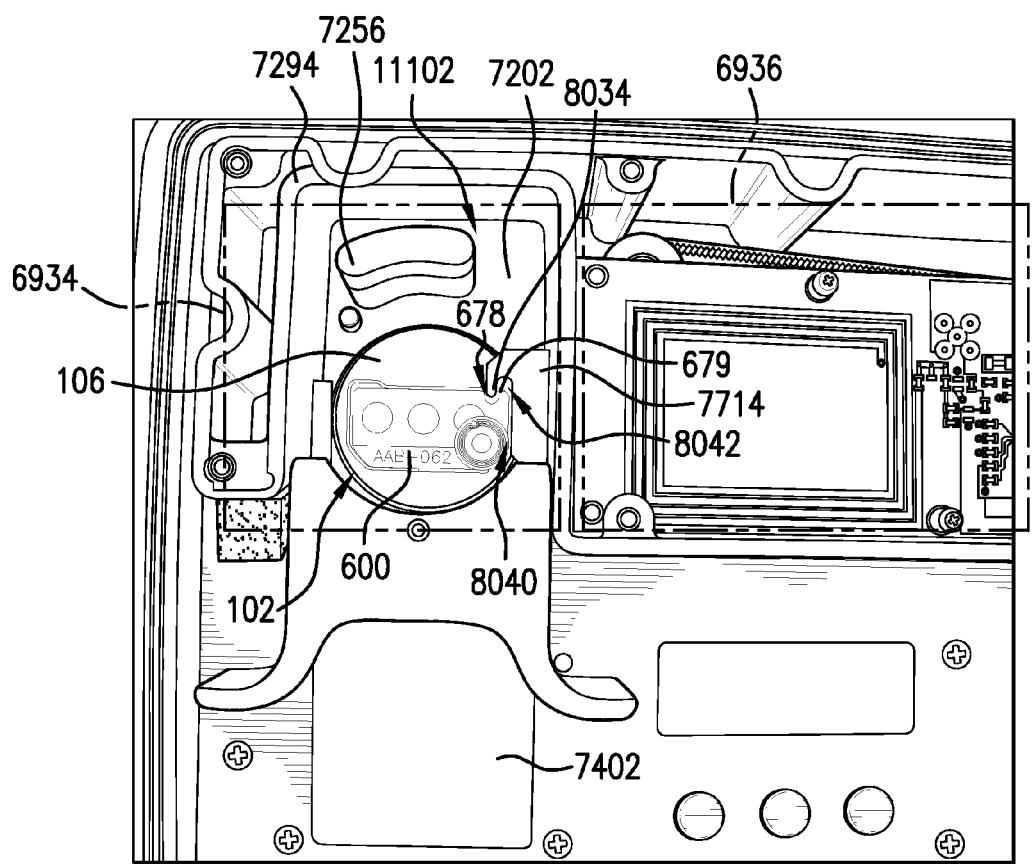
FIG. 112 shows the radiation dosimeter reader in the state shown in FIG. 111 with the upper housing removed to show the slider of the OSL reader engaging the dosimeter sled of the radiation dosimeter.

FIGS. 110, 111 and 112 show drawer base 7202 fully pushed into ready region housing 7294. Housing cover 6940 is shown removed in FIG. 111 to show radiation dosimeter 102 in a dosimeter ready position 11102 in dosimeter ready region 6934 of radiation dosimeter reader 6902. In dosimeter ready position 11102, radiation dosimeter 102 is fully shielded from light by ready region housing 7294, housing cover 6940 and drawer housing 7206. Upper housing 104 is fully raised above lower housing 104 by loop retainers 7256 and 7260 at dosimeter ready position 11102. FIGS. 110, 111 and 112 also show how proximal flap 8440 forms a floor beneath opening 7402.

FIG. 112 shows radiation dosimeter 102 at dosimeter ready position 11102 with upper housing 104 removed to show how lower housing 106 and dosimeter sled 600 interact with various components of dosimeter reader 6902 at dosimeter ready position 11102. At ready position 11102, bifurcated tang 8034 of sled slider 7714 engages U-shaped detent 678 of dosimeter sled 600, U-shaped detent 8042 of sled slider 7714 engages tang 679 of dosimeter sled 600, and a pusher end 8040 of slider 7714 abuts end side 668 of dosimeter sled 600. The engagement of bifurcated tang 8034 with U-shaped detent 678 and the engagement of U-shaped detent 8042 with tang 679 allows slider 4214 to pull dosimeter sled 600 in a linear direction into reading region 6936. At dosimeter ready position 11102, lower housing 106 continues to prevented from rotating by C-shaped ridge 7212 engaging C-shaped groove 454. At dosimeter ready position 11102, lower housing 106 continues to be held on drawer base 7202 by retaining tabs 7218 and 7220 continuing to capture lips 10612 and 10614 of lozenge-shaped recesses 456 and 458, respectively.

The position of drawer base 7202 shown in FIGS. 110, 111 and 112 corresponds to the position of elevator carriage 8412 shown in FIGS. 88 and 89.

Figure 113:
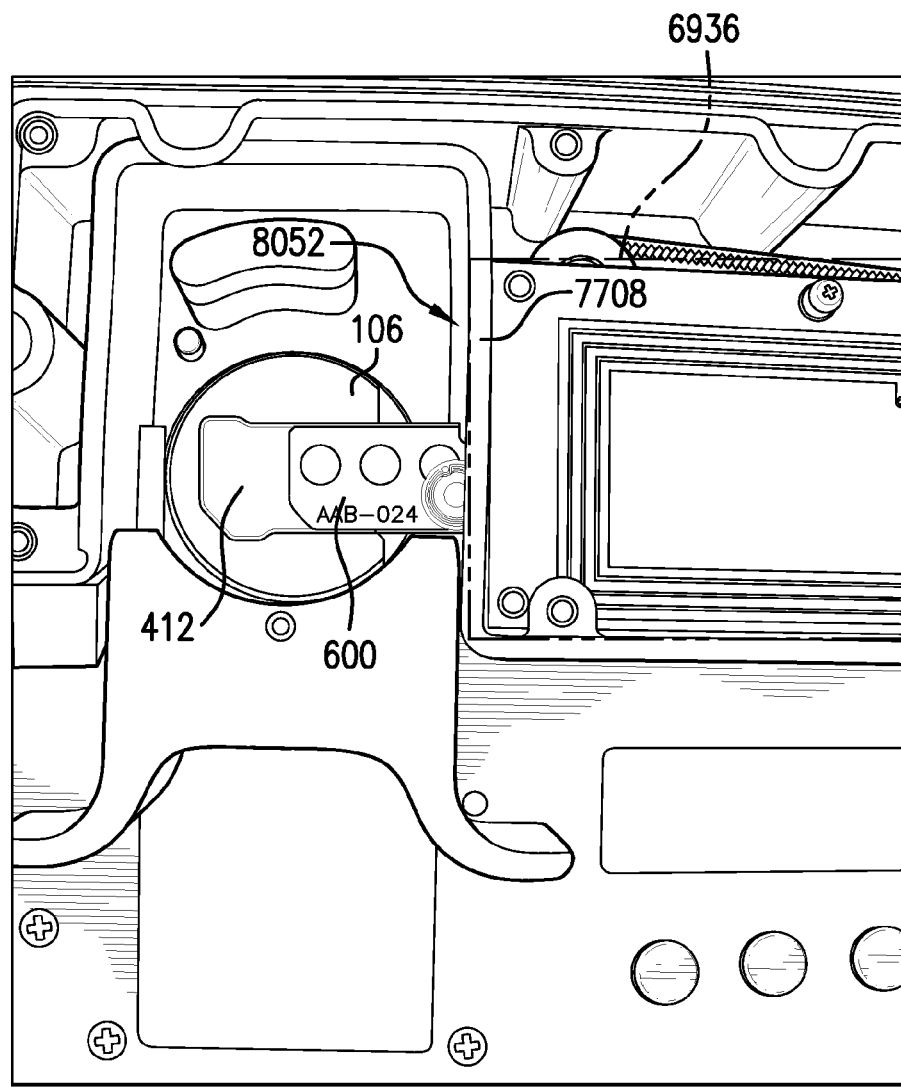
FIG. 113 shows the dosimeter sled of FIG. 112 being pulled out of the lower housing of the radiation dosimeter and being pulled into the OSL reader housing by the puller pusher of the OSL reader.

FIG. 113 shows dosimeter sled 600 being pulled out of sled recess 412 of lower housing 106 by sled slider 7714 (not visible in FIG. 113) through opening 8052 in wall 7708 and into dosimeter reading region 6936.

Figure 114:
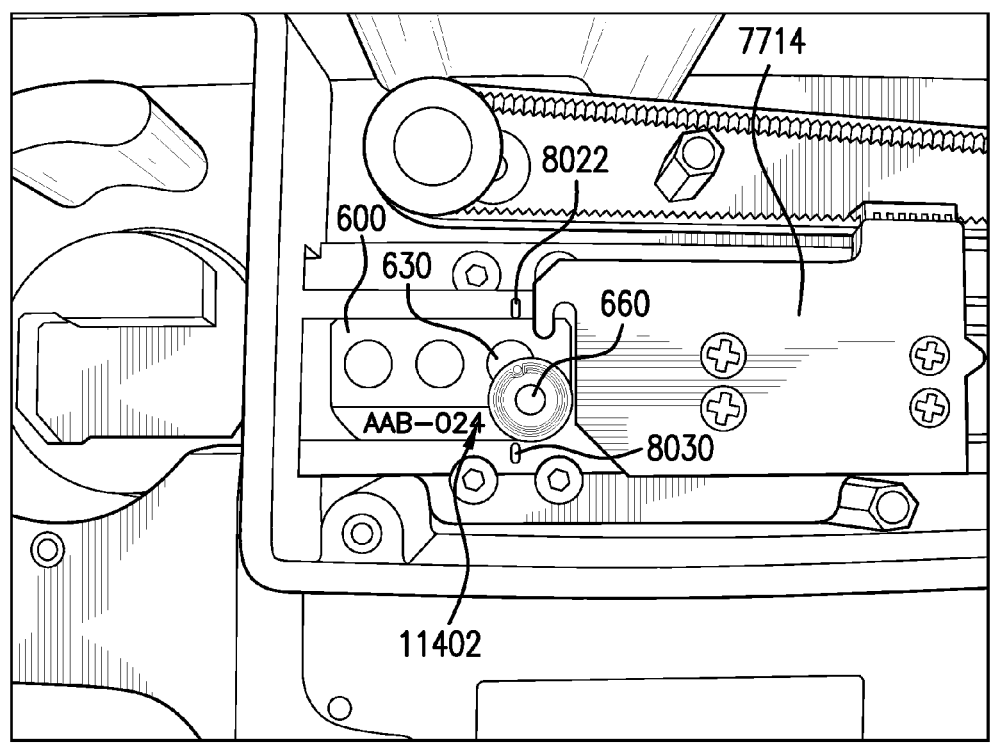
FIG. 114 shows the dosimeter sled of FIG. 113 pulled by the slider of the OSL reader to a reading position for the comparator OSL filter of the dosimeter sled.

FIG. 114 shows dosimeter sled 600 pulled to a reading position 11402 for comparator OSL sensor 630 where OSL reader 7712 (not visible in FIG. 114) is directly beneath OSL sensor 630 so that exposed side 658 of OSLM 652 (not visible in FIG. 114) is exposed to OSL reader 7712. Positioning notch 684 (not visible in FIG. 114) is aligned with alignment mark 8022 and alignment mark 8030. At reading position 11402, RFID tag 660 is also read by RFID tag reader 7604 (which is removed in FIG. 114 to show greater detail inside dosimeter reading region 6936).

Figure 115:
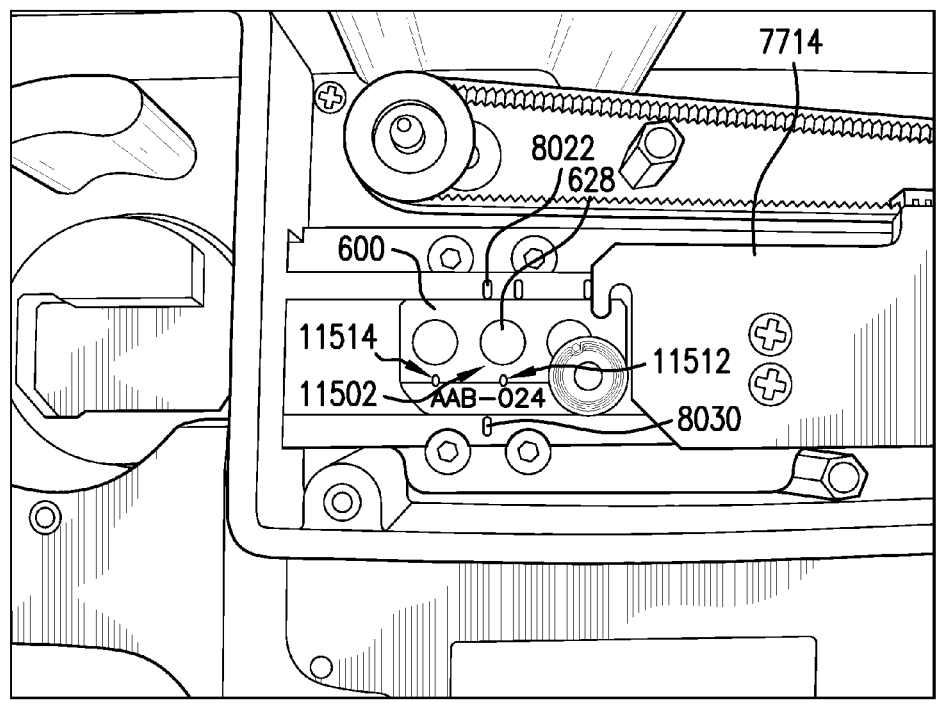
FIG. 115 shows the dosimeter sled of FIG. 114 pulled by the slider of the OSL reader to a reading position for the reference OSL filter of the dosimeter sled.

FIG. 115 shows dosimeter sled 600 pulled to a reading position 11502 for reference OSL sensor 628, where OSL reader 7712 (not visible in FIG. 115) is directly beneath OSL sensor 628 so that exposed side 650 of OSLM 642 (not visible in FIG. 115) is exposed to OSL reader 7712. Positioning notch 682 (not visible in FIG. 115) is aligned with alignment mark 8022 and alignment mark 8030. At reading position 11502, an etched alignment mark 11512 on dosimeter sled 600 for OSL sensor 628 is aligned with alignment mark 8022 and alignment mark 8030. FIG. 115 also shows an etched alignment mark 11514 on dosimeter sled 600 for OSL sensor 626.

After reference OSL sensor 628 is read, slider 7714 pulls dosimeter sled 600 to a reading position (not shown) where neutron-sensitive OSL sensor 626 is in position to be read above OSL reader 7712. In the reading position for neutron-sensitive OSL sensor 626, exposed side 640 of OSLM 632 is exposed to OSL reader 7712. At the reading position for OSL sensor 626, positioning notch 680 is aligned with alignment mark 8022 and alignment mark 8030. Also, at the reading position for OSL sensor 626, etched alignment mark 11514 is aligned with alignment mark 8022 and alignment mark 8030.

After comparator OSL sensor 630, reference OSL sensor 628 and neutron-sensitive OSL sensor 626 have each been read by OSL reader 7712, sled slider 7714 pushes dosimeter sled 600 back into sled recess 412 of lower housing 106 in a configuration identical to the one shown in FIGS. 110, 111 and 112. By pulling on drawer handle 7204, drawer handle 7204 may then be pulled back so that drawer base 7202 is at dosimeter loading/unloading region 6932 in a configuration identical to the one shown in FIGS. 105 and 107. As drawer base 7202 is moved towards dosimeter loading/unloading region 6932, dosimeter upper housing 104 is lowered by loop retainers 7256 and 7260 being lowered by loop retainer elevator 8612. Also, as radiation dosimeter 102 drawer base 7202 is moved towards dosimeter loading/unloading region 6932, retaining tabs 7218 and 7220 retract inwardly so that foot 7236 of exterior leg 7232 retaining tab 7218 and foot 7246 of exterior leg 7242 of retaining tab 7220 no longer engage undercuts 10602 and 10604 of lozenge-shaped recesses 456 and 458, respectively. Once radiation dosimeter 102 has been moved back to dosimeter loading/unloading region 6932, upper housing 104 may be then screwed onto lower housing 106, by grasping loops by an individual grasping loops 122 and 124 and rotating upper housing 104 90° in a direction opposite to curved arrow 222 so that radiation dosimeter 102 is in the configuration shown in FIGS. 103 and 104. Radiation dosimeter 102 may then be removed from drawer base 7202.

EXAMPLE

Example

Dosimeter tests were conducted to determine the responses of three OSL sensors to radiation of different energies.

Figure 116:
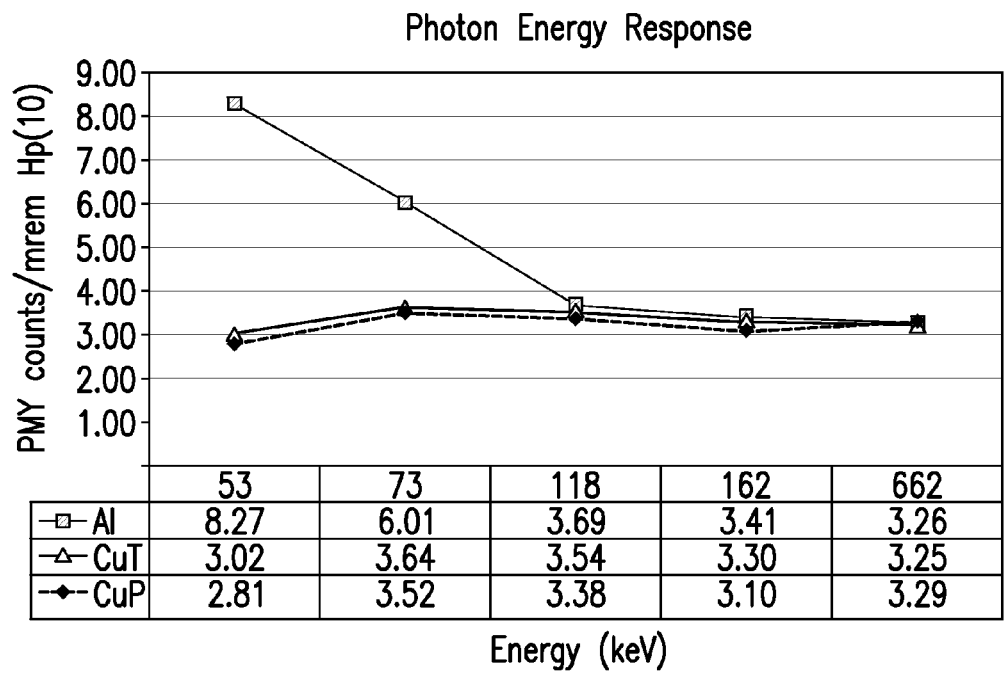
FIG. 116 is a graph of a photon energy response of Al, CuT and CuP filters.
Figure 117:
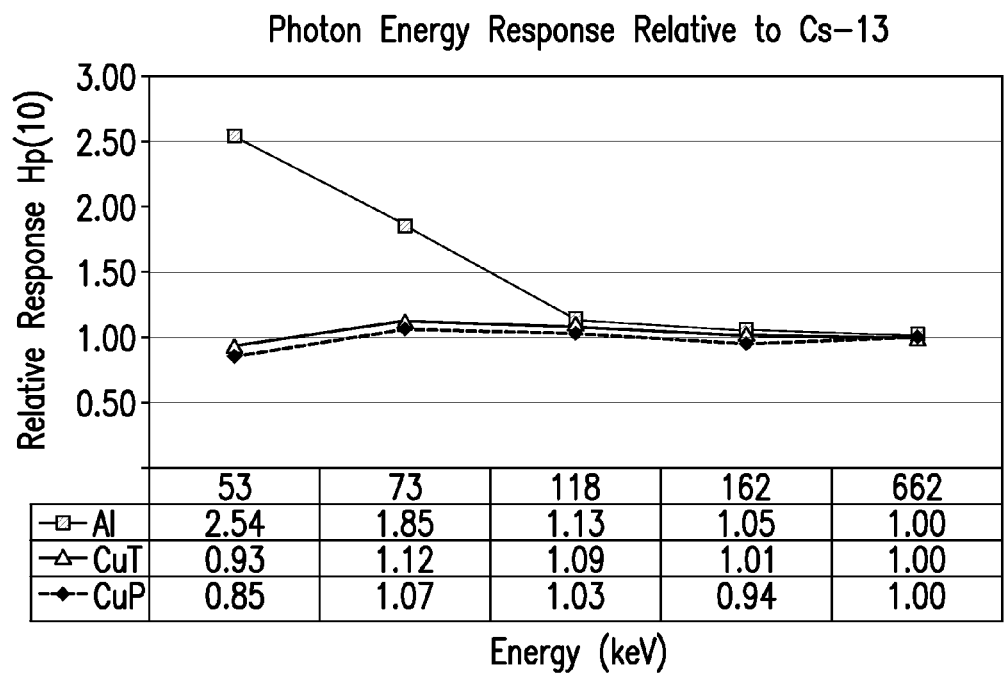
FIG. 117 is a graph of a photon energy response of Al, CuT and CuP filters relative to Cs-137.
Figure 118:
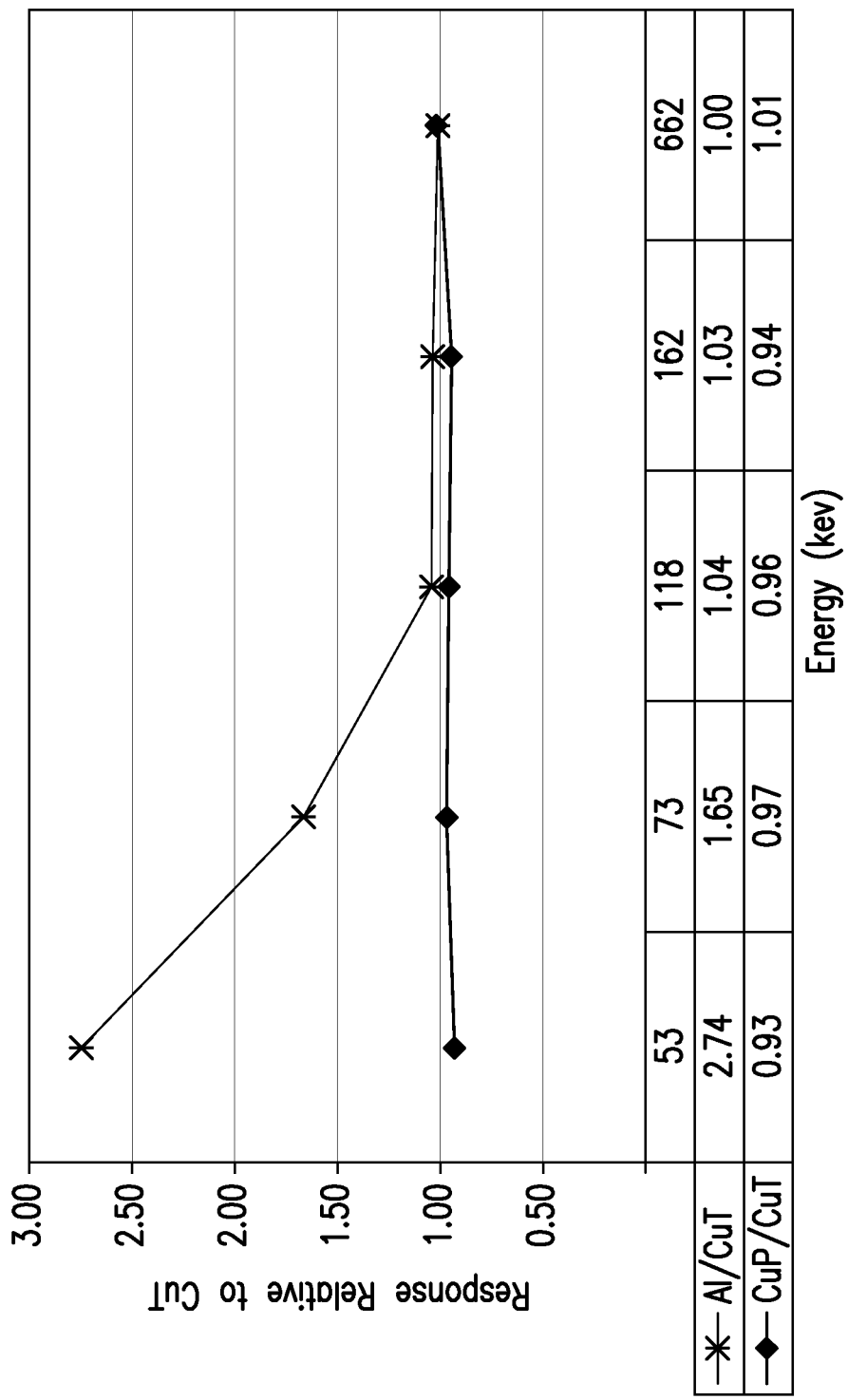
FIG. 118 is a graph of a photon energy response of Al and CuP filters relative to CuT.

Groups of five dosimeters each were irradiated to a deep dose (defined as Hp10, or the dose occurring at a depth of 10 mm in tissue) of 500 mrem (5 mSv) from gamma or x-rays with mean energies of 53 keV, 73 keV, 118 keV, 162 keV and 662 keV. The dosimeters were mounted on a cylindrical phantom representing the wrist composed of polymethymethacrylate that is 7.3 cm in diameter and 45 cm tall. After exposure, the dosimeters were read out using a dosimeter reader of the type described above and shown in the drawings. FIG. 116 plots the mean luminescence in units of photon counts per mrem of delivered deep dose for each of the three OSL sensors in the dosimeter. The sensor labeled Al refers to the OSL sensor consisting of a single energy compensating cup composed of aluminum with a PTFE conversion filter between the OSLM and the aluminum cup. Likewise, the sensor labeled CuT refers to the OSL sensor consisting of an inner energy compensating cup of aluminum and an outer energy compensating cup of copper with a PTFE conversion filter between the OSLM and the inner cup of aluminum. The sensor labeled CuP is similar to the CuT sensor except that an HDPE neutron conversion filter is substituted for the PTFE conversion filter. The Al sensor shows an increasing response to x-rays with energies below 100 keV, demonstrating the energy compensation effect of the copper outer cup. FIG. 117 portrays the same data normalized to the response for the 662 keV gamma rays. This demonstrates the energy compensation effect of the filters to create the same response per unit dose at all energies tested. FIG. 118 portrays the relative response of the Al and CuP sensors to the reference sensor, CuT. This graph demonstrates the equality of the gamma ray and x-ray response between the CuT and CuP sensors so that any response in the CuP that is greater than that measured for the CuT can be attributed to the neutron dose.

While the present invention has been disclosed with references to certain embodiments, numerous modifications, alterations, and changes to the described embodiments are possible without departing from the spirit and scope of the present invention, as defined in the appended claims. Accordingly, it is intended that the present invention not be limited to the described embodiments, but that it has the full scope defined by the language of the following claims, and equivalents thereof.

What is claimed is:

1. A device comprising:
an optically stimulated luminescence (OSL) reader for reading one or more OSL sensors of a dosimeter;
a dosimeter drawer slidably mounted in the device, the dosimeter drawer comprising:
a drawer base including two tab openings through which two retaining tabs extend; and
a drawer handle for pushing and pulling the dosimeter drawer so that that drawer slides in a first direction and a second direction that are opposite to each other;
first and second loop retainers extending through respective post openings in the drawer base,
wherein the drawer base includes one or more first engagement structures for engaging one or more second engagement structures on a lower housing of the dosimeter when the dosimeter is loaded in the dosimeter drawer whereby the lower housing is prevented from rotating relative to the drawer base ;
wherein the sliding of the dosimeter drawer in the first direction causes the two retaining tabs engage respective lips and cutouts of recesses on the lower housing of the dosimeter to retain the lower housing of the dosimeter on the drawer base when an upper housing of the dosimeter is separated from the lower housing of the dosimeter,
wherein the first and second loop retaining posts retain respective first and second loops of the upper housing of the dosimeter when the upper housing of the dosimeter is rotated approximately 90° relative to the lower housing to release the upper housing from the lower housing,
wherein the first and second loop retainers raise the upper housing above the lower housing when the upper housing is retained by the first and second loop retaining posts and when the dosimeter drawer is pushed in the first direction, wherein the first and second loop retainers lower the upper housing separated from the lower housing on the lower housing when the dosimeter drawer is pulled in the second direction, and wherein the device further comprises:

an elevator carriage comprising:
- a barrel with a barrel groove on an exterior side thereof;
- a loop retainer elevator including a tongue on an interior side thereof that travels in the barrel groove; and
- a pinion gear mounted on the barrel; and a rack with rack teeth that engage pinion teeth of the pinion gear, wherein when the dosimeter drawer is pushed in the first direction, the pinion gear rotates along the rack thereby causing the barrel to rotate and the tongue of the loop retainer elevator to travel in along the barrel groove thereby causing the loop retainer elevator to move upwardly relative to the barrel and first and second loop retainers to raise the upper housing above the lower housing of the dosimeter.

2. The device of claim 1, the one or more first engagement structures comprise a C-shaped ridge and the one or more second engagement structures comprises a C-shaped groove.

3. The device of claim 1, wherein the two retaining tabs are moved outwardly by the device when the dosimeter drawer is pushed from a dosimeter loading/unloading region for the device to a dosimeter ready region for the device.

4. The device of claim 1, wherein the device further comprises a ready region housing that forms a light tight enclosure when the dosimeter drawer is pushed into the reading region housing and wherein a portion of the light tight enclosure comprises a drawer housing of the dosimeter drawer.

5. The device of claim 4, wherein the one or more OSL sensors are mounted in a dosimeter sled that is slidably mounted in the lower housing, wherein the device further comprises:
- a sled slider slidably mounted in the device, wherein the sled slider pulls and pushes the dosimeter sled, wherein the sled slider pulls the dosimeter sled out of the lower housing and into a dosimeter reading region of the device, wherein the sled slider moves the dosimeter sled within the dosimeter reading region to a respective reading position for each of the respective one or more OSL sensors, wherein each OSL sensor is read by the OSL reader at the respective reading position for the OSL sensor, and wherein the sled slider pushes the dosimeter sled back into the lower housing after a selected one or more of the one or more OSL sensors are read by the OSL reader.

6. The device of claim 5, wherein the device further comprises a photo-optic sensor that interacts with respective notches aligned with each OSL sensor to determine when each of the one or more OSL sensors is in a respective reading position.

7. The device of claim 5, wherein the sled slider includes a first tang and first U-shaped detent for engaging a second U-shaped detent and a second tang, respectively, of the dosimeter sled, thereby allowing the sled slider to pull the dosimeter sled, and wherein the sled slider includes a pusher end for pushing the dosimeter sled.

8. The device of claim 5, wherein the directions the sled slider pulls and pushes the dosimeter sled are perpendicular to the first and second directions that the dosimeter drawer moves.

9. The device of claim 5, wherein the device further comprises an RFID tag reader for communicating with an RFID tag mounted on the dosimeter sled.

10. The device of claim 9, wherein the RFID tag reader communicates with the RFID tag when the dosimeter sled is in a reading position for one of the OSL sensors.

11. The device of claim 5, wherein the one or more of the OSL sensors each comprise an optically stimulated luminescent material (OSLM) mounted in a first cylindrical cup-shaped filter, and wherein the first cylindrical cup-shaped filter comprises a first energy compensating material.

12. The device of claim 11, wherein the first cylindrical cup-shaped filter is comprised of aluminum.

13. The device of claim 11, wherein the first cylindrical cup-shaped filter comprises a plastic having metal particles dispersed therein.

14. The device of claim 11, wherein a first OSL sensor of the one or more OSL sensors comprises a second cylindrical cup-shaped filter in which the first cylindrical cup-shaped filter is mounted.

15. The device of claim 14, wherein the first cylindrical cup-shaped filter comprises aluminum and the second cylindrical cup-shaped filter comprises copper.

16. The device of claim 11, wherein the one or more OSL sensors each comprise one or more filter material discs located between the OSLM and a base of the first cylindrical cup-shaped filter.

17. The device of claim 16, wherein a first OSL sensor of the one or more OSL sensors comprises a converter material disc located between the OSLM and the first cylindrical cup-shaped filter.

18. The device of claim 17, wherein the converter material disc is comprised of high-density polyethylene and wherein there is a conformal disc comprised of polyethylene located between the OSLM and the converter material disc.

19. The device of claim 16, wherein a second OSL sensor of the one or more OSL sensors comprises a reference filter material disc comprised of polytetrafluoroethylene located between the OSLM and the first cylindrical cup-shaped filter.

20. The device of claim 19, wherein the first cylindrical cup-shaped filter is comprised of aluminum.

21. The device of claim 20, wherein OSL sensor further comprises a second cylindrical cup-shaped filter in which the first cylindrical cup-shaped filter is mounted.

22. The device of claim 21, wherein the second cylindrical cup-shaped filter is comprised of copper.

* * * * *